(12) United States Patent
Widmer et al.

(10) Patent No.: US 10,029,577 B2
(45) Date of Patent: Jul. 24, 2018

(54) METHODS AND APPARATUS FOR POSITIONING A VEHICLE

(71) Applicant: QUALCOMM Incorporated, San Diego, CA (US)

(72) Inventors: Hans Peter Widmer, Wohlenschwil (CH); Andreas Daetwyler, Muhen (CH)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/586,144

(22) Filed: May 3, 2017

(65) Prior Publication Data

US 2017/0361726 A1    Dec. 21, 2017

Related U.S. Application Data

(60) Provisional application No. 62/350,653, filed on Jun. 15, 2016.

(51) Int. Cl.
 *B60L 11/18*    (2006.01)
 *G01D 5/20*    (2006.01)
 (Continued)

(52) U.S. Cl.
 CPC ......... *B60L 11/1833* (2013.01); *B60L 11/182* (2013.01); *B60L 11/1829* (2013.01);
 (Continued)

(58) Field of Classification Search
 CPC ...... B60L 11/00; B60L 11/18; B60L 11/1809; B60L 11/182; B60L 11/1824;
 (Continued)

(56) References Cited

U.S. PATENT DOCUMENTS 9,739,844 B2 * 8/2017 Widmer ............ G01R 33/0047
2016/0318413 A1 * 11/2016 Roehrl .................. B60L 11/182
(Continued)

FOREIGN PATENT DOCUMENTS

DE    102013227129 A1    6/2015
WO    WO-2016014294 A1    1/2016

OTHER PUBLICATIONS

International Search Report and Written Opinion—PCT/US2017/031069—ISA/EPO—dated Jul. 21, 2017.
(Continued)

*Primary Examiner* — Hoai-An D Nguyen
(74) *Attorney, Agent, or Firm* — Knobbe, Martens, Olson & Bear, LLP

(57) ABSTRACT

Methods and apparatus are disclosed for positioning a vehicle. An apparatus for determining positioning information for a vehicle may comprise a plurality of receive coil circuits and a hardware processor. The plurality of receive coil circuits is configured to generate voltage signals from a magnetic field. The hardware processor is configured to generate position estimates of a position of the magnetic field generator with respect to a position of the plurality of receive coils. Each of the first sequence of position estimates is determined based upon a corresponding voltage vector derived from the voltage signals and at least one of a plurality of reference vectors. The hardware processor is configured to update the plurality of reference vectors based upon the first sequence of position estimates and a second sequence of position estimates generated based upon a source different from the plurality of receive coil circuits.

30 Claims, 38 Drawing Sheets

(51) Int. Cl.
*G01S 19/45* (2010.01)
*G01S 19/42* (2010.01)
*G01S 17/06* (2006.01)
*G01S 13/06* (2006.01)
*G01S 5/02* (2010.01)

(52) U.S. Cl.
CPC ............... *G01D 5/20* (2013.01); *G01S 19/42* (2013.01); *G01S 19/45* (2013.01); *G01S 5/0273* (2013.01); *G01S 13/06* (2013.01); *G01S 17/06* (2013.01)

(58) Field of Classification Search
CPC .............. B60L 11/1827; B60L 11/1829; B60L 11/1833; G01S 19/00; G01S 19/38; G01S 19/39; G01S 19/42; G01S 19/428; G01S 19/45; G01S 5/0273; G01S 13/06; G01S 17/06; G01D 5/20
USPC .... 324/326, 600, 649, 654; 73/1.79, 116.08; 701/29.1, 32.3, 32.4, 400, 408, 468, 46, 701/485
See application file for complete search history.

(56) References Cited

U.S. PATENT DOCUMENTS

2016/0380487 A1\* 12/2016 Widmer .................. H02J 50/12
    324/654
2016/0380488 A1\* 12/2016 Widmer ............... H04B 5/0037
    324/207.15
2017/0005523 A1\* 1/2017 Widmer .................. H02J 50/12
2017/0259679 A1\* 9/2017 Widmer ............. B60L 11/1831

OTHER PUBLICATIONS

Sukprasert P., et. al., "Estimation and Control of Lateral Displacement of Electric Vehicle using WPT Information," IEEE International Conference on Mechatronics (ICM), Mar. 6, 2015, pp. 329-334, XP032764242, DOI: 10.1109/ICMECH.2015.7083997 [retrieved on Apr. 9, 2015].

\* cited by examiner

1600

| LUT address | | | Coordinate | | | 9D reference vector | 6D reference vector |
|---|---|---|---|---|---|---|---|
| $i$ | $j$ | $k$ | $x_i$ | $y_j$ | $z_k$ | $V'_0(r_{x,i}, r_{y,j}, r_{z,k})$ | $A'(r_{x',i}, r_{y',j}, r_{z',k})$ |

FIG. 16

METHODS AND APPARATUS FOR POSITIONING A VEHICLE

CROSS-REFERENCE TO RELATED APPLICATIONS

This application claims the benefit of U.S. Provisional Application No. 62/350,653, filed Jun. 15, 2016, which is hereby incorporated by reference under 37 CFR 1.57.

FIELD

This application is generally related to wireless charging power transfer applications, and specifically to a method and apparatus for positioning a vehicle. More specifically the present disclosure relates to determining a position of the vehicle relative to a ground-based charging unit based on magnetic vector fields (magnetic vectoring) and on other auxiliary sensors and systems.

BACKGROUND

Efficiency in wireless inductive charging power applications depends at least in part on achieving at least a minimum alignment threshold between a wireless power transmitter and a wireless power receiver. One method for aiding such alignment is the use of magnetic vectoring, where a position of the wireless power receiver relative to the wireless power transmitter is determined based on sensing one or more attributes of a magnetic field generated at or near either the wireless power transmitter or the wireless power receiver. A position may include at least one of a distance, direction, and orientation of the wireless power receiver relative to the wireless power transmitter. However, determining a position accurately and with a minimum of ambiguity utilizing magnetic vectoring may involve a large number of calculation steps. Accordingly, a method and apparatus for positioning a vehicle as described herein are desirable.

SUMMARY

In some implementations, an apparatus for determining a position of vehicle is provided. The apparatus comprises a plurality of receive coils arranged in different geometric planes. Each of the plurality of receive coils is configured to generate a respective voltage signal from a wireless magnetic field generated by a field generator. The apparatus further comprises a hardware processor configured to generate a sequence of absolute position and orientation estimates of the field generator with respect to the receive coils, wherein each absolute pose estimate is determined based upon a voltage vector derived from a set of voltage signals generated by the plurality of receive coils and a stored vector map comprising a plurality of reference vectors. The hardware processor may be further configured to receive a sequence of relative position and orientation estimates. The hardware processor may be further configured to update the sequence of absolute position and orientation estimates, based upon the sequence of relative position and orientation estimates. The hardware processor may be further configured to determine a plurality of deviations by comparing the voltage vectors associated with the sequence of absolute position and orientation estimates with one or more corresponding reference vectors, wherein each corresponding reference vector comprises a reference vector of the stored vector map most closely corresponding to an absolute position and orientation estimate of the updated sequence of absolute position and orientation estimates. The hardware processor may be further configured to determine a modification function based upon the plurality of deviations. The hardware processor may be further configured to generate an updated vector map based on applying the modification function to the stored vector map.

In some implementations, an apparatus for determining positioning information for a vehicle is provided. The apparatus comprises a plurality of receive coil circuits configured to generate a set of voltage signals from a magnetic field generated by a magnetic field generator. The apparatus further comprises a hardware processor. The hardware processor is configured to generate a first sequence of position estimates of a position of the magnetic field generator with respect to a position of the plurality of receive coils. Each of the first sequence of position estimates is determined based upon a corresponding voltage vector derived from the set of voltage signals and at least one of a plurality of reference vectors. The hardware processor is further configured to update the plurality of reference vectors based upon the first sequence of position estimates and a second sequence of position estimates generated based upon a source different from the plurality of receive coil circuits.

In some implementations, a method for determining positioning information for a vehicle is provided. The method comprises generating, at a plurality of receive coils, a set of voltage signals in response to a magnetic field generated by a magnetic field generator. The method further comprises generating a first sequence of position estimates of a position of the magnetic field generator with respect to a position of the plurality of receive coils. Each of the first sequence of position estimates is determined based upon a corresponding voltage vector derived from the set of voltage signals and at least one of a plurality of reference vectors. The method further comprises updating the plurality of reference vectors based upon the first sequence of position estimates and a second sequence of position estimates generated based upon a source different from the plurality of receive coil circuits.

In some implementations, an apparatus for determining positioning information for a vehicle is provided. The apparatus comprises a plurality of means for generating a set of voltage signals from a magnetic field generated by a magnetic field generator. The apparatus further comprises means for generating a first sequence of position estimates of a position of the magnetic field generator with respect to a position of the plurality of means for generating a set of voltage signals, wherein each of the first sequence of position estimates is determined based upon a corresponding voltage vector derived from the set of voltage signals and at least one of a plurality of reference vectors. The apparatus further comprises means for updating the plurality of reference vectors based upon the first sequence of position estimates and a second sequence of position estimates.

In some implementations, a non-transitory, computer-readable storage medium is provided. The storage medium comprises code executable to generate, at a plurality of receive coils, a set of voltage signals in response to a magnetic field generated by a magnetic field generator. The storage medium further comprises code executable to generate a first sequence of position estimates of a position of the magnetic field generator with respect to a position of the plurality of receive coils. Each of the first sequence of position estimates is generated based upon a corresponding voltage vector derived from the set of voltage signals and at least one of a plurality of reference vectors. The storage medium further comprises code executable to update the plurality of reference vectors based upon the first sequence of position estimates and a second sequence of position estimates generated based upon a source different from the plurality of receive coil circuits.

BRIEF DESCRIPTION OF THE DRAWINGS

FIG. 16 illustrates an exemplary entry in a look up table (LUT) including position coordinates and associated 9D reference vector referring to a zero-rotated magnetic field sensor and associated 6D reference vector e.g. composed of scalar (dot) products of 3D reference vectors, in accordance with some implementations.

DETAILED DESCRIPTION

The detailed description set forth below in connection with the appended drawings is intended as a description of exemplary implementations and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 1:
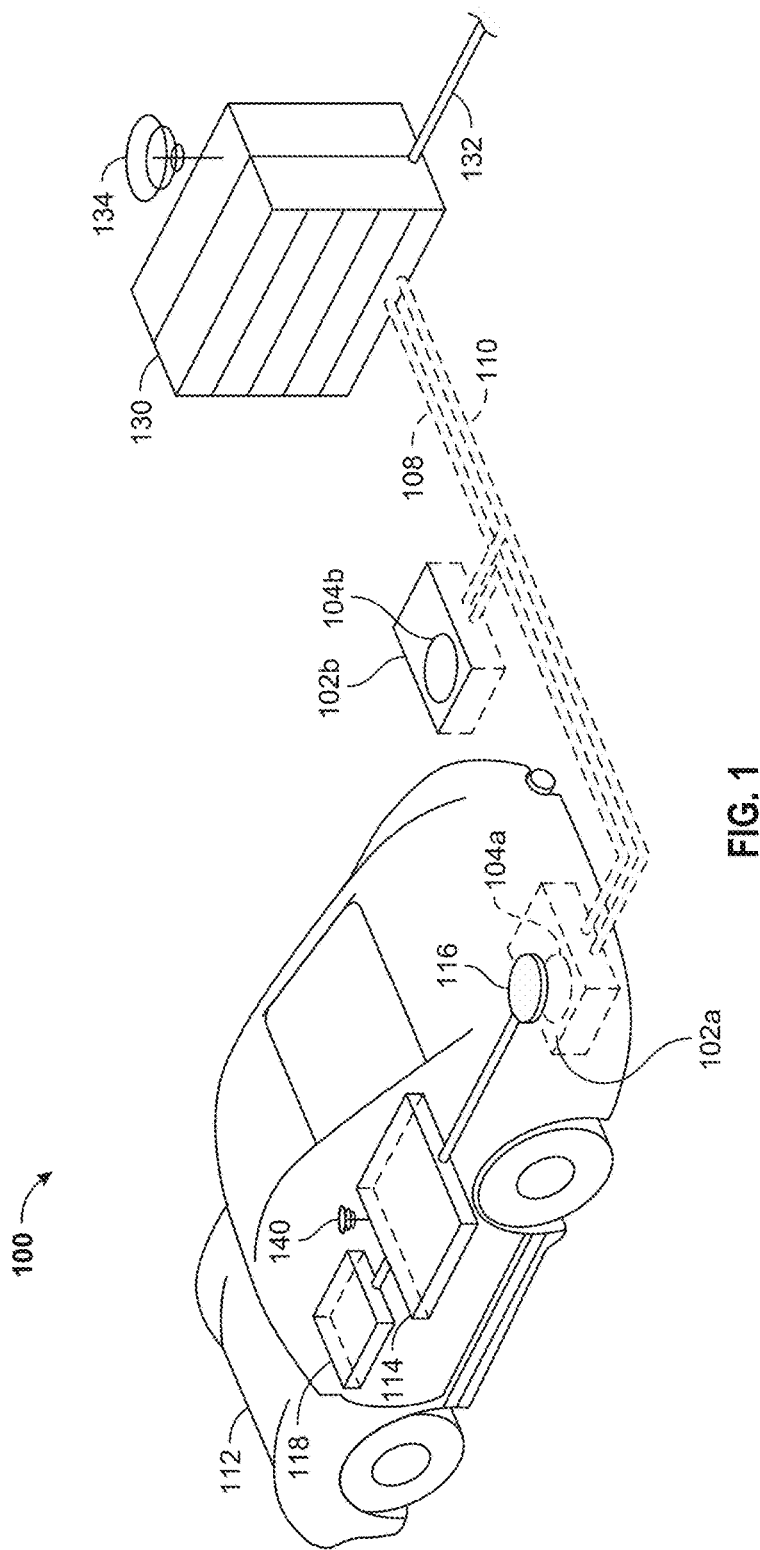
FIG. 1 illustrates a wireless power transfer system for charging an electric vehicle, in accordance with some implementations.

FIG. 1 is a diagram of an exemplary wireless power transfer system 100 for charging an electric vehicle 112, in accordance with some exemplary implementations. The wireless power transfer system 100 enables charging of an electric vehicle 112 while the electric vehicle 112 is parked so as to efficiently couple with a base wireless charging system 102a. Spaces for two electric vehicles are illustrated in a parking area to be parked over corresponding base wireless charging systems 102a and 102b. In some implementations, a local distribution center 130 may be connected to a power backbone 132 and configured to provide an alternating current (AC) or a direct current (DC) supply through a power link 110 to the base wireless charging systems 102a and 102b. Each of the base wireless charging systems 102a and 102b also includes a base coupler 104a and 104b, respectively, for wirelessly transferring power. In some other implementations (not shown in FIG. 1), base couplers 104a or 104b may be stand-alone physical units and are not part of the base wireless charging system 102a or 102b.

The electric vehicle 112 may include a battery unit 118, an electric vehicle coupler 116, and an electric vehicle wireless charging unit 114. The electric vehicle wireless charging unit 114 and the electric vehicle coupler 116 constitute the electric vehicle wireless charging system. In some diagrams shown herein, the electric vehicle wireless charging unit 114 is also referred to as the vehicle charging unit (VCU). The electric vehicle coupler 116 may interact with the base coupler 104a for example, via a region of the electromagnetic field generated by the base coupler 104a.

In some exemplary implementations, the electric vehicle coupler 116 may receive power when the electric vehicle coupler 116 is located in an electromagnetic field produced by the base coupler 104a. The field may correspond to a region where energy output by the base coupler 104a may be captured by the electric vehicle coupler 116. For example, the energy output by the base coupler 104a may be at a level sufficient to charge or power the electric vehicle 112. In some cases, the field may correspond to a "near-field" of the base coupler 104a. The near-field may correspond to a region in which there are strong reactive fields resulting from the currents and charges in the base coupler 104a that do not radiate power away from the base coupler 104a. In some cases the near-field may correspond to a region that is within about ½π of a wavelength of the a frequency of the electromagnetic field produced by the base coupler 104a distant from the base coupler 104a, as will be further described below.

Local distribution center 130 may be configured to communicate with external sources (e.g., a power grid) via a communication backhaul 134, and with the base wireless charging system 102a via a communication link 108.

In some implementations the electric vehicle coupler 116 may be aligned with the base coupler 104a and, therefore, disposed within a near-field region simply by the electric vehicle operator positioning the electric vehicle 112 such that the electric vehicle coupler 116 is sufficiently aligned relative to the base coupler 104a. Alignment may be considered sufficient when an alignment error has fallen below a tolerable value. In other implementations, the operator may be given visual and/or auditory feedback to determine when the electric vehicle 112 is properly placed within a tolerance area for wireless power transfer. In yet other implementations, the electric vehicle 112 may be positioned by an autopilot system, which may move the electric vehicle 112 until the sufficient alignment is achieved. This may be performed automatically and autonomously by the electric vehicle 112 with or without driver intervention. This may be possible for an electric vehicle 112 that is equipped with a servo steering, radar sensors (e.g., ultrasonic sensors), and intelligence for safely maneuvering and adjusting the electric vehicle. In still other implementations, the electric vehicle 112 and/or the base wireless charging system 102a may have functionality for mechanically displacing and moving the couplers 116 and 104a, respectively, relative to each other to more accurately orient or align them and develop sufficient and/or otherwise more efficient coupling there between.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention or manipulation, thereby improving convenience to a user. There may also be no exposed electrical contacts and no mechanical wear out, thereby improving reliability of the wireless power transfer system 100. Safety may be improved since manipulations with cables and connectors may not be needed and there may be no cables, plugs, or sockets to be exposed to moisture in an outdoor environment. In addition, there may also be no visible or accessible sockets, cables, or plugs, thereby reducing potential vandalism of power charging devices. Further, since the electric vehicle 112 may be used as distributed storage devices to stabilize a power grid, a convenient docking-to-grid solution may help to increase availability of vehicles for vehicle-to-grid (V2G) operation.

The wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that either the base wireless charging system 102a can transmit power to the electric vehicle 112 or the electric vehicle 112 can transmit power to the base wireless charging system 102a. This capability may be useful to stabilize the power distribution grid by allowing electric vehicles 112 to contribute power to the overall distribution system in times of energy shortfall caused by over demand or shortfall in renewable energy production (e.g., wind or solar).

Figure 2:
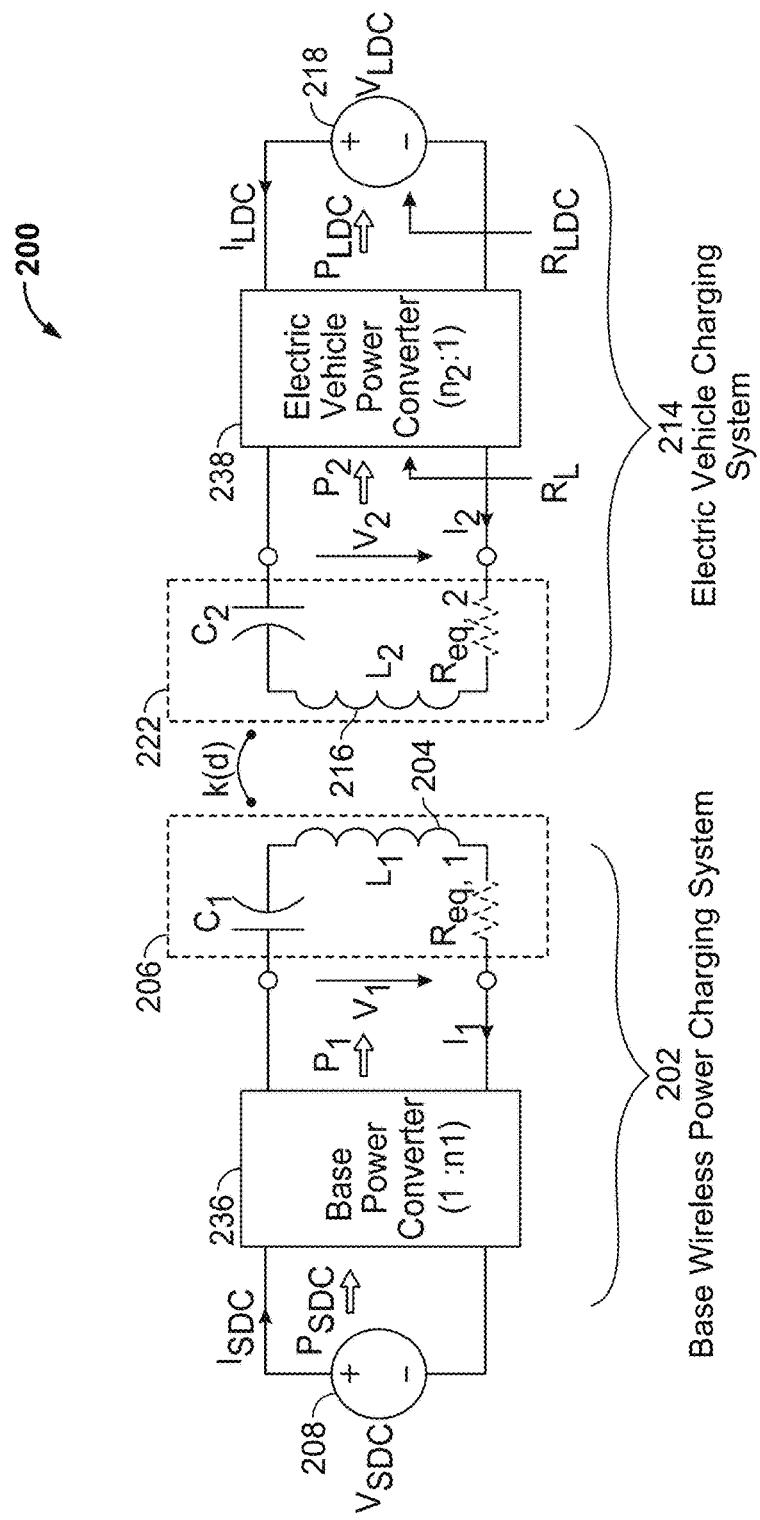
FIG. 2 is a schematic diagram of exemplary components of the wireless power transfer system of FIG. 1.

FIG. 2 is a schematic diagram of exemplary components of a wireless power transfer system 200 similar to that previously discussed in connection with FIG. 1, in accordance with some exemplary implementations. The wireless power transfer system 200 may include a base resonant circuit 206 including a base coupler 204 having an inductance $L_1$. The wireless power transfer system 200 further includes an electric vehicle resonant circuit 222 including an electric vehicle coupler 216 having an inductance $L_2$. Implementations described herein may use capacitively loaded conductor loops (i.e., multi-turn coils) forming a resonant structure that is capable of efficiently coupling energy from a primary structure (transmitter) to a secondary structure (receiver) via a magnetic or electromagnetic near-field if both the transmitter and the receiver are tuned to a common resonant frequency. The coils may be used for the electric vehicle coupler 216 and the base coupler 204. Using resonant structures for coupling energy may be referred to as "magnetically coupled resonance," "electromagnetically coupled resonance," and/or "resonant induction." The operation of the wireless power transfer system 200 will be described based on power transfer from a base coupler 204 to an electric vehicle 112 (not shown), but is not limited thereto. For example, as discussed above, energy may be also transferred in the reverse direction.

With reference to FIG. 2, a power supply 208 (e.g., AC or DC) supplies power $P_{SDC}$ to the base power converter 236 as part of the base wireless power charging system 202 to transfer energy to an electric vehicle (e.g., electric vehicle 112 of FIG. 1). The base power converter 236 may include circuitry such as an AC-to-DC converter configured to convert power from standard mains AC to DC power at a suitable voltage level, and a DC-to-low frequency (LF) converter configured to convert DC power to power at an operating frequency suitable for wireless high power transfer. The base power converter 236 supplies power $P_1$ to the base resonant circuit 206 including tuning capacitor $C_1$ in series with base coupler 204 to emit an electromagnetic field at the operating frequency. The series-tuned resonant circuit 206 should be construed as exemplary. In another implementation, the capacitor $C_1$ may be coupled with the base coupler 204 in parallel. In yet other implementations, tuning may be formed of several reactive elements in any combination of parallel or series topology. The capacitor $C_1$ may be provided to form a resonant circuit with the base coupler 204 that resonates substantially at the operating frequency. The base coupler 204 receives the power $P_1$ and wirelessly transmits power at a level sufficient to charge or power the electric vehicle. For example, the level of power provided wirelessly by the base coupler 204 may be on the order of kilowatts (kW) (e.g., anywhere from 1 kW to 110 kW, although actual levels may be or higher or lower).

The base resonant circuit 206 (including the base coupler 204 and tuning capacitor $C_1$) and the electric vehicle resonant circuit 222 (including the electric vehicle coupler 216 and tuning capacitor $C_2$) may be tuned to substantially the same frequency. The electric vehicle coupler 216 may be positioned within the near-field of the base coupler and vice versa, as further explained below. In this case, the base coupler 204 and the electric vehicle coupler 216 may become coupled to one another such that power may be transferred wirelessly from the base coupler 204 to the electric vehicle coupler 216. The series capacitor $C_2$ may be provided to form a resonant circuit with the electric vehicle coupler 216 that resonates substantially at the operating frequency. The series-tuned resonant circuit 222 should be construed as being exemplary. In another implementation, the capacitor $C_2$ may be coupled with the electric vehicle coupler 216 in parallel. In yet other implementations, the electric vehicle resonant circuit 222 may be formed of several reactive elements in any combination of parallel or series topology. Element k(d) represents the mutual coupling coefficient resulting at coil separation d. Equivalent resistances $R_{eq,1}$ and $R_{eq,2}$ represent the losses that may be inherent to the base and electric vehicle couplers 204 and 216 and the tuning (anti-reactance) capacitors $C_1$ and $C_2$, respectively. The electric vehicle resonant circuit 222, including the electric vehicle coupler 216 and capacitor $C_2$, receives and provides the power $P_2$ to an electric vehicle power converter 238 of an electric vehicle charging system 214.

The electric vehicle power converter 238 may include, among other things, a LF-to-DC converter configured to convert power at an operating frequency back to DC power at a voltage level of the load 218 that may represent the electric vehicle battery unit. The electric vehicle power converter 238 may provide the converted power $P_{LDC}$ to the load 218. The power supply 208, base power converter 236, and base coupler 204 may be stationary and located at a variety of locations as discussed above. The electric vehicle load 218 (e.g., the electric vehicle battery unit), electric vehicle power converter 238, and electric vehicle coupler 216 may be included in the electric vehicle charging system 214 that is part of the electric vehicle (e.g., electric vehicle 112) or part of its battery pack (not shown). The electric vehicle charging system 214 may also be configured to provide power wirelessly through the electric vehicle coupler 216 to the base wireless power charging system 202 to feed power back to the grid. Each of the electric vehicle coupler 216 and the base coupler 204 may act as transmit or receive couplers based on the mode of operation.

While not shown, the wireless power transfer system 200 may include a load disconnect unit (LDU) (not known) to safely disconnect the electric vehicle load 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle coupler 216 to the electric vehicle power converter 238. Disconnecting the electric vehicle coupler 216 may suspend charging and also may change the "load" as "seen" by the base wireless power charging system 202 (acting as a transmitter), which may be used to "cloak" the electric vehicle charging system 214 (acting as the receiver) from the base wireless charging system 202. The load changes may be detected if the transmitter includes a load sensing circuit. Accordingly, the transmitter, such as the base wireless charging system 202, may have a mechanism for determining when receivers, such as the electric vehicle charging system 214, are present in the near-field coupling mode region of the base coupler 204 as further explained below.

As described above, in operation, during energy transfer towards an electric vehicle (e.g., electric vehicle 112 of FIG. 1), input power is provided from the power supply 208 such that the base coupler 204 generates an electromagnetic field for providing the energy transfer. The electric vehicle coupler 216 couples to the electromagnetic field and generates output power for storage or consumption by the electric vehicle 112. As described above, in some implementations, the base resonant circuit 206 and electric vehicle resonant circuit 222 are configured and tuned according to a mutual resonant relationship such that they are resonating nearly or substantially at the operating frequency. Transmission losses between the base wireless power charging system 202 and electric vehicle charging system 214 are minimal when the electric vehicle coupler 216 is located in the near-field coupling mode region of the base coupler 204 as further explained below.

As stated, an efficient energy transfer occurs by transferring energy via a magnetic near-field rather than via electromagnetic waves in the far field, which may involve substantial losses due to radiation into the space. When in the near-field, a coupling mode may be established between the transmit coupler and the receive coupler. The space around the couplers where this near-field coupling may occur is referred to herein as a near-field coupling mode region.

While not shown, the base power converter 236 and the electric vehicle power converter 238 if bidirectional may both include, for the transmit mode, an oscillator, a driver circuit such as a power amplifier, a filter and matching circuit, and for the receive mode a rectifier circuit. The oscillator may be configured to generate a desired operating frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance as presented by the resonant circuits 206 and 222 to the base and electric vehicle power converters 236 and 238, respectively. For the receive mode, the base and electric vehicle power converters 236 and 238 may also include a rectifier and switching circuitry.

The electric vehicle coupler 216 and base coupler 204 as described throughout the disclosed implementations may be referred to or configured as "conductor loops", and more specifically, "multi-turn conductor loops" or coils. The base and electric vehicle couplers 204 and 216 may also be referred to herein or be configured as "magnetic" couplers. The term "coupler" is intended to refer to a component that may wirelessly output or receive energy for coupling to another "coupler."

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency.

A resonant frequency may be based on the inductance and capacitance of a resonant circuit (e.g. resonant circuit 206) including a coupler (e.g., the base coupler 204 and capacitor $C_2$) as described above. As shown in FIG. 2, inductance may generally be the inductance of the coupler, whereas, capacitance may be added to the coupler to create a resonant structure at a desired resonant frequency. Accordingly, for larger size couplers using larger diameter coils exhibiting larger inductance, the value of capacitance needed to produce resonance may be lower. Inductance may also depend on a number of turns of a coil. Furthermore, as the size of the coupler increases, coupling efficiency may increase. This is mainly true if the size of both base and electric vehicle couplers increase. Furthermore a resonant circuit including a coupler and tuning capacitor may be designed to have a high quality (Q) factor to improve energy transfer efficiency. For example, the Q factor may be 300 or greater.

As described above, according to some implementations, coupling power between two couplers that are in the near-field of one another is disclosed. As described above, the near-field may correspond to a region around the coupler in which mainly reactive electromagnetic fields exist. If the physical size of the coupler is much smaller than the wavelength, inversely proportional to the frequency, there is no substantial loss of power due to waves propagating or radiating away from the coupler. Near-field coupling-mode regions may correspond to a volume that is near the physical volume of the coupler, typically within a small fraction of the wavelength. According to some implementations, magnetic couplers, such as single and multi-turn conductor loops, are preferably used for both transmitting and receiving since handling magnetic fields in practice is easier than electric fields because there is less interaction with foreign objects, e.g., dielectric objects and the human body. Nevertheless, "electric" couplers (e.g., dipoles and monopoles) or a combination of magnetic and electric couplers may be used.

Figure 3:
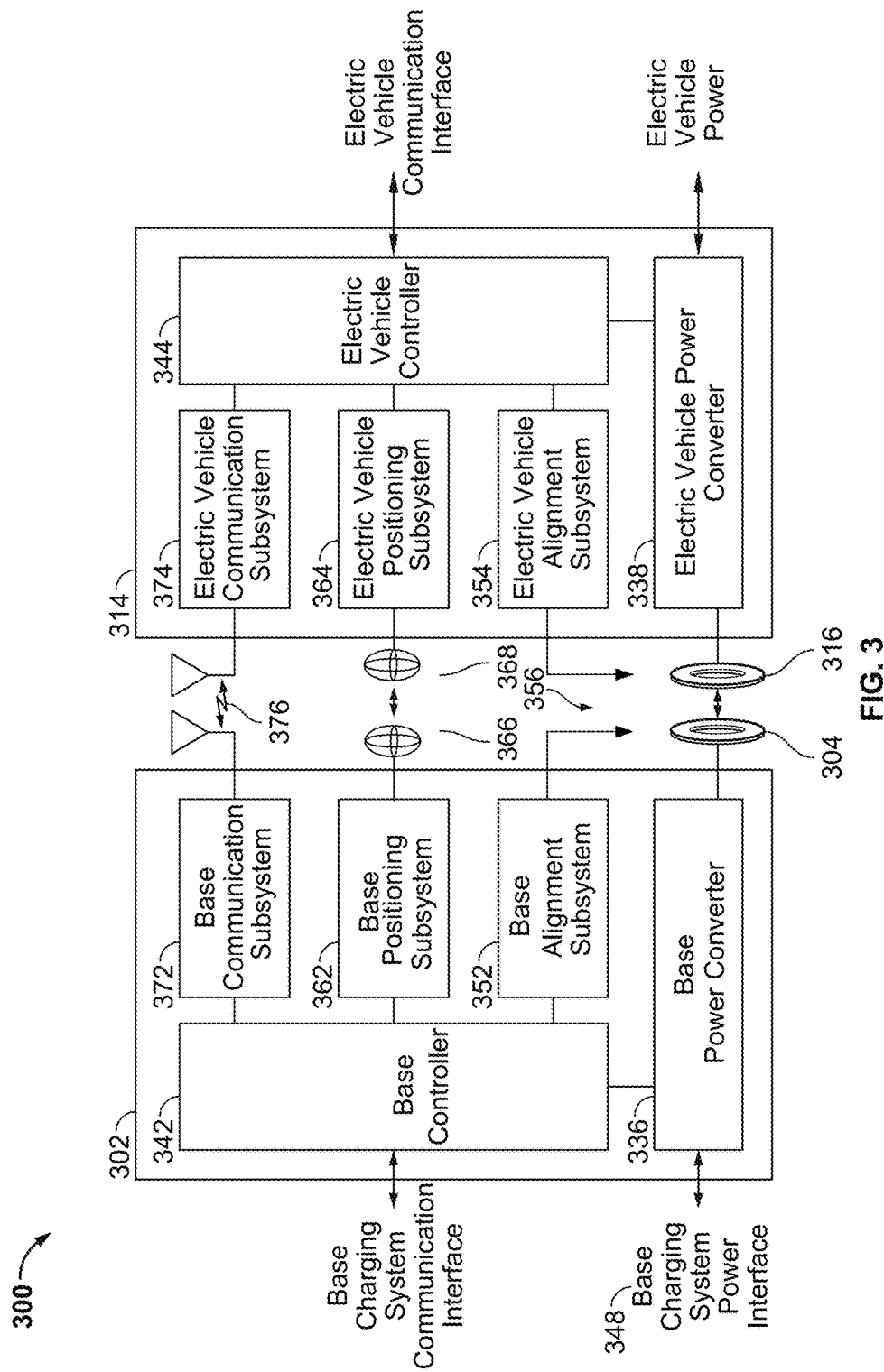
FIG. 3 is a functional block diagram showing exemplary components of the wireless power transfer system of FIG. 1.

FIG. 3 is a functional block diagram showing exemplary components of wireless power transfer system 300, which may be employed in wireless power transfer system 100 of FIG. 1 and/or that wireless power transfer system 200 of FIG. 2 may be part of The wireless power transfer system 300 illustrates a communication link 376, a positioning link 366, using, for example, a magnetic field signal for determining a position or direction, and an alignment mechanism 356 capable of mechanically moving one or both of the base coupler 304 and the electric vehicle coupler 316. Mechanical (kinematic) alignment of the base coupler 304 and the electric vehicle coupler 316 may be controlled by the base alignment subsystem 352 and the electric vehicle charging alignment subsystem 354, respectively. The positioning link 366 may be capable of bi-directional signaling, meaning that positioning signals may be emitted by the base positioning subsystem or the electric vehicle positioning subsystem or by both. As described above with reference to FIG. 1, when energy flows towards the electric vehicle 112, in FIG. 3 a base charging system power interface 348 may be configured to provide power to a base power converter 336 from a power source, such as an AC or DC power supply (not shown). The base power converter 336 may receive AC or DC power via the base charging system power interface 348 to drive the base coupler 304 at a frequency near or at the resonant frequency of the base resonant circuit 206 with reference to FIG. 2. The electric vehicle coupler 316, when in the near-field coupling-mode region, may receive energy from the electromagnetic field to oscillate at or near the resonant frequency of the electric vehicle resonant circuit 222 with reference to FIG. 2. The electric vehicle power converter 338 converts the oscillating signal from the electric vehicle coupler 316 to a power signal suitable for charging a battery via the electric vehicle power interface.

The base wireless charging system 302 includes a base controller 342 and the electric vehicle wireless charging system 314 includes an electric vehicle controller 344. The base controller 342 may provide a base charging system communication interface to other systems (not shown) such as, for example, a computer, a base common communication (BCC), a communications entity of the power distribution center, or a communications entity of a smart power grid. The electric vehicle controller 344 may provide an electric vehicle communication interface to other systems (not shown) such as, for example, an on-board computer on the vehicle, a battery management system, other systems within the vehicles, and remote systems.

The base communication subsystem 372 and electric vehicle communication subsystem 374 may include subsystems or modules for specific application with separate communication channels and also for wirelessly communicating with other communications entities not shown in the diagram of FIG. 3. These communications channels may be separate physical channels or separate logical channels. As non-limiting examples, a base alignment subsystem 352 may communicate with an electric vehicle alignment subsystem 354 through communication link 376 to provide a feedback mechanism for more closely aligning the base coupler 304 and the electric vehicle coupler 316, for example via autonomous mechanical (kinematic) alignment, by either the electric vehicle alignment subsystem 354 or the base alignment subsystem 352, or by both, or with operator assistance as described herein.

The electric vehicle wireless charging system 314 may further include an electric vehicle positioning subsystem 364 connected to a magnetic field generator 368. The electric vehicle positioning subsystem 364 may be configured to drive the magnetic field generator 368 with currents that generate an alternating magnetic field. The base wireless charging system 302 may include a magnetic field sensor 366 connected to a base positioning subsystem 362. The magnetic field sensor 366 may be configured to generate a plurality of voltage signals under influence of the alternating magnetic field generated by the magnetic field generator 368. The base positioning subsystem 362 may be configured to receive these voltage signals and output a signal indicative of a position estimate and an angle estimate between the magnetic field sensor 366 and the magnetic field sensor 368, as will be described in more detail in connection with FIGS. 4-37. These position and angle estimates may be translated into visual and/or acoustic guidance and alignment information that a driver of the electric vehicle may use to reliably park the vehicle. In some implementations, these position and angle estimates may be used to park a vehicle automatically with no or only minimal driver intervention (drive by wire).

Figure 4:
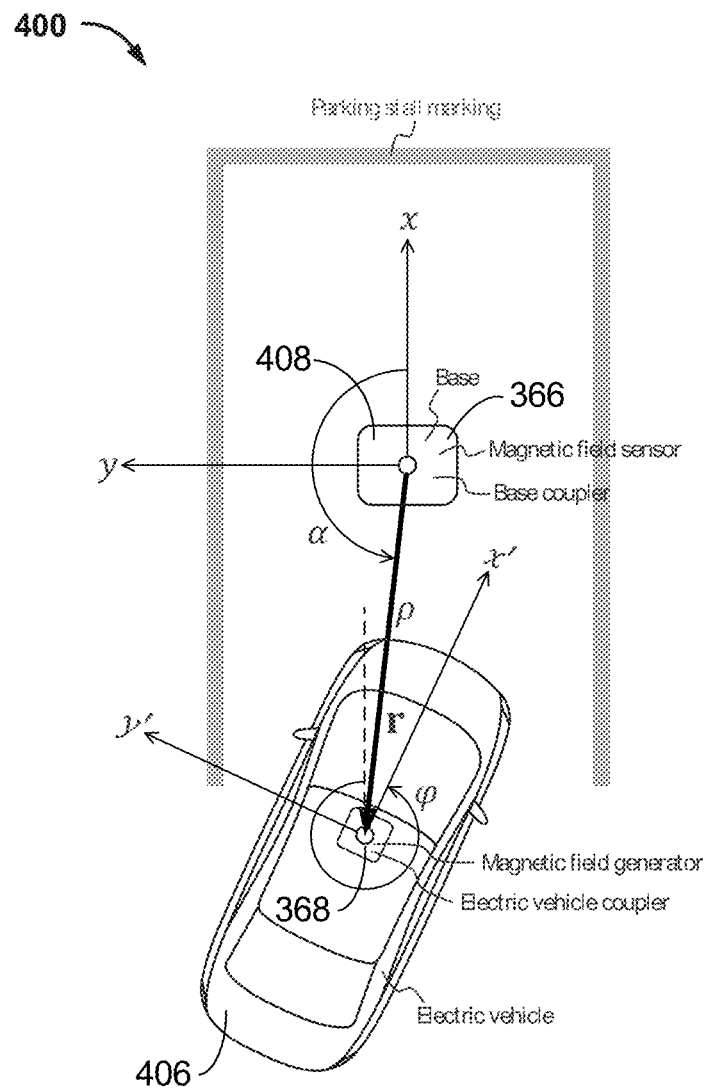
FIG. 4 is a diagram illustrating a positional relationship between the vehicle-based magnetic field generator and the ground-based magnetic field sensor of FIG. 3 in the sensor's (base) coordinate frame.
Figure 5:
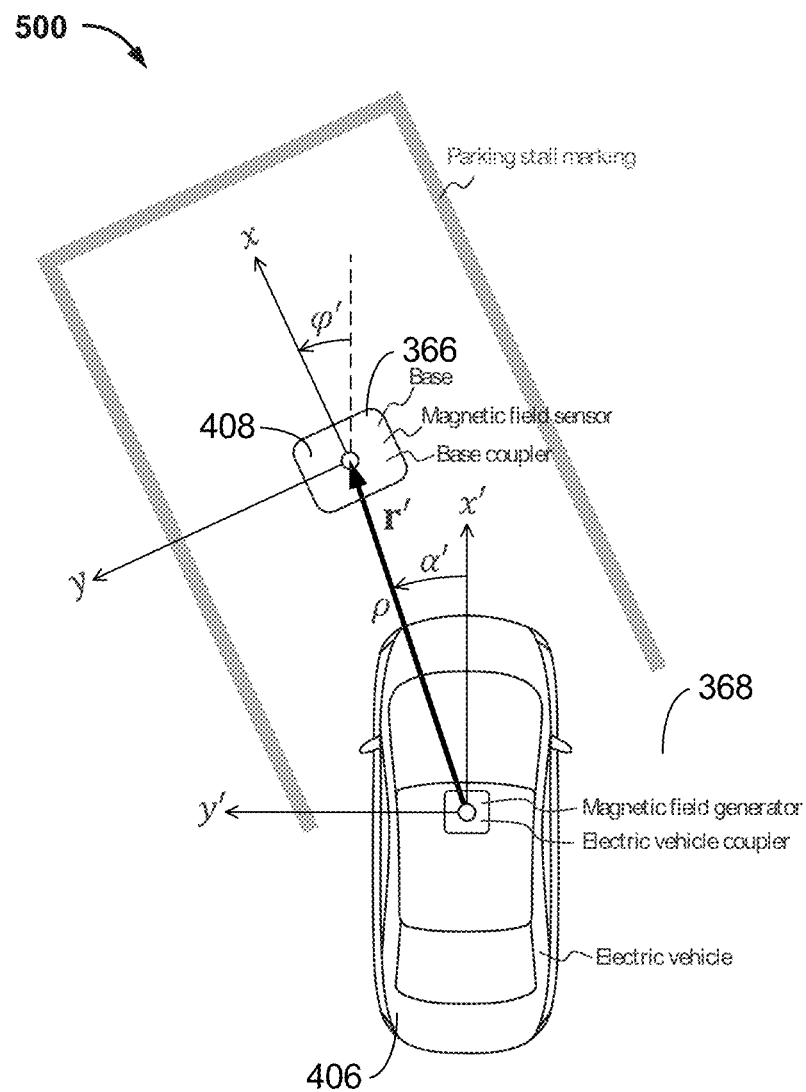
FIG. 5 is a diagram illustrating a positional relationship between the ground-based magnetic field sensor of FIG. 3 and the vehicle-based magnetic field generator and the in the generator's (vehicle) coordinate frame.

In some implementations, the positioning error (error in the position estimates) at offsets (distances) <20 cm may be specified to <2 cm, and for distances >20 cm to <10% of distance, e.g., <10 cm at a distance of 1 m and <50 cm at a distance of 5 m, where the distance may refer to a horizontal distance between the magnetic centers of the magnetic field generator 368 and the magnetic field sensor 366 as defined in connection with FIGS. 4 and 5. The positioning error may refer to the error magnitude (error radius) corresponding to a particular percentile of measured position error statistics, e.g., the $90^{th}$ percentile, corresponding to the error value below which 90% of the measured position error magnitudes may be found. Accordingly, the orientation error (error in the angle estimate) at distances <20 cm may be specified to <2°, and for distances >20 cm to <5°.

Further, electric vehicle controller 344 may be configured to communicate with electric vehicle onboard systems. For example, electric vehicle controller 344 may provide, via the electric vehicle communication interface, position data, e.g., for a brake system configured to perform a semi-automatic parking operation, or for a steering servo system configured to assist with a largely automated parking ("park by wire") that may provide more convenience and/or higher parking accuracy as may be needed in certain applications to provide sufficient alignment between base and electric vehicle couplers 304 and 316. Moreover, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

The wireless power transfer system 300 may also support plug-in charging via a wired connection, for example, by providing a wired charge port (not shown) at the electric vehicle wireless charging system 314. The electric vehicle wireless charging system 314 may integrate the outputs of the two different chargers prior to transferring power to or from the electric vehicle. Switching circuits may provide the functionality as needed to support both wireless charging and charging via a wired charge port.

To communicate between the base wireless charging system 302 and the electric vehicle wireless charging system 314, the wireless power transfer system 300 may use in-band signaling via base and electric vehicle couplers 304, 316 and/or out-of-band signaling via communications systems (372, 374), e.g., via an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In some implementations, some communications (e.g., in-band signaling) may be performed via the wireless power link without using specific communications antennas. For example, the base and electric vehicle couplers 304 and 316 may also be configured to act as wireless communication antennas. Thus, some implementations of the base wireless charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base power converter 336 may include a load sensing circuit (not shown) for detecting the presence or absence of active electric vehicle power receivers in the near-field coupling mode region of the base coupler 304. By way of example, a load sensing circuit monitors the current flowing to a power amplifier of the base power converter 336, which is affected by the presence or absence of active power receivers in the near-field coupling mode region of the base coupler 304. Detection of changes to the loading on the power amplifier may be monitored by the base controller 342 for use in determining whether to enable the base wireless charging system 302 for transmitting energy, to communicate with a receiver, or a combination thereof.

FIG. 4 is a diagram 400 illustrating an exemplary positional relationship between the vehicle-based magnetic field generator 368 and the ground-based magnetic field sensor 366 of FIG. 3 in the sensor's 366 coordinate frame. The sensor 366 may be associated with perpendicular x- and y-coordinate axes of the sensor's 366 coordinate frame. The generator 368 may be associated with perpendicular x'- and y'-coordinate axes of the generator's 368 coordinate frame. A position vector $\vec{r}=\overrightarrow{OP}$, having length ρ, is illustrated. O and P denote the magnetic center points of the magnetic field sensor 366 and the magnetic field generator 368, respectively. The rotation of the generator's 368 coordinate frame with respect to the sensor's 366 coordinate frame may be defined by the angle of rotation φ measured from the dashed line parallel to the x-axis. Using polar coordinates, the magnetic field generator's 368 position and rotation relative to the magnetic field sensor 366 may be defined by the distance ρ (length of r), the azimuth angle α measured from the x-axis, and the angle of rotation φ, respectively. In some implementations, this positional relationship between the vehicle-based magnetic field generator 368 and the ground-based magnetic field sensor 366 in the sensor's 366 coordinate frame may correspond to the positional relationship of the vehicle (406) and the base (408) in the base's (408) coordinate frame. FIG. 4 does not show the respective (vertical) z- and z'-axes of the coordinate frames of the sensor 366 and the generator 368 that would extend out the front of the page.

FIG. 5 is a diagram 500 illustrating an exemplary positional relationship between the ground-based magnetic field sensor 366 and the vehicle-based magnetic field generator 368 of FIG. 3 in the generator's 368 coordinate frame. The perpendicular x- and y-coordinate axes of the sensor's 366 coordinate frame, and the perpendicular x'- and y'-coordinate axes of the generator's 368 coordinate frame are shown.

A position vector $\vec{r}'=\overrightarrow{O'P'}$, having length ρ, is illustrated, where O' and P' denote the magnetic center points of the magnetic field generator 368 and the magnetic field sensor 366, respectively. The rotation of the sensor's 366 coordinate frame with respect to the generator's 368 coordinate frame may be defined by the angle of azimuthal rotation φ' measured from the x'-axis. Using polar coordinates, the magnetic field sensor's 366 position and rotation may be defined by azimuth angle α' measured from the dashed line parallel to the x'-axis, the distance ρ (length of r'), and the angle of azimuthal rotation φ', respectively. In some implementations, this positional relationship between the ground-based magnetic field sensor 366 and the vehicle-based magnetic field generator 368 in the generator's 368 coordinate frame may correspond to the positional relationship of the base (408) and the vehicle (406) in the vehicle's (406) coordinate frame. As FIG. 4, FIG. 5 does not show corresponding (vertical) z- and z'-axis that would extend out the front of the page.

Figure 6:
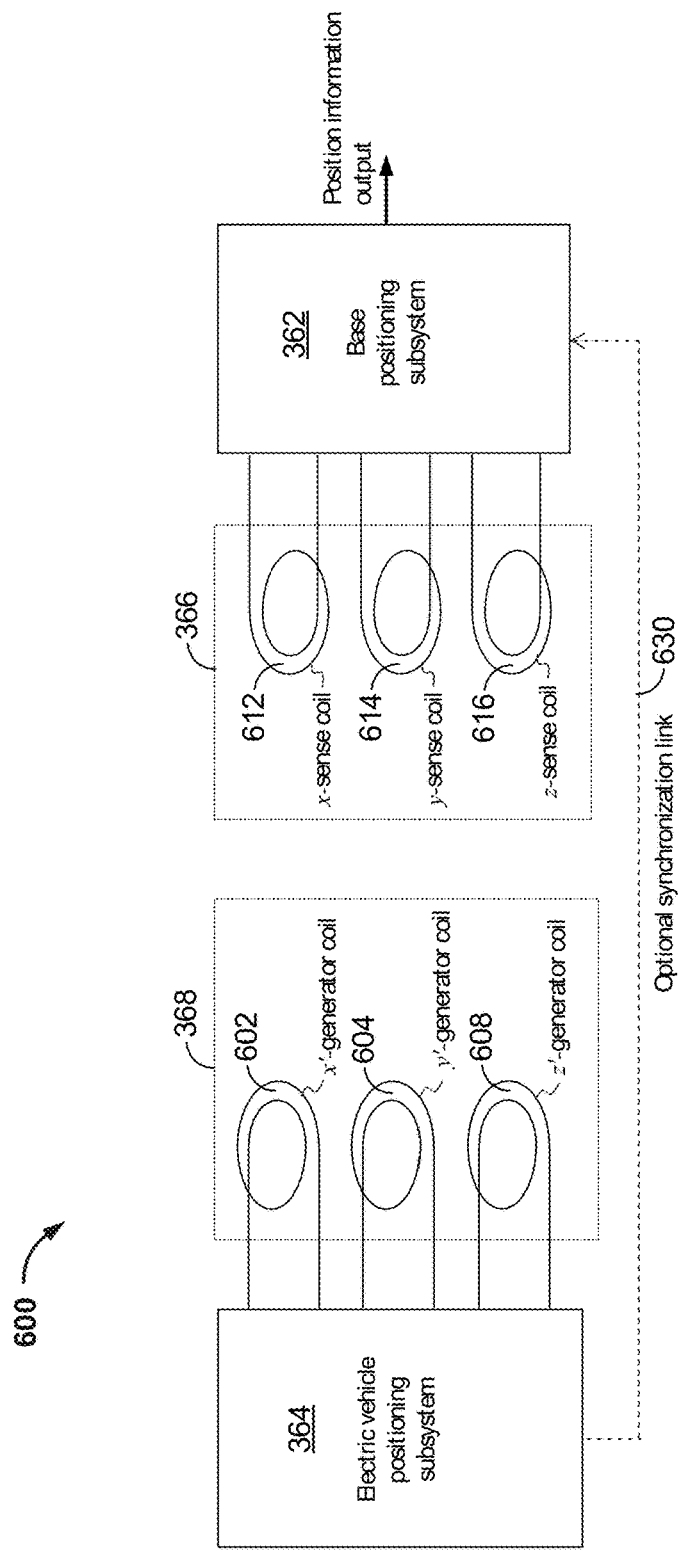
FIG. 6 is a block diagram illustrating a magnetic field based positioning system, in accordance with some implementations.

FIG. 6 is a block diagram illustrating a magnetic field based positioning system 600, in accordance with some implementations. The magnetic field based positioning system 600 includes the electric vehicle positioning subsystem 364 of FIG. 3. The electric vehicle positioning subsystem 364 is configured to drive each of a plurality of generator coils 602, 604, 606 of the magnetic field generator 368 with respective alternating currents. The generator coils 602, 604, 606 may have a physical orientation and construction corresponding to the coils 702, 704, 706 described in connection with FIG. 7 to generate magnetic fields with magnetic moments in a x'-, y'-, and z'-axis direction, respectively. The alternating currents generate an alternating magnetic field that may be used for position and orientation finding.

The magnetic field based positioning system 600 further includes the magnetic field sensor 366 of FIG. 3 that comprises a plurality of sense coils 612, 614, 616. The sense coils 612, 614, 616 may have a physical orientation and construction corresponding to the coils 712, 714, 716 described in connection with FIG. 7 to sense magnetic field components in a x-, y-, and z-axis direction, respectively. The plurality of sense coils 612, 614, 616 are configured to generate voltage signals based on an amount of magnetic flux passing through their windings. The base positioning subsystem 362 is configured to receive the voltage signals from the plurality of sense coils 612, 614, 616 and output information indicative of a position based thereon.

In some implementations, the magnetic field based positioning system 600 is further configured to include an optional synchronization link 630 configured to establish time or phase synchronization between the electric vehicle positioning subsystem 364 and the base positioning subsystem 362.

While FIG. 6 illustrates a magnetic field based positioning system 600 having three sense coils 612, 614, 616 and three generators coils 602, 604, 606 (e.g., a 3-axis sensor and a 3-axis generator), it is understood that in other implementations, a magnetic field based positioning system may have different numbers of sense coils or generator coils. For example, in some implementations, the magnetic field based positioning system 600 may comprise a 2-axis generator and a 3-axis sensor. In such implementations, one of the plurality of generator coils 602, 604, 606 may be omitted or alternatively driven with zero current. Similarly, in some implementations, the magnetic field based positioning system 600 may comprise a 3-axis generator and a 2-axis sensor. In such implementations, one of the plurality of sense coils 612, 614, 616 may be omitted or alternatively electrically disconnected from the base positioning subsystem 362. In some implementations, the magnetic field based positioning system 600 may comprise a 2-axis generator and a 2-axis sensor.

Figure 7:
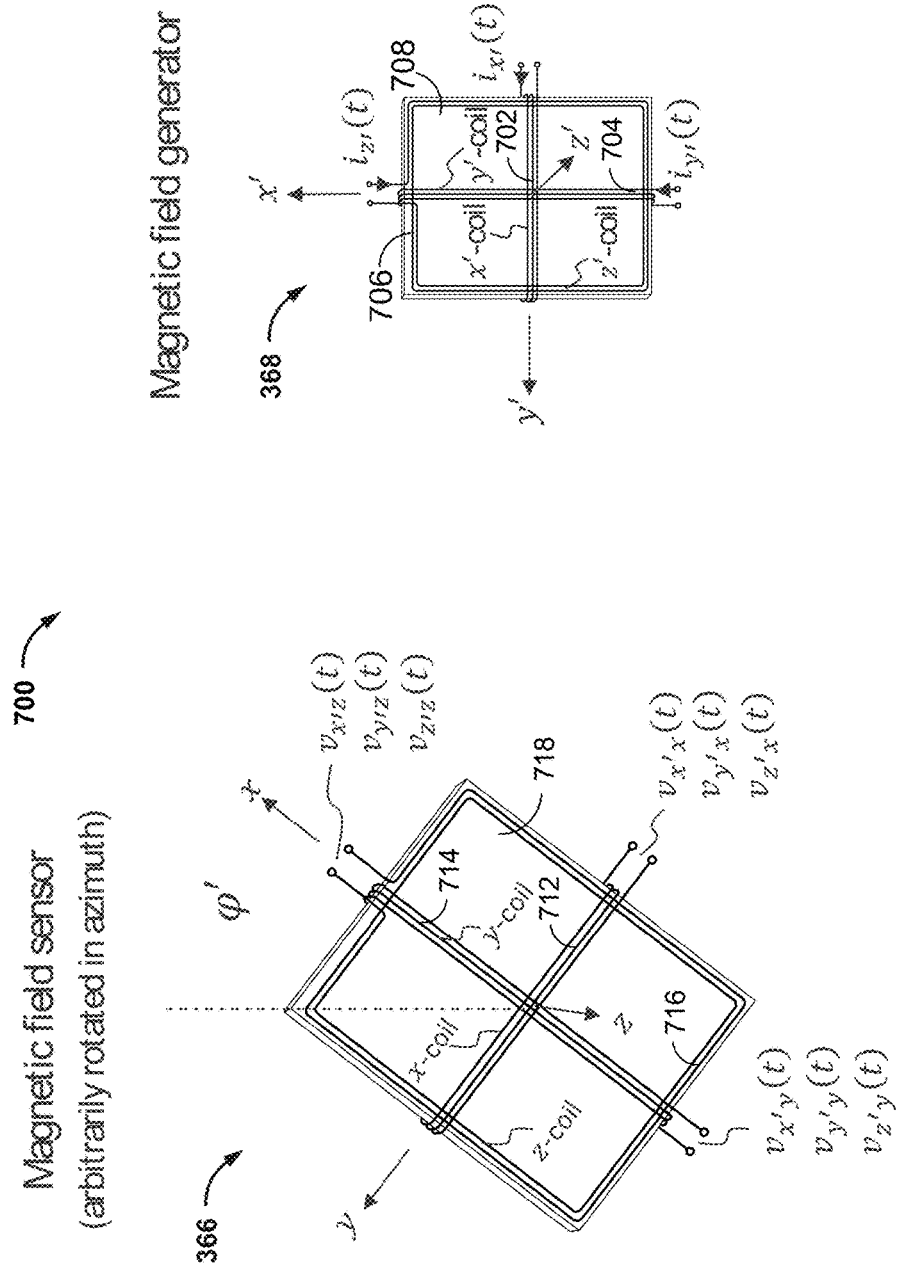
FIG. 7 is a diagram referring to FIG. 6 illustrating 3-axis orthogonal coil arrangements and flow of currents in coils of the 3-axis magnetic field generator and induced voltages in coils of the 3-axis magnetic field sensor, in accordance with some implementations.

FIG. 7 illustrates a 3-axis magnetic field generator 368 and a 3-axis magnetic field sensor 366 as used for magnetic vectoring, in accordance with some implementations. The magnetic field generator 368 may comprise a ferrite structure 708 and three generator coils 702, 704, 706, each wound on or around the ferrite structure 708 in mutually orthogonal planes. In some implementations, the generator coil 706 may be disposed along a perimeter of a largest surface of the ferrite structure 708. Alternatively, the generator coil 706 may be wound on the edges of the ferrite structure 708. Likewise, the magnetic field sensor 366 may comprise a ferrite structure 718 and three sense coils 712, 714, 716, each wound on or around the ferrite structure 718 in mutually orthogonal planes. In some implementations, the sense coil 716 may be disposed along a perimeter of a largest surface of the ferrite structure 718 or, alternatively, may be wound on the edges of the ferrite structure 718.

In some implementations, the ferrite structure 718 may be shared between the wireless power transfer base coupler 304 and the magnetic field sensor 366 as shown in FIG. 3. In some implementations, sharing the ferrite structure 718 may enable a larger ferrite structure 718 to be used. A larger ferrite structure 718 may capture more magnetic flux, which may in turn allow the base positioning subsystem 362 to provide a more accurate vehicle position or to operate over a larger range. In some other implementations, at least one of the sense coils 712, 714, 716 may also function as a coil for wireless power transmission. Likewise, in some implementations the ferrite structure 708 may be shared between the wireless power transfer vehicle coupler 316 and the magnetic field generator 368 as shown in FIG. 3, enabling the ferrite structure 708 to be larger. In some other implementations, at least one of the generator coils 702, 704, 706 may also function as a coil for wireless power transmission. In some implementations, by reusing structures for multiple purposes, a reduced component count to be achieved, which may also reduce fabrication costs.

FIG. 7 shows flow of currents in coils 702, 704, 706 of the 3-axis magnetic field generator 368, corresponding to coils 602, 604, 606 of FIG. 6. FIG. 7 also shows voltages at the terminals of the sense coils 712, 714, 716 of the 3-axis magnetic field sensor 366, corresponding to coils 612, 614, 616 of FIG. 6. The sensor 366 is illustrated as having an arbitrary rotation angle $\varphi'$ with respect to an orientation aligned to the generator 368. In some implementations, this angle refers to an azimuthal rotation angle.

In some implementations, physical restrictions for the position of the sensor 366 with respect to the generator 368 apply. In an implementation in accordance with FIGS. 4 and 5 with the magnetic field generator 368 aboard the vehicle 406 and the magnetic field sensor 366 in the base 408, the position and orientation of the sensor 366 is normally physically restricted to the lower half space and to a substantially horizontal orientation with respect to the generator's 368 coordinate frame, so that $$r_{z'} < 0, \tag{1}$$

$$\theta' \cong \psi' \cong 0 \tag{2}$$

holds, where angles $\theta'$ and $\psi'$ may refer to Euler angles and more specifically to the pitch and yaw rotation angle of the sensor's 366 coordinate frame with respect to the generator's 368 coordinate frame.

In operation, the electric vehicle positioning subsystem 364 may drive the generator coils 702, 704, 706 with respective alternating currents $i_{x'}(t)$, $i_{y'}(t)$ and $i_{z'}(t)$ to generate magnetic fields having magnetic moments in orthogonal axis directions, e.g., on a x'-, y'-, and z'-axis of the generator's 368 coordinate frame as indicated in FIG. 7. Magnetic flux from the fields generated by the generator coils 702, 704, 706 may flow through the sense coils 712, 714, 716 and generate respective voltage signals $v_{x'x}(t)$, $v_{x'y}(t)$, $v_{x'z}(t)$, $v_{y'x}(t)$, $v_{y'y}(t)$, $v_{y'z}(t)$, $v_{z'x}(t)$, $v_{z'y}(t)$, and $v_{z'z}(t)$ across the terminals of each of the sense coils 712, 714, 716, where e.g., $v_{y'x}(t)$ denotes the voltage induced into the x-sense coil by the y'-magnetic field.

In order to differentiate between the magnetic field components generated by each of the generator coils 702, 704, 706, the electric vehicle positioning subsystem 364 may employ a field multiplexing scheme. In some implementations, the electric vehicle positioning subsystem 364 employs a frequency division multiplexing (FDM) scheme, by driving each of the generator coils concurrently with sinusoidal currents oscillating at respective frequencies $f_{x'}$, $f_{y'}$, and $f_{z'}$. In mathematical terms, these excitation current signals may be expressed as $$i_{x'}(t) = I_{x'} \sin(2\pi f_{x'} t), \tag{3}$$

$$i_{y'}(t) = I_{y'} \sin(2\pi f_{y'} t), \tag{4}$$

$$i_{z'}(t) = I_{z'} \sin(2\pi f_{z'} t), \tag{5}$$

where $I_{x'}$, $I_{y'}$ and $I_{z'}$ denote the peak amplitude of the oscillating current.

In some implementations, $f_{x'}$, $f_{y'}$, and $f_{z'}$ may be equally spaced in frequency. In other implementations, $f_{x'}$, $f_{y'}$, $f_{z'}$ may not be equally spaced. In some other implementations, the electric vehicle positioning subsystem 364 may employ a time division multiplexing (TDM) scheme. In yet other implementations, it may use code division multiplexing (CDM). These alternative schemes are not further described herein.

In some implementations, for the mathematical treatment of a magnetic field based positioning system 600, coil excitation currents may be represented in vector form as:

$$I_{x'} = \begin{bmatrix} I_{x'} \\ 0 \\ 0 \end{bmatrix}, I_{y'} = \begin{bmatrix} 0 \\ I_{y'} \\ 0 \end{bmatrix}, I_{z'} = \begin{bmatrix} 0 \\ 0 \\ I_{z'} \end{bmatrix}, \tag{6}$$

where $I_{x'}$, $I_{y'}$, and $I_{z'}$ may refer to the peak or r.m.s. level. Current vectors may be also combined to a 3×3 current matrix:

$$[I'] = [I_{x'} \ I_{y'} \ I_{z'}] = \begin{bmatrix} I_{x'} & 0 & 0 \\ 0 & I_{y'} & 0 \\ 0 & 0 & I_{z'} \end{bmatrix}. \tag{7}$$

Analogously, a 3×3 matrix may be also defined for the angular frequencies of the excitation currents:

$$[\omega'] = \begin{bmatrix} \omega_{x'} & 0 & 0 \\ 0 & \omega_{y'} & 0 \\ 0 & 0 & \omega_{z'} \end{bmatrix} = \begin{bmatrix} 2\pi f_{x'} & 0 & 0 \\ 0 & 2\pi f_{y'} & 0 \\ 0 & 0 & 2\pi f_{z'} \end{bmatrix}. \tag{8}$$

In some implementations using FDM, the electric vehicle positioning subsystem drives the generator coils 702, 704, 706 each with equal peak or rms current levels so that $$I_{x'}=I_{y'}=I_{z'}=I \qquad (9)$$

holds. In some other implementations, the electric vehicle positioning subsystem 364 drives the generator coils 702, 704, 706 each with an alternating (sinusoidal) current with an amplitude so that $$\omega_x I_{x'} = \omega_y I_{y'} = \omega_z I_{z'}. \qquad (10)$$

holds.

In some implementations using FDM, induced voltage components $v_{x'x}(t)$, $v_{x'y}(t)$, $v_{x'z}(t)$, $v_{y'x}(t)$, $v_{y'y}(t)$, $v_{y'z}(t)$, $v_{z'x}(t)$, $v_{z'y}(t)$, and $v_{z'z}(t)$ may also be sinusoidally oscillating. In some implementations, phases of these voltage components as received from the x'-, y'-, and z'-magnetic fields have an equal phase shift of 90° with respect to the respective generator coil excitation currents $i_{x'}(t)$, $i_{y'}(t)$ and $i_{z'}(t)$. However, e.g., in some implementations in presence of a ground containing ferromagnetic steel, phase shifts may deviate from 90° to some extent.

In some implementations, the base positioning subsystem 362 employs phase synchronization to detect the nine voltage signal components $v_{x'x}(t)$, $v_{x'y}(t)$, $v_{x'z}(t)$, $v_{y'x}(t)$, $v_{y'y}(t)$, $v_{y'z}(t)$, $v_{z'x}(t)$, $v_{z'y}(t)$, and $v_{z'z}(t)$ as received via sense coils 712, 714, 716 of the 3-axis magnetic field sensor 366. For example, if the magnetic field based positioning system 600 includes the optional synchronization link 630, as previously described in connection with FIG. 6, the base positioning subsystem 362 may establish an absolute phase synchronization with the electric vehicle positioning subsystem 364. Such an optional synchronization link 630 may necessitate additional circuitry having an associated manufacturing cost. If the magnetic field based positioning system 600 omits such a synchronization link 630, the base positioning subsystem 362 may establish at least intrinsic relative phase synchronization on the voltage signals as received via sense coils 712, 714, 716.

In some implementations, the base positioning subsystem 364 determines a position and orientation of the sensor 366 relative to the generator 368 based on the nine detected voltages $V_{x'x}$, $V_{x'y}$, $V_{x'z}$, $V_{y'x}$, $V_{y'y}$, $V_{y'z}$, $V_{z'x}$, $V_{z'y}$, and $V_{z'z}$ being indicative for the respective voltage signal components $v_{x'x}(t)$, $v_{x'y}(t)$, $v_{x'z}(t)$, $v_{y'x}(t)$, $v_{y'y}(t)$, $v_{y'z}(t)$, $v_{z'x}(t)$, $v_{z'y}(t)$, and $v_{z'z}(t)$ as received via sense coils 712, 714, 716.

In some implementations, each of the nine detected voltages $V_{x'x}$, $V_{x'y}$, $V_{x'z}$, $V_{y'x}$, $V_{y'y}$, $V_{y'z}$, $V_{z'x}$, $V_{z'y}$, and $V_{z'z}$ represents a real value. In some other implementations, each of the nine detected voltages represents a complex value also referred to as a phasor.

The detected voltages (real or complex) may be represented as a triple of 3-dimensional (3D) voltage vectors as follows:

$$V_{x'} = \begin{bmatrix} V_{x'x} \\ V_{x'y} \\ V_{x'z} \end{bmatrix}, V_{y'} = \begin{bmatrix} V_{y'x} \\ V_{y'y} \\ V_{y'z} \end{bmatrix}, V_{z'} = \begin{bmatrix} V_{z'x} \\ V_{z'y} \\ V_{z'z} \end{bmatrix}. \qquad (11)$$

Alternatively, detected voltages may be represented as a 9-dimensional (9D) voltage vector as follows:

$$V' = \begin{bmatrix} V_{x'x} \\ V_{x'y} \\ V_{x'z} \\ V_{y'x} \\ V_{y'y} \\ V_{y'z} \\ V_{z'x} \\ V_{z'y} \\ V_{z'z} \end{bmatrix}, \qquad (12)$$

or, as a 3×3 voltage matrix as follows:

$$[V'] = \begin{bmatrix} V_{x'x} & V_{y'x} & V_{z'x} \\ V_{x'y} & V_{y'y} & V_{z'y} \\ V_{x'z} & V_{y'z} & V_{z'z} \end{bmatrix}. \qquad (13)$$

In some implementations, the base positioning subsystem 362 also determines a position of the sensor 366 relative to the generator 368 based on the absolute value of the dot product (i.e., the scalar product) of each unique combination of the 3D voltage vectors $V_{x'}$, $V_{y'}$, $V_{z'}$ as defined by Equation (11), which may be represented as a 6D vector as follows:

$$A' = \begin{bmatrix} |V_{x'} \cdot V_{x'}| \\ |V_{y'} \cdot V_{y'}| \\ |V_{z'} \cdot V_{z'}| \\ |V_{x'} \cdot V_{y'}| \\ |V_{x'} \cdot V_{z'}| \\ |V_{y'} \cdot V_{z'}| \end{bmatrix}. \qquad (14)$$

The 3D voltage vectors $V_{x'}$, $V_{y'}$, $V_{z'}$ are dependent upon the orientation of the sensor 366 with respect to the generator 368. As such, the 9D voltage vector V' which comprises the components of each of the voltage vectors $V_{x'}$, $V_{y'}$, $V_{z'}$ is also dependent upon the orientation of the sensor 366 with respect to the generator 368. By contrast, since the components of A' are determined from the dot product of the 3D voltage vectors $V_{x'}$, $V_{y'}$, $V_{z'}$, vector A' is orientation-independent, if the magnetic sensor 366 is isotropic.

Given physical restrictions as defined by Equation (2), a 3-axis magnetic field sensor 366 may be considered isotropic if the magnitude |V'| of the 9D voltage vector (12) remains constant or substantially constant for any (azimuthal) rotation of the magnetic field sensor 366 by an angle φ' about its z-axis. If the magnetic field sensor 366 is substantially isotropic, the 6D absolute scalar product vector A' is substantially invariant to rotation of the sensor 366 with respect to the generator 368.

In some implementations, the sensor 366 may not constitute a physical arrangement of orthogonal sense coils 712, 714, 716 such as shown by FIG. 7. Instead, the base positioning subsystem 362 may perform an additional operation of orthogonalization based on the 3×3 voltage matrix as defined by Equation (12). Applying this operation of orthogonalization, the voltage components of the 9D voltage vector V' may become equivalent to the 9D voltage vector as obtained from an orthogonal sense coil arrangement.

In some implementations that rely only on relative phase synchronization as previously discussed (e.g., when the magnetic field based positioning system 600 lacks a synchronization link 630 between the electric vehicle positioning subsystem 364 and the base positioning subsystem 362), the detected 3D voltage vectors $V_{x'}$, $V_{y'}$, $V_{z'}$ may be ambiguous with respect to their polarity.

Figure 8:
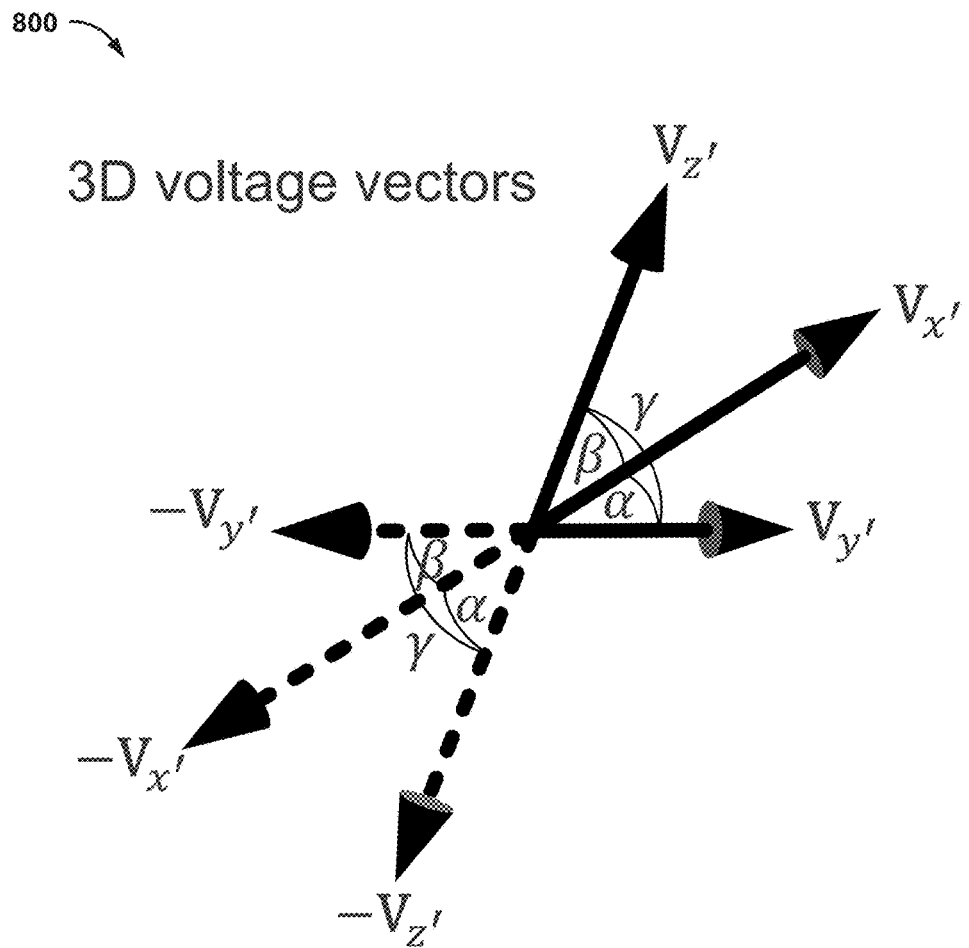
FIG. 8 is a diagram illustrating polarity ambiguity of 3-dimensional voltage vectors as they may be detected by the base positioning subsystem of FIG. 3 that is in relative phase synchronization but not in absolute phase synchronization with the magnetic fields as generated by the electric vehicle positioning subsystem of FIG. 3.
Figure 9:
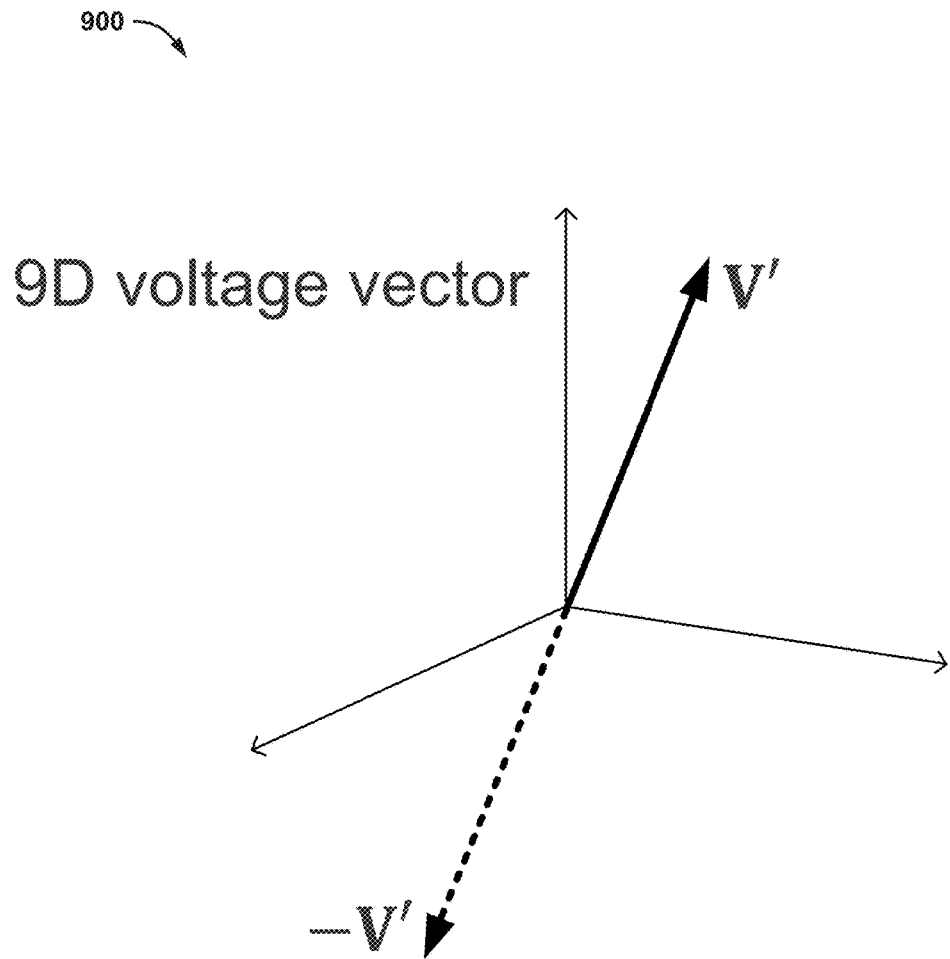
FIG. 9 is a diagram illustrating polarity ambiguity of a 9-dimensional voltage vector as it may be detected by a base positioning subsystem of FIG. 3 that is in relative phase synchronization but not in absolute phase synchronization with the magnetic fields as generated by the electric vehicle positioning subsystem of FIG. 3.

FIG. 8 illustrates a vector triple $V_{x'}$, $V_{y'}$, $V_{z'}$ 800 with polarity ambiguity indicated by the dashed and non-dashed vector triple. FIG. 9 illustrates a 9D vector V' in a 9D vector space 900 with polarity ambiguity indicated by the dashed and non-dashed vectors. In this case, the base positioning subsystem 362 cannot distinguish between the 3D voltage vector triple $V_{x'}$, $V_{y'}$, $V_{z'}$ (shown as non-dashed vectors in FIG. 8) and corresponding vector triple $-V_{x'}$, $-V_{y'}$, $-V_{z'}$ having opposite polarity (shown as dashed vectors in FIG. 8). However, relative phase synchronization may ensure that individual vectors of vector triple $V_{x'}$, $V_{y'}$, $V_{z'}$ have no polarity ambiguity relative to each other, meaning that the angles $\alpha$, $\beta$, $\gamma$ between vectors $V_{x'}$, $V_{y'}$, $V_{z'}$ 800 as indicated in FIG. 8 are the same as in a system that employs absolute phase synchronization. As a consequence, relative polarities of the components of the 9D vector V' may be unambiguous. However, there may be a remaining absolute polarity ambiguity on the entire 3D vector triple $V_{x'}$, $V_{y'}$, $V_{z'}$ 800 as shown in FIG. 8 and also on the 9D vector V' expressed by ±V' as illustrated FIG. 9 in the 9D vector space 900. In addition, it can be found that the 6D absolute scalar product vector A', as previously defined in some implementations by equation (14), is invariant to any polarity ambiguity of the 3D voltage vectors $V_{x'}$, $V_{y'}$, $V_{z'}$.

In some implementations, absolute polarity ambiguity may result in ambiguity in the position and/or orientation as determined by the magnetic field based positioning system 600. In addition, even in absence of absolute polarity ambiguity, magnetic field sensing may result in position and/or orientation ambiguity. The nature of this position and/or orientation ambiguity is inherent to the structure of magnetic fields.

Figure 10:
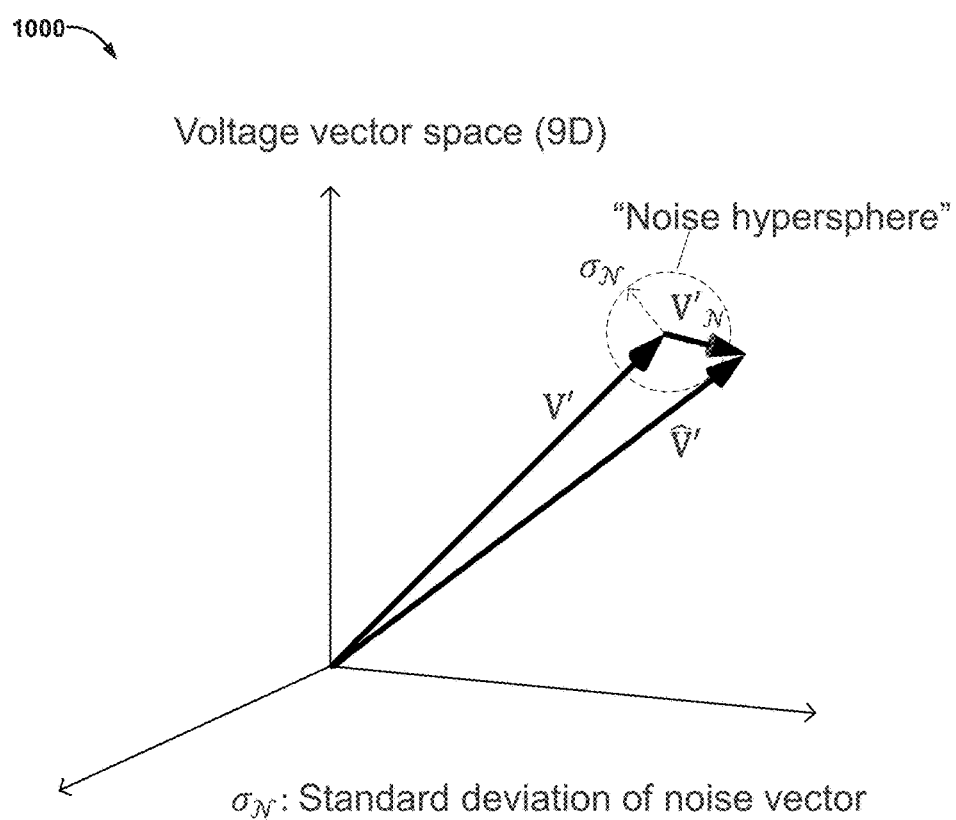
FIG. 10 is a diagram illustrating the effect of noise on a voltage vector in the (9D) voltage vector space.

FIG. 10 illustrates the effect of noise on a 9D voltage vector in the 9D voltage vector space 1000. In presence of noise, interference and/or distortion, the voltage vector V' as detected by the base positioning subsystem 362 operationally coupled to the sensor 366 may be perturbed. A perturbation by an additive noise may be expressed as $$\hat{V}' = V' + \mathbf{V}'_N,  \quad (15)$$

where $\hat{V}'$ is the perturbed 9D voltage vector, V' is the unperturbed voltage vector, and $V'_N$ is the noise vector. The noise vector $V'_N$ may be considered a vector random variable and may in some implementations be statistically described by a multi-dimensional (multivariate) probability distribution, e.g., a multivariate Gaussian distribution. For example, FIG. 10 illustrates an example noise vector $V'_N$ of a 9D hyperspherical probability distribution around the unperturbed voltage vector V'. A hyperspherical probability distribution may result if all nine components of the noise vector $V'_N$ have equal standard deviation $\sigma_N$, so that the following equation holds:

$$\sigma_{N} = \sigma_{N,1} = \sigma_{N,2} = \ldots = \sigma_{N,9}. \quad (16)$$

In this case, the 9D probability distribution may be considered hyperspherical with a radius $\sqrt{9}\sigma_N$.

Since the base positioning subsystem 362 determines the 6D absolute scalar product vector A' as an absolute value of the dot product of components of the 9D vector V', if V' is perturbed, e.g., by additive noise that can be expressed using the 9D noise vector $V'_N$, A' may be similarly perturbed by noise according to the equation $$\hat{A}' = A' + \mathbf{A}'_N, \quad (17)$$

where $\hat{A}'$ is the perturbed 6D vector, A' is the unperturbed 6D vector, and $\mathbf{A}'_N$ is the 6D noise vector corresponding to the 9D noise vector $V'_N$.

In some implementations, the perturbed vectors $\hat{V}'$ and $\hat{A}'$ may also be known as detection vectors, since any voltages detected by the base positioning subsystem 362 may be subjected to at least minimal noise and/or interference from the ambient environment and/or from the base positioning subsystem 362 itself.

In some implementations, an unperturbed zero-rotated 9D voltage vector $V'_0$ may be defined as the unperturbed 9D voltage vector V' that results when the rotation angle $\varphi'$ of the sensor 366 with respect to the generator 368 is zero. If the sensor 366 is isotropic as defined above, the unperturbed 9D voltage vector V' ($\varphi'$) as obtained with a sensor 366 having an arbitrary rotation angle $\varphi'$ and the unperturbed zero-rotated 9D voltage vector $V'_0$ are related by the following matrix equation:

$$[V'(\varphi')] = [R_{\varphi'}][V'_0], \quad (18)$$

where $[R_{\varphi'}]$ denotes the rotation matrix defined as $$[R_{\varphi'}] = \begin{bmatrix} \cos\varphi' & \sin\varphi' & 0 \\ -\sin\varphi' & \cos\varphi' & 0 \\ 0 & 0 & 1 \end{bmatrix}. \quad (19)$$

The base positioning subsystem 362 may determine an estimate $\hat{V}'_0$ of the unperturbed zero-rotated 9D voltage vector $V'_0$ from a perturbed 9D detection vector $\hat{V}'$ as obtained with a sensor 366 having an arbitrary rotation angle $\varphi'$ by utilizing the inverse of matrix equation (18) as follows:

$$[\hat{V}'_0] = [R_{\varphi'}]^T [\hat{V}'], \quad (20)$$

where $[\cdot]^T$ denotes the transposed of the rotation matrix defined by equation (19). The matrix operation as defined by Equation (20) is herein referred to as de-rotation and the matrix $[\hat{V}'_0]$ as a rotational transform of matrix $[\hat{V}']$. This rotational transform of matrix $[\hat{V}']$ may be also denoted by $[\hat{V}'(-\varphi')]$.

Figure 11:
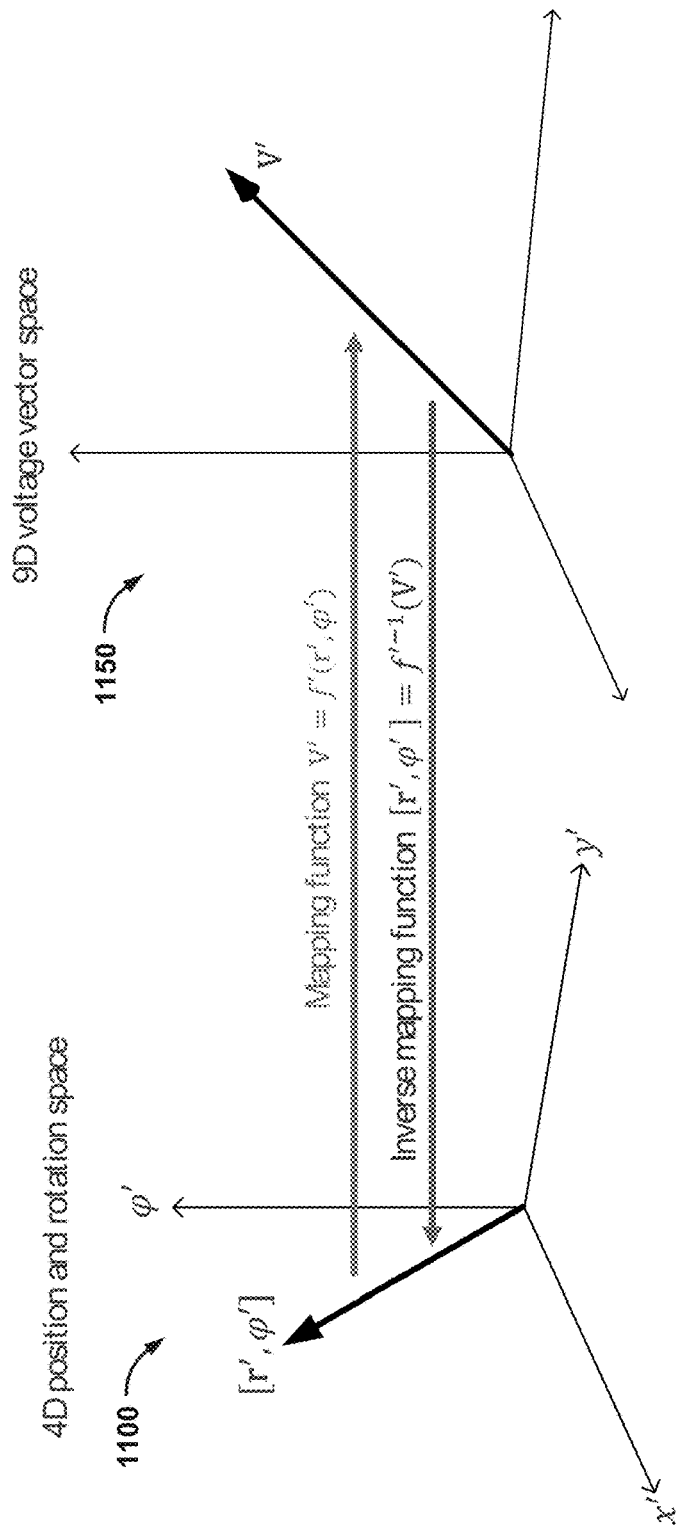
FIG. 11 is a diagram illustrating a mapping of a position vector in the 4D position and orientation space onto a voltage vector in the 9D voltage vector space and vice-versa.

FIG. 11 illustrates an exemplary mapping of a 4D position and orientation vector [r', $\varphi'$] comprised of three position coordinates $r_{x'}$, $r_{y'}$, $r_{z'}$ and rotation angle $\varphi'$ in the 4D position and orientation space 1100 onto a 9D voltage vector V' in the 9D voltage vector space 1150. In mathematical terms, this mapping of a sensor's 366 position and orientation onto a voltage vector may be described by a mapping function $$V' = f(r', \varphi'). \quad (21)$$

Similarly, FIG. 11 also illustrates the inverse mapping of a 9D voltage vector V' in the 9D voltage vector space 1150 onto a 4D position and orientation vector [r', $\varphi'$] in the 4D position and orientation vector space 1100. In mathematical terms, this inverse mapping may be described by an inverse mapping function $$[r', \varphi'] = f^{-1}(V'). \quad (22)$$

Determining a valid unambiguous position and/or orientation relies on the mapping function f having a one-to-one relationship (i.e., an injective function). In other words, each position and orientation vector [r', $\varphi'$] maps to a single voltage vector V' and, reciprocally, each voltage vector V' maps onto a single position and orientation vector [r', $\varphi'$]. In some implementations of the 3-axis generator/3-axis sensor system of FIG. 7 operating under the physical restriction as defined by Equation (1), the mapping functions f' and f'$^{-1}$ may be injective, even if the vector V' is subject of an absolute polarity ambiguity. In implementations utilizing less than 3-axis in either the generator 368 or the sensor 366 and having absolute polarity ambiguity, these mapping functions may become non-injective, resulting in position and/or orientation ambiguity a vehicle guidance and alignment system has to cope with.

Moreover, determining an accurate position and orientation may rely on the mapping function f'(·) and/or its inverse f'$^{-1}$ being valid for a particular parking space and stable over time.

In some implementations, the mapping function f' and/or its inverse f'$^{-1}$ or portions thereof may be described by a mathematical (analytic) multidimensional function, e.g., based on magnetic monopole or dipole functions, polynomial functions, exponential functions, trigonometric functions, hypergeometric functions, Gaussian functions, etc.

In some other implementations, the mapping function f' and/or its inverse f'$^{-1}$ or portions thereof may be defined by a data structure such as a table function also referred to as a look-up table (LUT), such as that described in connection with FIG. 16. A LUT may be described as an array of numbers associating discrete input value strings to discrete output value strings. If applied to the inverse function f'$^{-1}$, each input value string refers to a voltage vector V' and each associated output value string to a position and orientation vector [r', φ'].

The output value strings of the mapping function f' and the input value strings of the inverse mapping function f'$^{-1}$ may be also referred to as reference vectors V' regardless whether f' and/or its inverse f'$^{-1}$ is implemented as an analytic or tabulated function (e.g., an LUT).

In some implementations, each position r' and rotation angle φ' associated to a reference vector V' corresponds to a grid point in a limited position and orientation space 1100 as further described below. If the inverse mapping function is based on a LUT, the grid point spacing and the resulting number of reference vectors V' may represent a trade-off between positioning accuracy and LUT size. If based on an analytic function, the grid point spacing and the resulting number of reference vectors V' may relate to the numeric precision of the processor 2004 as described in connection with FIG. 20. If the processor 2004 is an analogue circuitry, the grid point spacing may be zero and the number of reference vectors becomes infinite (a continuum).

The plurality of reference vectors V' each associated to a position r' and a rotation angle φ' may be also referred to as a vector map regardless whether f' and/or its inverse f'$^{-1}$ is implemented as an analytic or tabulated function (LUT) or whether it is a finite or an infinite set.

In some implementations, the plurality of reference vectors V' is obtained in a previous process of system calibration. This process of system calibration may involve computer simulations, e.g., using a finite element method (FEM), interpolation, approximation, regression using analytic methods, measurements in a controlled environment, and/or in-situ in a particular parking space using a real implementation of a magnetic field positioning system 600.

In some implementations, the base positioning subsystem 362 may determine a position and/or an orientation of the sensor 366 with respect to the generator 368 based on the inverse mapping function f'$^{-1}$ according to Equation (22) using the detection vector $\hat{V}$' as an input, which may be expressed as $$[r', \varphi'] = f'^{-1}(\hat{V}'). \tag{23}$$

If the inverse mapping function f'$^{-1}$ is analytically defined, the base positioning subsystem 362 may compute a position and/or orientation using Equation (23) and a suitable numerical method.

The set of reference vectors V' related to positions r' and rotation angle φ' by the mapping function f' may occupy only a subspace of the voltage vector space. This may be particularly true if the dimensionality of the voltage vector space exceeds that of the position and rotation angle space (e.g., 9D vs. 4D) and if the position and rotation angle space itself is restricted. If the detection vector $\hat{V}$' is perturbed, e.g., by additive noise as previously described, the detection vector $\hat{V}$' may not belong to the set of reference vectors V'=f(r', φ'). In such event, the inverse function f'$^{-1}$ may not provide a solution at all or it may not provide a physically meaningful solution for r', φ'. The likelihood for such an event may be high if the dimensionality of the voltage vector space 1150 exceeds that of the position and rotation space 1100 (e.g., 9D vs. 4D). In some implementations, even if the dimensionality of the two spaces is equal and the sensor's 366 true position and orientation is within the specified position and rotation angle space, the inverse function f'$^{-1}$ may not always provide a solution, depending on the properties and structure of f'$^{-1}$. In any case, if the detection vector is a perturbed version of a reference vector V', a solution of f'$^{-1}$ ($\hat{V}$') may be considered an estimate of the sensor's 366 true position and orientation with respect to the generator 368 and may be expressed as $$[\hat{r}', \hat{\varphi}'] = f'^{-1}(\hat{V}'). \tag{24}$$

In some implementations, the base positioning subsystem 362 deduces a position and/or an orientation of the sensor 366 with respect to the generator 368 by first performing some non-linear operations on the detection vector $\hat{V}$' so that a physically meaningful solution for r', φ' exists for any or at least for most perturbed detection vectors $\hat{V}$'. In some implementations using an isotropic sensor 366 as previously defined, such non-linear operation may include transforming the vector $\hat{V}$' into a vector Â', e.g., as defined by Equation (14). However, since such non-linear operations generally involve a loss of information, such implementations may not perform optimally in the sense of a best estimate $\hat{r}'$, $\hat{\varphi}$' for the sensor's 366 true position and orientation, respectively.

In some implementations, the base positioning subsystem 362 may deduce a position and/or an orientation of the sensor 366 with respect to the generator 368 by first determining a closest match between a detection vector $\hat{V}$' and the plurality of reference vectors V' previously determined (calibrated) to correspond to particular sensor 366 positions r' and rotation angles φ' and then by assuming the position r' and rotation angle φ' associated to that reference vector V' providing a closest match as a best estimate $\hat{r}'$ and $\hat{\varphi}$' of the sensor's 366 true position and orientation with respect to the generator 368.

Using probabilistic terms, the reference vector of a plurality of reference vectors V'=f(r', φ') with the closest match to a detection vector $\hat{V}$' may represent the reference vector of highest probability. Therefore, the position r' and rotation angle φ' associated to that reference vector of closest match may also represent the sensor's 366 position and orientation of highest probability. The position r' and rotation angle φ' associated to that reference vector of closest match may also represent a best estimate $\hat{r}'$ and $\hat{\varphi}$' of the sensor's 366 true position and orientation, respectively.

Figure 12:
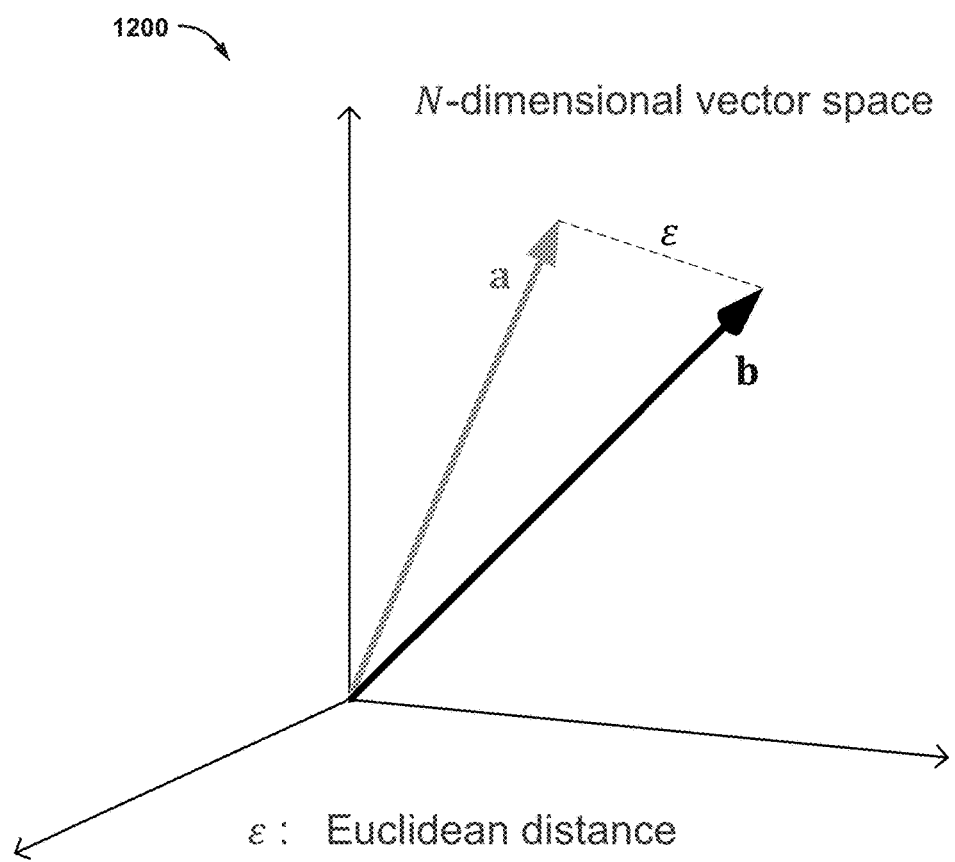
FIG. 12 is a diagram illustrating a Euclidean distance between two vectors in the N-dimensional vector space.

If the detection vector $\hat{V}'$ is perturbed by additive noise with standard deviations as defined by equation (16), the base positioning subsystem 362 may use the Euclidean distance between two vectors as the metric for a closest match. FIG. 12 illustrates a Euclidean distance between two N-dimensional vectors in the N-dimensional vector space 1200. FIG. 12 shows a vector a and a vector b, each having its origin in the origin of the N-dimensional vector space 1200. A Euclidean distance E between vectors a and b is defined as the length of the difference vector d (not shown) according to the following equation $$\epsilon = |d| = |a-b| = \sqrt{\sum_{i=1}^{N}(a_i - b_i)^2}. \quad (25)$$

where $a_i$ is the $i^{th}$ vector component of the vector a and $b_i$ is the $i^{th}$ vector component of the vector b. Vector a may refer to a reference vector of the plurality of reference vectors $V'=f(r', \varphi')$ and vector b to the detection vector $\hat{V}'$.

If equation (16) does not hold, meaning that standard deviations $\sigma_{N,i}$ are unequal, the base positioning subsystem 362 may employ, instead of the Euclidean distance (Equation (25)), a weighted distance metric, e.g.:

$$\varepsilon_w = \sqrt{\sum_{i=1}^{N} \frac{1}{\sigma_{N,i}^2}(a_i - b_i)^2}, \quad (26)$$

where $a_i$ may refer to the $i^{th}$ component of the reference vector $V'(r', \varphi')$ and $b_i$ to the $i^{th}$ component of the detection vector $\hat{V}'$ whose components $b_i$ are perturbed by an additive noise of zero-mean and standard deviation $\sigma_{N,i}$. In this case, the reference vector of a plurality of reference vectors $V'(r', \varphi')$ having a minimum weighted distance $\varepsilon_w$ to a detection vector $\hat{V}'$ may be considered the reference vector with closest match to the detection vector $\hat{V}'$.

In some implementations, the base positioning subsystem 362 employs one of an alternative distance metric, e.g., the squared Euclidean distance, an approximation of the Euclidean distance, a weighted distance metric in accordance with equation (26), or any other suitable distance metric. Descriptions of position and orientation finding processes below assume the standard Euclidean distance as defined by Equation (25) but should not be construed to be limited to that.

In some implementations based on a LUT, the process of determining a position and orientation as described above may require high amount of memory depending on the grid point spacing and the size of the specified position and rotation angle space. Therefore, in some implementations using an isotropic or substantially isotropic sensor 366 as previously defined, the base positioning subsystem 362 may use a LUT or other data structure storing a plurality of reference vectors $V'_0$ previously determined (calibrated) to correspond to particular sensor 366 positions r' but only for a single fixed rotation, e.g., the zero rotation ($\varphi'=0$) of the sensor 366 with respect to the generator 368. The plurality of reference vectors $V'_0$ associated to positions r' may be also referred to as a vector map for a fixed rotation of the sensor 366.

In some implementations using a LUT for reference vectors $V'_0$, the base positioning subsystem 362 deduces a position and orientation of the sensor 366 with respect to the generator 368 by determining a shortest Euclidean distance between all combinations of a plurality of rotational transforms $\hat{V}'(-\varphi')$ of the detection vector $\hat{V}'$ and a plurality of reference vectors $V'_0$ and then by assuming the position r' and rotation angle $\varphi'$ associated to that reference vector $V'_0$ providing a shortest Euclidean distance as a best estimate $\hat{r}'$ and $\hat{\varphi}'$ of the sensor's 366 true position and orientation relative to the generator 368, respectively.

Figure 13:
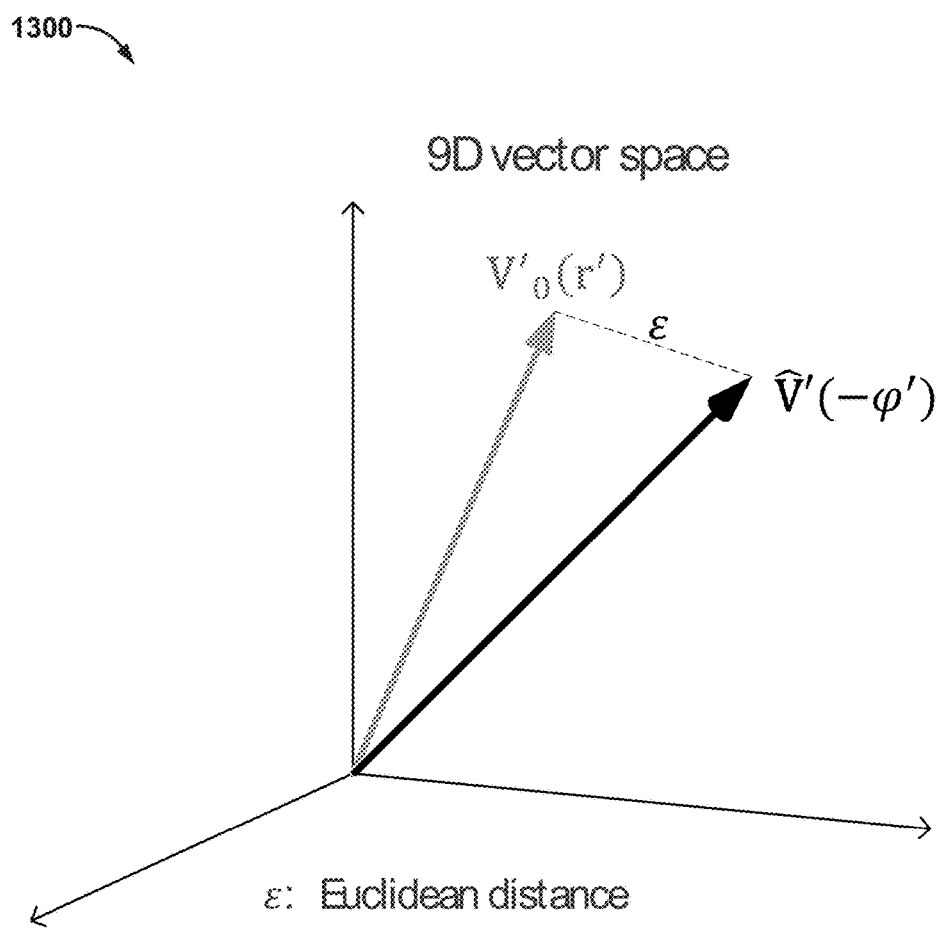
FIG. 13 is a diagram illustrating a Euclidean distance between a reference vector referring to a zero-rotated magnetic field sensor and a rotational transform of a detection vector in the 9D voltage vector space.

FIG. 13 illustrates an exemplary joint position and orientation finding process showing a Euclidean distance E between a 9D zero-rotated reference vector $V'_0(r')$ and a rotational transform $\hat{V}'(-\varphi')$ of a 9D detection vector $\hat{V}'$ in the 9D vector space 1300. Finding a position and orientation jointly may require determining a Euclidean distance $\epsilon$ between a rotational transform $\hat{V}'(-\varphi')$ of the detection vector $\hat{V}'$ and a previously determined (calibrated) reference vector $V'_0(r')$ iteratively for every position of a plurality of discrete positions r', and for every angle of a plurality of discrete angles $\varphi'$. If the detection vector $\hat{V}'$ is subject to a polarity ambiguity as previously discussed, the process of joint position and orientation finding may additionally include iterations over both polarity hypothesis p=+1 and p=-1. As used herein, "iteratively" may mean that the Euclidean distance may be determined for every position of a plurality of discrete positions, and for each position for every angle $\varphi'$ of a plurality of discrete angles, and, if required, for each angle $\varphi'$ for both polarities p=+1 and p=-1.

In mathematical terms, a position of a plurality of discrete positions r' may be expressed by position vector $r'_{i,j,k}=[r_{x',i}, r_{y',j}, r_{z',k}]^T$, where indices i,j,k are integer numbers. Likewise, a respective angle of a plurality of discrete angles $\varphi'$ may be expressed by $\varphi'_l$, where indices l are integer numbers. Using these definitions, the process of determining a position and rotation angle jointly based on the shortest (minimum) Euclidean distance e may be expressed in mathematical terms as $$\min_{\text{all } i,j,k,l} |V'_0(r'_{i,j,k}) - p\hat{V}'(-\varphi'_l)| \to \hat{r}', \to \hat{\varphi}' \quad (27)$$

where |·| denotes the norm (magnitude) of a vector in the Euclidean space. The term "all" shall be understood as all iterations (combinations) of i,j,k,l over the number ranges as specified for a particular implementation. The position $\hat{r}'$ and rotation angle $\hat{\varphi}'$ as output by the process of equation (27) may represent a best estimate $\hat{r}'$ and $\hat{\varphi}'$ of the sensor's 366 true position and orientation, respectively, with respect to the generator 368. In some implementations, these estimates may include ambiguity in either the position or orientation or in both. The rotational transform $\hat{V}'(-\varphi'_l)$ (also known as de-rotation) of the 9D detection vector $\hat{V}'$ may be given by matrix equation (18) and may be expressed in the context of equation (27) as $$[\hat{V}'(-\varphi'_l)] = [R_{\varphi'_l}]^T [\hat{V}']. \quad (28)$$

In some implementations, the plurality of discrete positions $r'_{i,j,k}=[r_{x',i}, r_{y',j}, r_{z',k}]^T$ may correspond to grid points in a limited 3D position space, which is referred to as the search space. The search space may be defined by the following ranges:

$$x'_{min} < r_{x',i} < x'_{max},$$

$$y''_{min} < r_{y',i} < y'_{max},$$

$$z'_{min} < r_{z',i} < z'_{max}, \quad (29)$$

where $x'_{min}$ and $x'_{max}$ denote the lower and upper limit of the x'-dimension of the search space, $y'_{min}$, and $y'_{max}$ the lower and upper limit of its y'-dimension, etc. In some implementations, the grid may have a tight enough spacing so that it does not noticeably degrade the accuracy of the position estimates r̂' as determined by the base positioning subsystem 362 regardless of the sensor's 366 position. In some implementations, the grid points may be equally spaced. In some other implementations, the grid points are unequally spaced. For example, the grid points may have a spacing that increases with distance (radius) from the origin of the 3D position space according to some rule. In an exemplary implementation where physical restrictions for the sensor's 366 position as defined by Equation (1) applies, the ranges may be limited to $x'_{min}=-500$ cm, $x'_{max}=500$ cm, $y'_{min}=-300$ cm, $y'_{max}=300$ cm, $z'_{min}=-15$ cm, $z'_{max}=-10$ cm.

In some implementations, the plurality of discrete angles $\varphi'_l$ correspond to points in a 1D orientation angle space defined by the following ranges:

$$\varphi'_{min} \leq \varphi'_l \leq \varphi'_{max}, \quad (30)$$

where $\varphi'_{min}$ and $\varphi'_{max}$ denote the lower and upper limit of the angle space. The points of the angle space may have a tight enough spacing so that the accuracy of the rotation angle estimate $\hat{\varphi}'$ as determined by the base positioning subsystem 362 is not noticeably degraded regardless of the sensor's 366 position and orientation. In an exemplary implementation, the limits $\varphi'_{min}=-180°$, $\varphi'$hd max=180°, and an equal point spacing of 1° applies.

In some implementations, the limits $x'_{min}$, $x'_{max}$, $y'_{min}$, $y'_{max}$, $z'_{min}$, $z'_{max}$, $\varphi'_{min}$, and $\varphi'_{max}$ of the search space and the grid spacing are variable parameters and may depend, e.g., on previously found positions and orientation angle estimates, respectively.

In some implementations, the plurality of discrete positions $r'_{i,j,k}$ corresponds to grid points in a search space that is determined by a function of the 9D detection vector $\hat{V}'$. In some implementations, the base positioning subsystem 362 determines a 3D cylindrical search space centered about the origin of the generator's 368 coordinate frame that is limited by an inner radius $\rho'_{x',y',min}$ and outer radius $\rho'_{x',y',max}$ and by a z'-height range. This cylindrical search space may be defined as:

$$\rho'_{x',y',min} \leq \sqrt{r_{x',i}^2 + r_{y',i}^2} \leq \rho'_{x',y',max},$$

$$z'_{min} \leq r_{z',i} \leq z'_{max}. \quad (31)$$

In some implementations, the base positioning subsystem 362 may determine the inner radius $\rho'_{x',y',min}$ and the outer radius $\rho'_{x',y',max}$ based on a value that is derived from the 9D detection vector $\hat{V}'$, e.g., on its magnitude $|\hat{V}'|$.

In some implementations, the search space may be limited to a quadrant or an octant of a 3D position space or to any other suitable subspace.

Depending on the number of grid points and the size of the search space, joint position and orientation finding may be extremely computationally intensive. To reduce computational load, the base positioning subsystem 362 may apply an alternative process that is described below and that may represent a trade-off between computational burden and positioning accuracy. This alternate process is a two-operation process comprised of a first operation that is an orientation-independent position finding process and a second operation that is a joint position and orientation finding process based on a limited number of candidate positions found in the first operation. This alternative process may be applied to a base positioning subsystem 362 with a sensor 366 that is isotropic or substantially isotropic as previously defined.

In the first operation, the base positioning subsystem 362 may first determine a number $N_c$ of candidate positions $r'_1$, $r'_2$, ..., $r'_{N_c}$ based on the 6D detection vector $\hat{A}'$ as defined by Equation (15), which is invariant to the sensor's 366 rotation and to polarity ambiguity. The base positioning subsystem 362 may determine the $N_c$ candidate positions $r'_1$, $r'_2$, ..., $r'_{N_c}$ for which having associated 6D reference vectors $A'(r'_1), A'(r'_2), \ldots, A'(r'_{N_c})$ closest to the 6D detection vector $\hat{A}'$ (e.g., the Euclidean distances $\epsilon_1, \epsilon_2, \ldots \epsilon_{N_c}$ between the associated 6D reference vectors $A'(r'_1), A'(r'_2), \ldots A'(r'_{N_c})$ the 6D detection vector $\hat{A}'$ and the 6D detection vector $\hat{A}'$ is smaller than the Euclidean distances $\epsilon$ between all other 6D reference vectors $A'(r')$ and the 6D detection vector $\hat{A}'$). For example, in some implementations, the base positioning system 362 may systematically step through each position associated with a reference vector $A'(r'_{i,j,k})$ in the LUT 1600 within the search space as specified by a particular implementation. In some implementations, the resulting $N_c$ candidate positions $r'_1, r'_2, \ldots, r'_{N_c}$ may be ambiguous as previously discussed.

Figure 14:
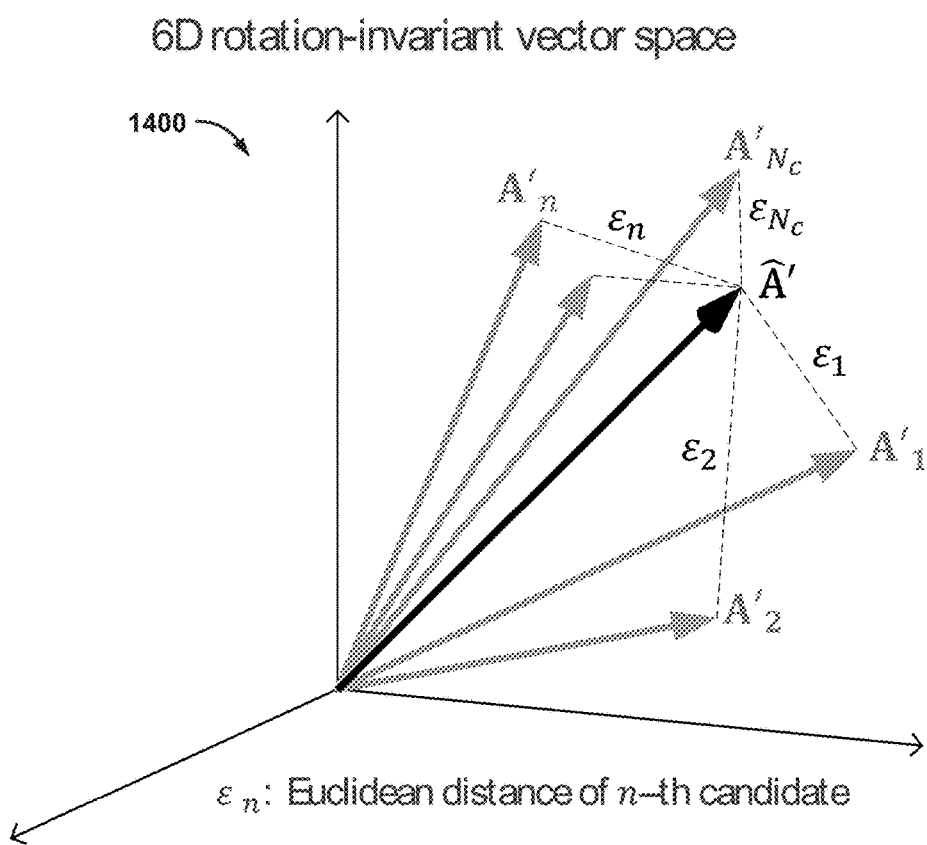
FIG. 14 is a diagram illustrating Euclidean distances between a plurality of 6D reference vectors of the LUT of FIG. 16 and a 6D detection vector e.g. composed of scalar (dot) products of detected 3D voltage vectors, in accordance with some implementations.

FIG. 14 illustrates the $N_c$ smallest Euclidean distances $\epsilon_1, \epsilon_2, \ldots, \epsilon_{N_c}$ between 6D reference vectors $A'(r_1), A'(r_2), \ldots, A'(r'_{N_c})$ and a 6D detection vector $\hat{A}'$ in the 6D vector space 1400. In mathematical terms, this orientation-independent process of determining $N_c$ positions $r'_1, r'_2, \ldots, r'_{N_c}$ based on the $N_c$ smallest Euclidean distances $\epsilon_1, \epsilon_2, \ldots, \epsilon_{N_c}$ may be expressed as $$N_c \text{ smallest } |A'(r'_{i,j,k}) - \hat{A}'| \to r'_1, r'_2, \ldots, r'_{N_c}, \quad (32)$$
$$\text{all } i, j, k$$

where $|\cdot|$ denotes the norm of a vector in the Euclidean space. The term "all" shall be understood as all iterations (combinations) of i,j,k over the number ranges as specified by a particular implementation. In some implementations, these ranges correspond to grid points in one octant of the 3D position space. In some embodiments, instead of identifying $N_c$ candidate positions having the smallest Euclidean distances $\epsilon_1, \epsilon_2, \ldots, \epsilon_{N_c}$ between 6D reference vectors $A'(r'_1), A'(r'_2), \ldots, A'(r'_{N_c})$ and the 6D detection vector $\hat{A}'$ in the 6D vector space 1400, one or more candidate positions may be identified having Euclidean distances $\epsilon$ between 6D reference vectors $A'(r'_1), A'(r'_2), \ldots, A'(r'_{N_c})$ and the 6D detection vector $\hat{A}'$ in the 6D vector space 1400 that are smaller than a threshold value, or some combination thereof.

Figure 15:
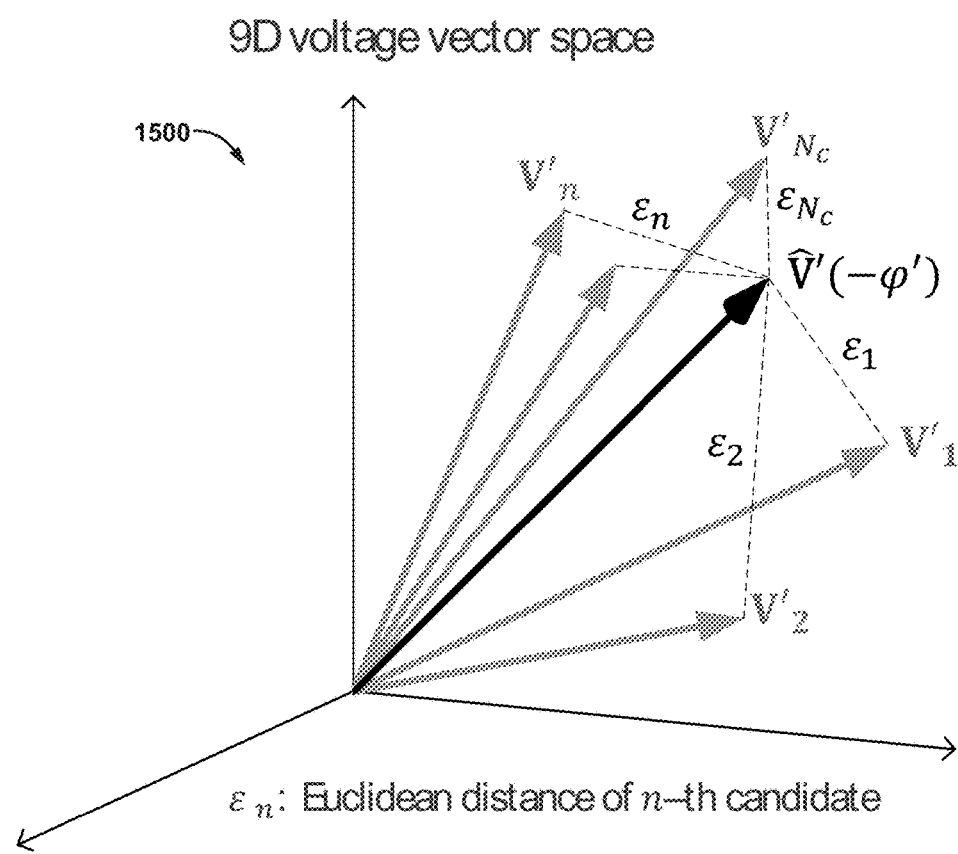
FIG. 15 is a diagram illustrating Euclidean distances between a plurality of 9D reference vectors of the LUT of FIG. 16 and a rotational transform of the 9D detection vector in the 9D voltage vector space.

In a subsequent (second) operation, the base positioning subsystem 362 may determine, amongst the set of $N_c$ candidate positions $r'_1, r'_2, \ldots, r'_{N_c}$, the position $r'$ and the rotation angle $\varphi'_l$ for which a Euclidean distance $\epsilon$ between a rotational transform $\hat{V}'(-\varphi'_l)$ of the 9D detection vector $\hat{V}'$ and the 9D reference vectors $V'_0$ associated to candidate positions $r'_1, r'_2, \ldots, r'_{N_c}$ is a minimum. An example of the second operation of joint position and orientation finding is illustrated in FIG. 15. FIG. 15 shows Euclidean distances $\epsilon_1, \epsilon_2, \ldots \epsilon_{N_c}$ between a rotational transform of detection vector $\hat{V}'$ and a plurality of reference vectors $V'_0$ in the 9D vector space 2600. The plurality of reference vectors $V'_0$ refer to the zero-rotated 9D reference vectors associated to candidate positions $r'_1, r'_2, r'_{N_c}$ and may be stored in the LUT 1600 as described in connection with FIG. 16. The base positioning subsystem 362 may accomplish this subsequent operation by systematically stepping through each position of the $N_c$ candidate positions $r'_1, r'_2, r'_{N_c}$ and by selecting the candidate position $r'$ and rotation angle $\varphi'_l$ providing shortest (minimum) Euclidean distance $\epsilon$. The position and rotation angle providing minimum Euclidean distance ϵ may be referred to as the final estimate r̂' and $\hat{\varphi}$' of the sensor's 366 position and orientation in the generator's 368 coordinate frame.

If candidate positions have ambiguity, this second operation may include all positions corresponding to this ambiguity. If the 9D detection vector V̂' is also subject of a polarity ambiguity, iterations may include both polarities p=+1 and p=−1. The process of joint position and orientation finding amongst $N_c$ candidate positions $r'_1, r'_2, \ldots, r'_{N_c}$, including iterations over polarities p may be expressed analogously to equation (27) as $$\min_{\substack{r'=[r'_1, r'_2, \ldots, r'_{N_c}] \\ p=[+1,-1]}} |V'_0(r') - p\hat{V}'(-\varphi'_l)| \to \hat{r}', \to \hat{\varphi}', \quad (33)$$

where |·| denotes the norm of a vector in the Euclidean space.

FIG. 16 illustrates an exemplary entry in a look up table (LUT) 1600 including a LUT address i,j,k associated position coordinates $r_{x',i}$, $r_{y',j}$, $r_{z',k}$, associated 9D zero-rotated reference vector $V'_0(r_{x',i}, r_{y',j}, r^{z',k})$, and associated 6D reference vector $A'(r_{x',i}, r_{y',j}, r^{z',k})$. The LUT 1600 may include a plurality of entries having the general format as shown. Each entry may correspond to a unique position of the sensor 366 with respect to the generator 368 arranged into a grid over a limited 3D position space as previously described. In some implementations, the grid may be limited to a particular number of planes with respect to the z'-dimension. For example, the grid may be limited to four planes with respect to the z'-dimension (k∈0, 1, 2, 3). In some other implementations the LUT may comprise four planes (k∈0, 1, 2, 3) within a central area corresponding to a radius, e.g., of 0.7 m, from the origin O' of the generator 368 coordinate frame. Outside this area, the LUT may comprise fewer planes, e.g., a single plane (e.g., k∈1) assuming that reference vectors $V'_0(r_{x',i}, r_{y',j}, r^{z',k})$ for the same x', y'-coordinate but for different z'-heights are enough similar so that they may be represented by a single reference vector calibrated for a midrange z'-height, e.g., $r_{z',1}$.

In some implementations, the above-described positioning processes may rely on the magnetic field sensor 366 being isotropic. In some implementations only the magnetic field generator 368 may be considered isotropic or substantially isotropic, e.g., in implementations where the base pad of the base wireless charging station 102a containing the magnetic field sensor 366 is larger than the vehicle pad of the electric vehicle coupler 116 containing the magnetic field generator 368 and wherein the vehicle pad is close to the base pad.

In such implementations where only the magnetic field generator 368 may be considered isotropic or substantially isotropic, the position and orientation finding processes described above may be performed by relying on the concept of an fictitious reversely transmitting system. In this fictitious system, position and orientation are determined in the sensor's 366 (base) coordinate frame.

Figure 17:
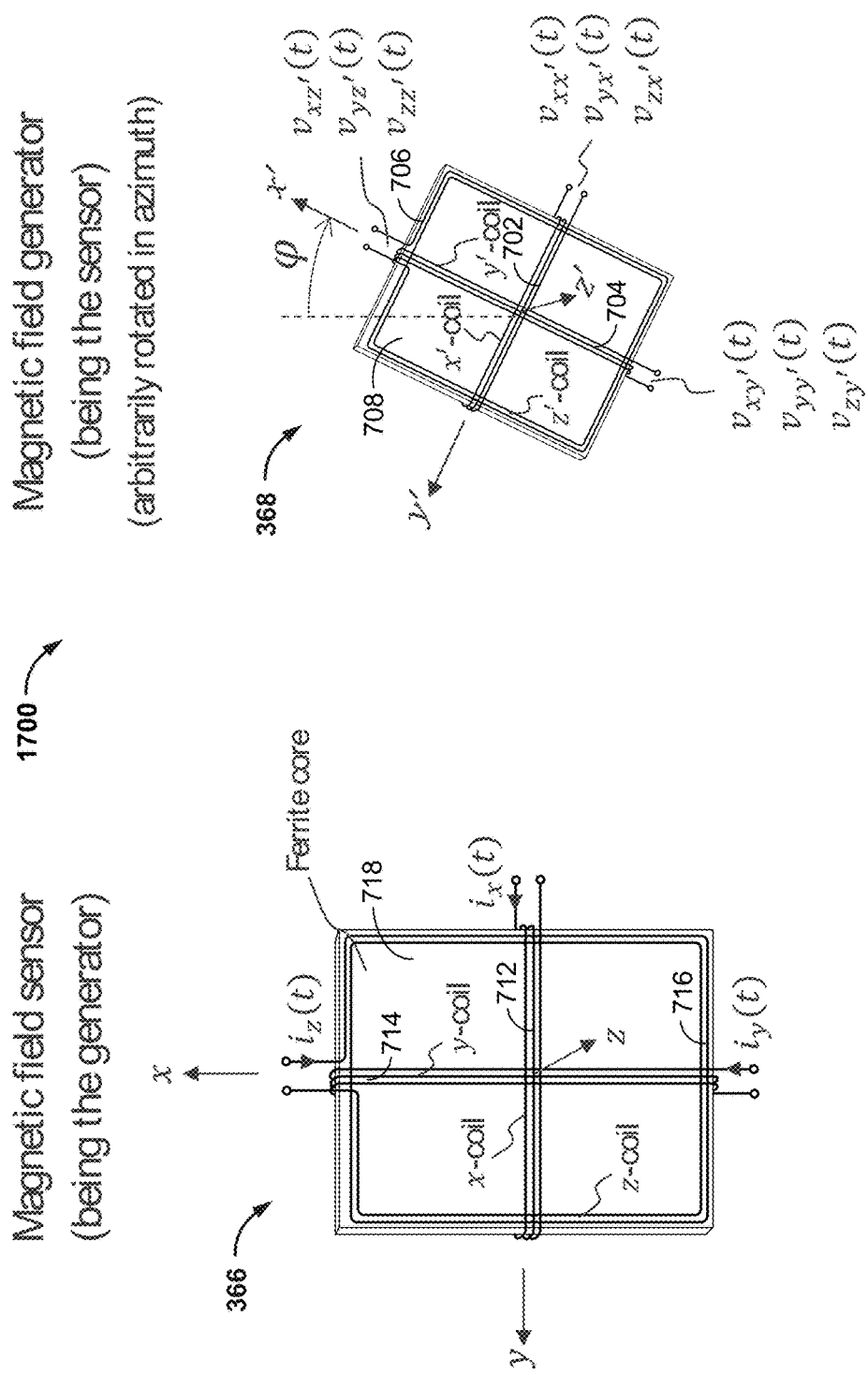
FIG. 17 is a diagram illustrating a fictitious reverse transmitting system where the 3-axis magnetic field generator of FIG. 7 is considered the sensor and the 3-axis magnetic field sensor of FIG. 7 is considered the generator, in accordance with some implementations.

The law of reciprocity of linear electrical networks states that the coupling between the generator coils 702, 704, 706 and the sense coils 712, 714, 716 and thus the mutual inductances between all coil combinations in the system 700 shown in FIG. 7 are equal to the mutual inductances that would be determined in a fictitious reverse transmitting system 1700 as shown in FIG. 17. In mathematical terms, the mutual inductance matrix [M] of the fictitious system 1700 equals the transposed of the mutual inductance matrix [M'] of the system 700, which may be expressed as $$[M] = \begin{bmatrix} M_{xx'} & M_{yx'} & M_{zx'} \\ M_{xy'} & M_{yy'} & M_{zy'} \\ M_{xz'} & M_{yz'} & M_{zz'} \end{bmatrix} = [M']^T = \begin{bmatrix} M_{x'x} & M_{y'x} & M_{z'x} \\ M_{x'y} & M_{y'y} & M_{z'y} \\ M_{x'z} & M_{y'z} & M_{z'z} \end{bmatrix}^T, \quad (34)$$

where, e.g., matrix element $M_{xy'}$ denotes the mutual inductance between the x-sense coil 712 and the y'-generator coil 704 and matrix element $M_{x'y}$ between the mutual inductance between the x'-generator coil 702 and the y-sense coil 714 in connection with FIG. 7.

Since magnetic field position and orientation finding may rely on the magnetic field coupling relationship (e.g., the mutual inductances) as previously discussed, the direction of transmission may be irrelevant. Thus, the above-described position and orientation finding processes may be performed using the concept of the fictitious reverse transmitting system 1700. In this fictitious system, position and rotation angles may refer to the generator's 368 (vehicle's) position and orientation, respectively, in the sensor's (base) coordinate frame having x-, y-, and z-axis.

In analogy to the definitions (6), (7), (8), (11), (12), and (13), vectors and matrices of the fictitious reverse transmitting system 1700 may be defined, for the current vectors:

$$I_x = \begin{bmatrix} I_x \\ 0 \\ 0 \end{bmatrix}, I_y = \begin{bmatrix} 0 \\ I_y \\ 0 \end{bmatrix}, I_z = \begin{bmatrix} 0 \\ 0 \\ I_z \end{bmatrix}, \quad (35)$$

for the 3×3 current matrix:

$$[I] = [I_x \ I_y \ I_z] = \begin{bmatrix} I_x & 0 & 0 \\ 0 & I_y & 0 \\ 0 & 0 & I_z \end{bmatrix}, \quad (36)$$

for the 3×3 angular frequency matrix of the fictitious current excitation:

$$[\omega] = \begin{bmatrix} \omega_x & 0 & 0 \\ 0 & \omega_y & 0 \\ 0 & 0 & \omega_z \end{bmatrix}, \quad (37)$$

for the 3D voltage vectors:

$$V_x = \begin{bmatrix} V_{xx'} \\ V_{xy'} \\ V_{xz'} \end{bmatrix}, V_y = \begin{bmatrix} V_{yx'} \\ V_{yy'} \\ V_{yz'} \end{bmatrix}, V_z = \begin{bmatrix} V_{zx'} \\ V_{zy'} \\ V_{zz'} \end{bmatrix}, \quad (38)$$

for the 3×3 voltage matrix:

$$[V] = \begin{bmatrix} V_{xx'} & V_{yx'} & V_{zx'} \\ V_{xy'} & V_{yy'} & V_{zy'} \\ V_{xz'} & V_{yz'} & V_{zz'} \end{bmatrix} = [V_x \ V_y \ V_z], \quad (39)$$

and for the 9D voltage vector:

$$V = \begin{bmatrix} V_{xx'} \\ V_{xy'} \\ V_{xz'} \\ V_{yx'} \\ V_{yy'} \\ V_{yz'} \\ V_{zx'} \\ V_{zy'} \\ V_{zz'} \end{bmatrix}, \quad (40)$$

In some implementations, for a sinusoidal current excitation of the sense coils 712, 714, 716, the relationship between the three sense coil currents $I_x$, $I_y$, $I_z$ and the resulting nine induced voltage components may be expressed in matrix form using definitions (34), (36), (37), and (39) as $$[V] = [\omega][M][I] \quad (41)$$

Exciting sense coils 712, 714, 716 of the fictitious reverse transmitting system 1700 with the same currents and frequencies as the generator coils 702, 704, 706 in the real forward transmitting system 700, so that $$[I] = [I'] \quad (42)$$

and $$[\omega] = [\omega'] \quad (43)$$

holds, would result in the same nine induced voltage components, and the voltage matrices are related as follows:

$$[V] = [\omega][M][I] = [\omega'][M']^T[I']^T = [V']^T. \quad (44)$$

Hence, the voltage components of the forward and reverse transmitting system are related as follows:

$$V_{xx'} = V_{x'x},$$

$$V_{xy'} = V_{y'x},$$

$$V_{xz'} = V_{z'x}, \quad (45)$$

etc.

Analogously to definition (14), the base positioning subsystem 362 may determine the absolute value of the dot product (i.e., the scalar product) of each unique combination of the 3D vectors $V_x$, $V_y$, $V_z$ that also form the 9D voltage vector V to generate a 6-dimensional absolute scalar (dot) product vector A for the fictitious reverse transmitting system 1700 as follows:

$$A = \begin{bmatrix} |V_x \cdot V_x| \\ |V_y \cdot V_y| \\ |V_z \cdot V_z| \\ |V_x \cdot V_y| \\ |V_x \cdot V_z| \\ |V_y \cdot V_z| \end{bmatrix}. \quad (46)$$

As opposed to the 6D vector A' defined by (14), this vector may become invariant to rotations of the generator 368 with respect to the sensor 366 in implementations where only the magnetic field generator 368 may be considered isotropic.

In analogy to equation (27), a process for determining a position and orientation jointly in the fictitious reverse transmitting system 1700 of FIG. 17 may be defined as:

$$\min_{\text{all } i,j,k,l} |V_0(r_{i,j,k}) - p\hat{V}(-\varphi_l)| \rightarrow \hat{r}, \quad (47)$$

where $V_0(r_{i,j,k})$ denotes the 9D zero-rotated reference vector associated to position $r_{i,j,k}$ and $\hat{V}(-\varphi_l)$ denotes the rotational transform of the 9D detection vector $\hat{V}$ of the fictitious reverse transmitting system 1700 defined by (40). The rotational transform $\hat{V}(-\varphi_l)$ may be defined in analogy to equation (28) by $$\hat{V}(-\varphi_l) = [R_{\varphi_l}]^T[\hat{V}], \quad (48)$$

where matrix $[R_{\varphi_l}]$ represents the rotation matrix defined analogously to definitions (19). In some implementations, reference vectors $V_0(r_{i,j,k})$ are obtained from a LUT analogous to the LUT 1600 of FIG. 16.

The position estimate $\hat{r}$ and rotation angle estimate $\hat{\varphi}$ as output by the process of equation (47) may refer to the generator's 368 position and orientation in the sensor's 366 coordinate frame. In some implementations, position estimate $\hat{r}$ and rotation angle estimate $\hat{\varphi}$ as determined in the fictitious reverse transmitting system 1700 in the sensor's 366 coordinate frame may be transformed back to the generator's 366 coordinate frame using standard coordinate transformation given by the following equations $$\hat{r}' = [R\hat{\varphi}](-\hat{r}), \quad (49)$$

$$\hat{\varphi}' = -\hat{\varphi} \quad (50)$$

Matrix $[R_{\hat{\varphi}}]$ represents the rotation matrix and is defined analogously to definition (19).

Figure 18:
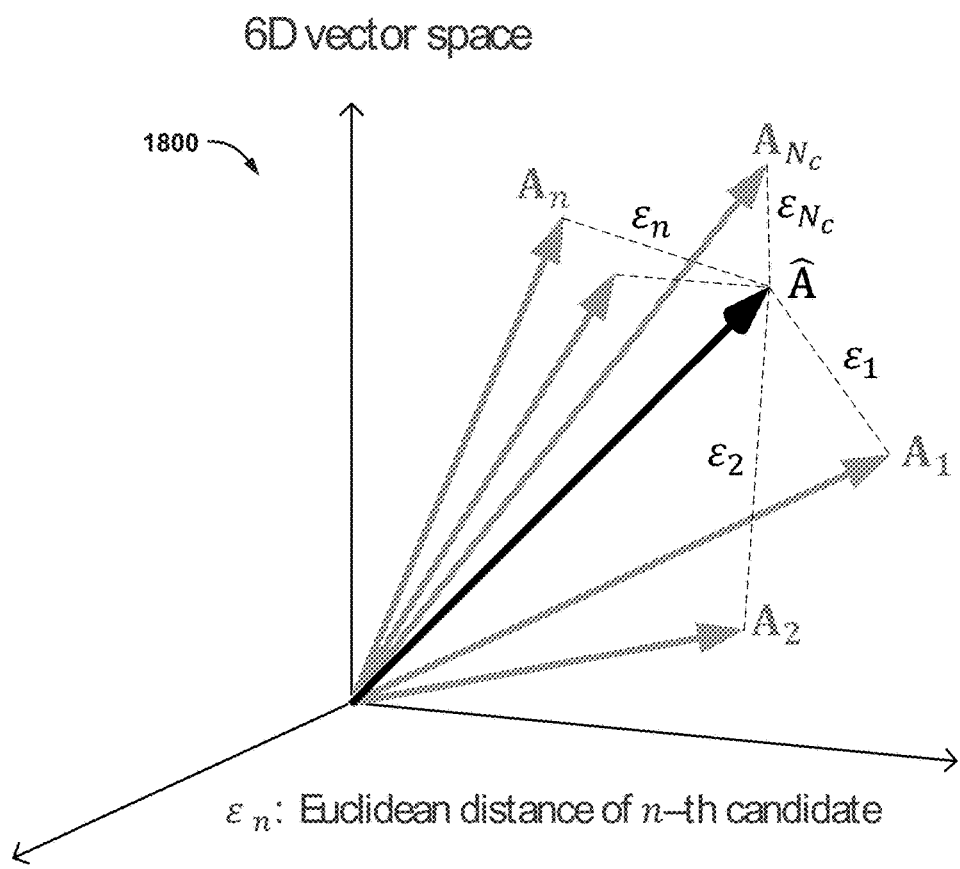
FIG. 18 is another diagram illustrating Euclidean distances between 6D candidate reference vectors of the LUT of FIG. 16 and a 6D detection vector in the 6D vector space.

Accordingly, in some implementations, the base positioning subsystem 362 may determine a position estimate $\hat{r}$ and rotation angle estimate $\hat{\varphi}$ of the generator 368 with respect to the sensor 366 using the concept of the alternate reverse transmitting system 1700 of FIG. 17 in a two-operation process as described below. In the first operation, the base positioning subsystem 362 may find a number $N_c$ of candidate positions $r_1, r_2, \ldots, r_{N_c}$ in an orientation-independent process, which is not further described herein, in analogy to the process of equation (32). FIG. 18 illustrates Euclidean distances $\epsilon_1, \epsilon_2, \ldots, \epsilon_{N_c}$ between 6D reference vectors A ($r_1$), A ($r_2$), \ldots, A ($r_{N_c}$) of a LUT analogous to LUT 1600 and a 6D detection vector Â in the 6D vector space 1800.

Figure 19:
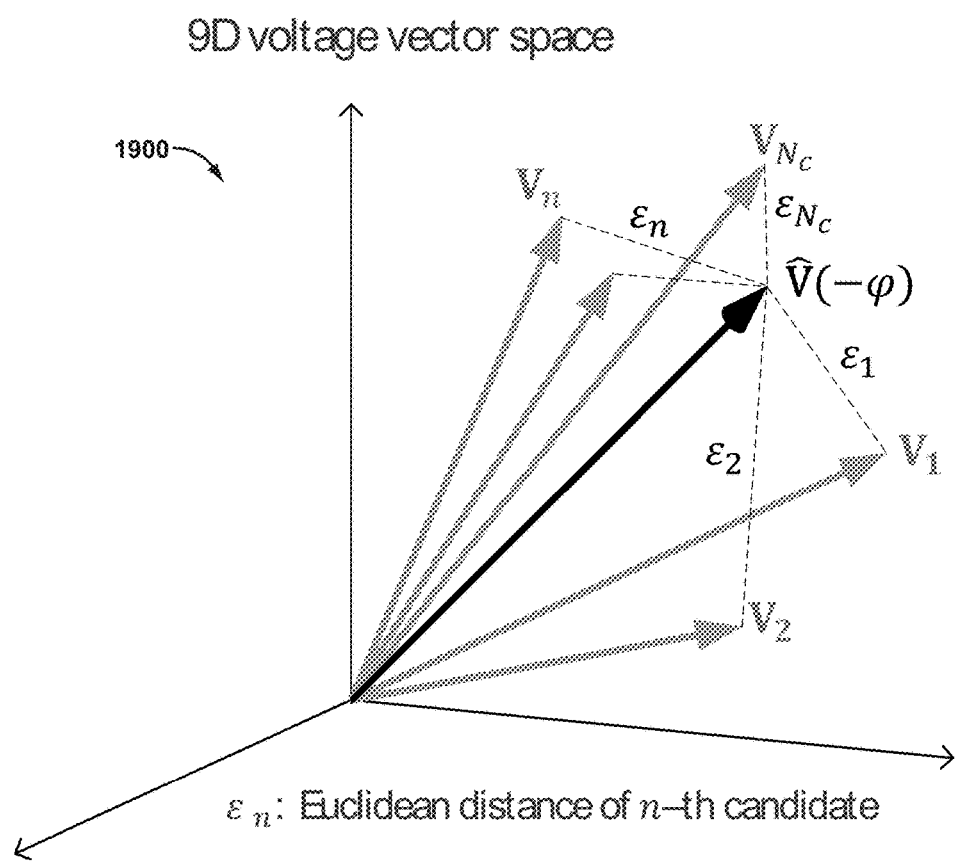
FIG. 19 is another diagram illustrating Euclidean distances between 9D candidate reference vectors of the LUT of FIG. 16 and a rotational transform of a 9D detection vector in the 9D voltage vector space.

In a subsequent (second) operation, the base positioning subsystem 362 may determine, amongst the set of $N_c$ candidate positions $r_1, r_2, \ldots, r_{N_c}$, the position r and the rotation angle $\varphi_l$ for which a Euclidean distance $\epsilon$ between a rotational transform $\hat{V}(-\varphi_l)$ of the 9D detection vector $\hat{V}$ and 9D reference vectors $V_0$ associated to candidate positions $r_1, r_2, \ldots, r_{N_c}$ is a minimum. This second operation of joint position and orientation finding, which is not further described herein, may be analogous to the process of equation (33). FIG. 19 illustrates Euclidean distances $\epsilon_1$, $\epsilon_2, \ldots, \epsilon_{N_c}$ between a rotational transform of detection vector $\hat{V}$ and a plurality of reference vectors $V_0$ in the 9D vector space 1900. The plurality of reference vectors $V_0$ may refer to the zero-rotated 9D reference vectors associated to candidate positions $r_1, r_2, \ldots, r_{N_c}$ and may be stored in a LUT analogous to the LUT 1600 of FIG. 16. The position and rotation angle determined in this second operation may be referred to as the final estimate $\hat{r}$ and $\hat{\varphi}$ of the generator's 368 position and orientation in the sensor's coordinate frame.

Figure 20:
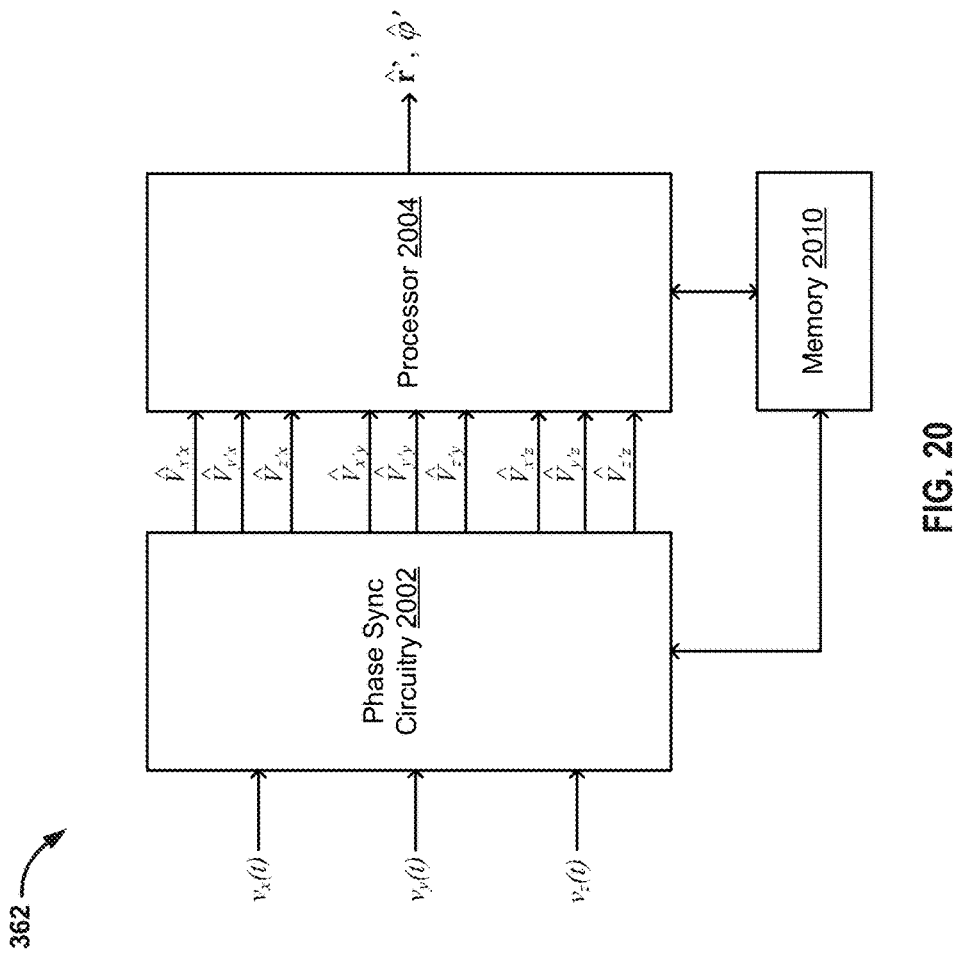
FIG. 20 is a block diagram illustrating parts of the base positioning system of FIG. 3, in accordance with some implementations.

FIG. 20 is a block diagram illustrating at least a portion of the base positioning subsystem 362 of FIG. 3, in accordance with some implementations. The base positioning subsystem 362 may comprise phase synchronization circuitry 2002, a processor 2004, and a memory 2010. The phase synchronization circuitry 2002 may be configured to receive and detect the voltage signals $v_x(t)$, $v_y(t)$, $v_z(t)$ as inputs from each of the sense coils 712, 714, 716 (as illustrated in FIGS. 6 and 7). The phase synchronization circuitry 2002 may further establish a relative phase synchronization based on the received voltage signals $v_x(t)$, $v_y(t)$, $v_z(t)$. The phase synchronization circuitry 2002 may output signals indicative for the detected voltage components $\hat{V}_{x'x}, \hat{V}_{x'y}, \hat{V}_{x'z}, \hat{V}_{y'x}, \hat{V}_{y'y}, \hat{V}_{y'z}, \hat{V}_{z'x}, \hat{V}_{z'y}, \hat{V}_{z'z}$ of the 9D detection vector, as defined by equation (12), to the processor 2004 for subsequent processing. The nine detected voltage components $\hat{V}_{x'x}, \hat{V}_{x'y}, \hat{V}_{x'z}, \hat{V}_{y'x}, \hat{V}_{y'y}, \hat{V}_{y'z}, \hat{V}_{z'x}, \hat{V}_{z'y}, \hat{V}_{z'z}$ may be indicative of corresponding voltages induced into the sense coils 712, 714, and 716 of FIG. 7.

In some implementations, the phase synchronization circuitry 2002 is configured to output a 9D detection vector every $T_p$ seconds, e.g., $T_p$=200 ms. In some other implementations, the phase synchronization circuitry 2002 outputs a 9D detection vector $\hat{V}'$ in periods that depend on a magnitude $|\hat{V}'|$ of the 9D detection vector $\hat{V}'$. For example, the 9D detection vectors $\hat{V}'$ may be output at a lower rate if the magnitude of the vectors are low, and at a higher rate if the magnitude of the vectors are high, according to some rule. Alternatively, the phase synchronization circuitry 2002 may adjust the output rate based on a signal-to-noise ratio (SNR) that may be defined as the ratio of the magnitude of the mean of the vector $\hat{V}'$ and the mean variance in its components (e.g., $\hat{V}_{x'x}, \hat{V}_{x'y}, \hat{V}_{x'z}, \hat{V}_{y'x}, \hat{V}_{y'y}, \hat{V}_{y'z}, \hat{V}_{z'x}, \hat{V}_{z'y}, \hat{V}_{z'z}$). This may allow the phase synchronization circuitry 2002 to perform averaging (e.g., averaging over consecutively detected voltage vectors $\hat{V}'$) when the receive signal level and/or the SNR is low in order to increase the quality (SNR) of the 9D detection vectors $\hat{V}'$ as output by the phase synchronization circuitry 2002. In yet other implementations, the phase synchronization circuitry 2002 adjusts the output rate based on the estimated position $\hat{r}'$ or on a distance, e.g., $\rho=|\hat{r}'|$. For example, the phase synchronization circuitry 2002 may output 9D detection vectors $\hat{V}'$ at a lower rate if the position $\hat{r}'$ of the sensor 366 is far from the generator 368 and at a higher rate if the sensor 366 is close to the generator 368, according to some rule.

In some implementations, the phase synchronization circuitry 2002 is configured to additionally output information about the confidence of the detected voltage vector $\hat{V}'$, e.g., a noise variance, SNR, or similar quality information (not shown in FIG. 20).

The memory 2010 may be configured to store information for use by either or both of the phase synchronization circuitry 2002 and the processor 2004. For example, the LUT 1600 of FIG. 16 and/or any other data associated with any determination, calculation, or process previously described in connection with any of FIGS. 3-19 may be stored in the memory 2010. Although memory 2010 is shown in FIG. 20 as an entity separate from the phase synchronization circuitry 2002 and the processor 2004, the present application is not so limited. The memory 2010 may alternatively be integrated into one or both of the phase synchronization circuitry 2002 or the processor 2004.

The processor 2004 may be configured to receive the signals indicative for the detected voltage components $\hat{V}_{x'x}, \hat{V}_{x'y}, \hat{V}_{x'z}, \hat{V}_{y'x}, \hat{V}_{y'y}, \hat{V}_{y'z}, \hat{V}_{z'x}, \hat{V}_{z'y}, \hat{V}_{z'z}$ being indicative of corresponding voltages induced into the sense coils 712, 714, and 716 of FIG. 7. The processor 2004 may be further configured to output a signal indicative of the position estimate $\hat{r}'$ and angle estimate $\varphi'$ as previously described in connection with FIGS. 3-19 every $T_p$ seconds, e.g., $T_p$=200 ms. In some implementations, the processor 2004 is configured to receive confidence information about the detection vector $\hat{V}'$ and to output other confidence information about the position estimate $\hat{r}'$ and angle estimate $\varphi'$ (not shown in FIG. 20).

For example, in some implementations, the phase synchronization circuitry 2002 or the processor 2004 may be configured to determine a first detection vector $\hat{V}'$ having a first number of dimensions (e.g., 9D) based on the respective voltage signals $v_x(t)$, $v_y(t)$, $v_z(t)$ generated by the plurality of sense coils 712, 714, 716 (see FIGS. 6 and 7 and Equation (12)).

In some implementations, the processor 2004 may further be configured to determine a second detection vector $\hat{A}'$ having a second number of dimensions (e.g., 6D) less than the first number of dimensions (see FIGS. 6 and 7 and Equation (14)). The second detection vector $\hat{A}'$ may be rotationally invariant with respect to an orientation of the plurality of sense coils 712, 714, 716.

In some implementations, the processor 2004 may further be configured to select a plurality of stored first reference vectors $A'(r'_1), A'(r'_2), \ldots, A'(r'_{N_c})$ (see FIGS. 14 and 16), each having the second number of dimensions (e.g., 6D) and each corresponding to a respective calibrated position $r'_1, r'_2, \ldots, r'_{N_c}$ with respect to the magnetic field generator 368. The plurality of stored first reference vectors $A'(r'_1), A'(r'_2), \ldots, A'(r'_{N_c})$ may be selected based on having a smaller Euclidean distance $\epsilon_1, \epsilon_2, \ldots, \epsilon_{N_c}$ between the selected plurality of stored first reference vectors $A'(r'_1), A'(r'_2), \ldots, A'(r'_{N_c})$ and the determined second detection vector $\hat{A}'$ than all other stored first reference vectors $A'(r')$ (see Equation (32)).

The processor 2004 may further be configured to select a plurality of stored second reference vectors $V'_0(r'_1), V'_0(r'_2), \ldots, V'_0(r'_{N_c})$ (see FIGS. 15 and 16), each having the first number of dimensions (e.g., 9D) and each corresponding to the respective calibrated position $r'_1, r'_2, \ldots, r'_{N_c}$ with respect to the magnetic field generator 368 for one of the selected plurality of stored first reference vectors $A'(r'_1), A'(r'_2), \ldots, A'(r'_{N_c})$ (see FIGS. 14 and 16).

The processor 2004 may further be configured to rotationally transform the determined first detection vector $\hat{V}'$ by at least one predetermined rotation angle, e.g., $\varphi'$ (see Equation (28)).

The processor 2004 may further be configured to increment the at least predetermined rotation angle, e.g., $\varphi'$, by a predefined angle step and rotationally transform the determined first detection vector $\hat{V}'$ by the incremented rotation angle $\varphi'$ a plurality of times until a limit of a predetermined rotation angle range is reached (see Equation (30)).

The processor 2004 may further be configured to, for each of the rotationally transformed first detection vectors, determine a Euclidean distance $\epsilon$ between the rotationally transformed first detection vector $\hat{V}'(-\varphi')$ and each of the selected stored second reference vectors $V'_0(r'_1), V'_0(r'_2), \ldots, V'_0(r'_{N_c})$ (see FIGS. 15 and 16, and Equation (33)).

The processor 2004 may further be configured to determine a position and orientation of the sensor 366 with respect to the magnetic field generator 368 based on the selected stored second reference vectors $V'_0(r')$ for which the determined Euclidean distance $\epsilon$ between the selected stored second reference vector $V'_0(r')$ and any of the rotational transforms of the first detection vector $\hat{V}'(-\varphi')$ is a minimum (see FIG. 15 and Equation (33)).

The processor 2004 may further be configured to interpret inputs as received from the phase synchronization circuitry 2002 as the 9D detection vector $\hat{V}$ and to determine a position and orientation of the magnetic field generator 368 with respect to the magnetic field sensor 366 in the sensor's coordinate system using the concept of the alternate reverse transmitting system as previously described in connection with FIGS. 17-19.

Figure 21:
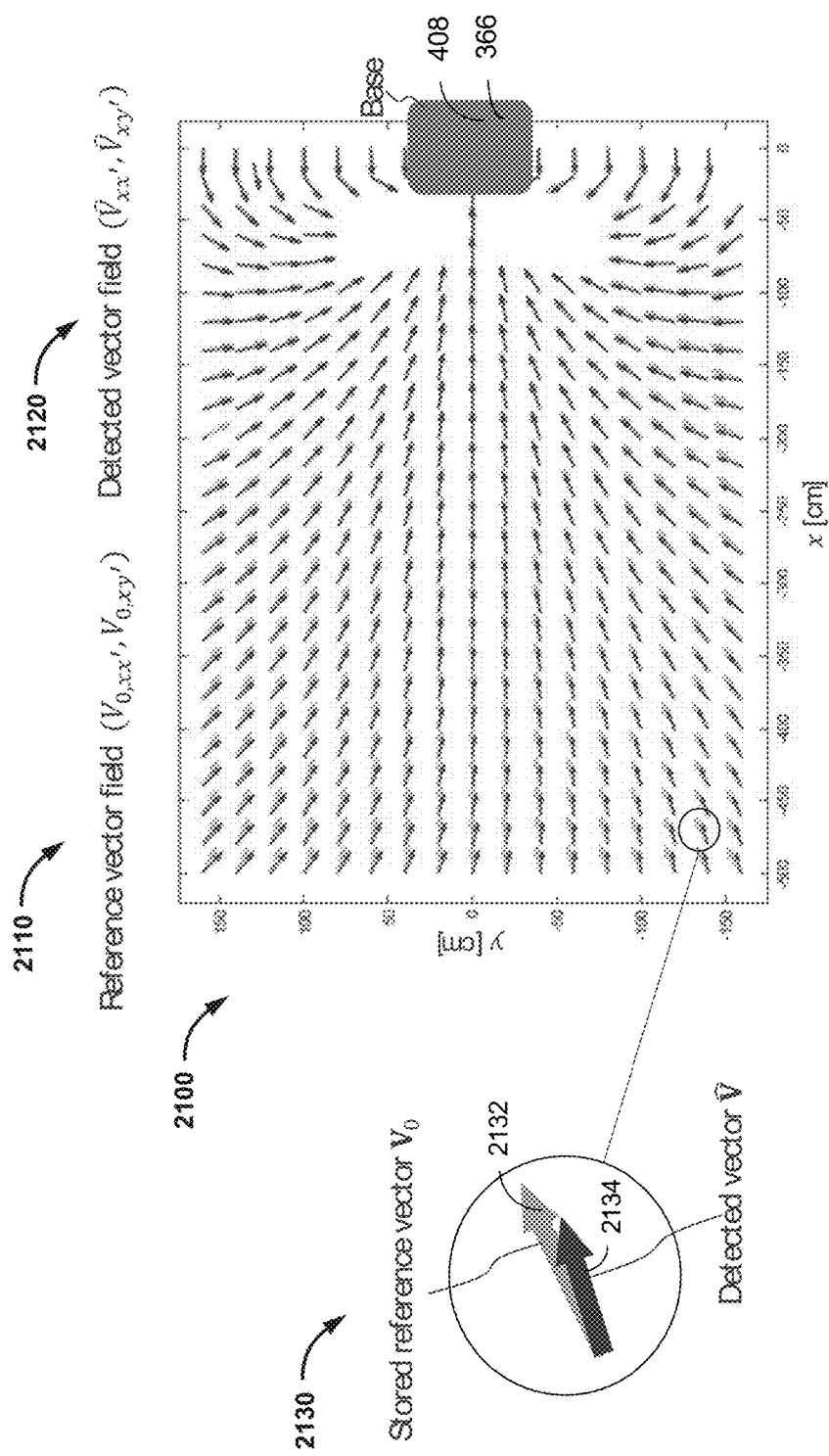
FIG. 21 is a diagram illustrating vector field distortion effects as they may be encountered in real environments of a parking space.

FIG. 21 illustrates an exemplary vector plot 2100 displaying two vector fields 2110 and 2120 in comparison and a zoom-in view 2130 of two individual 2D vectors 2132 and 2134 of the vector field 2110 and 2120, respectively. The 2D vector 2132 is composed of the $V_{0,xx'}$- and $V_{0,xy'}$-component of a reference vector $V_0$ (e.g., a 9D reference vector) as obtained in a process of calibration, e.g., for an ideal environment. The 2D vector 2134 is composed of the $\hat{V}_{xx'}$- and $\hat{V}_{xy'}$-component of the vector $\hat{V}$ as detected by the base positioning subsystem 362 in a real parking space. Components $\hat{V}_{xx'}$- and $\hat{V}_{xy'}$ are indicative for the voltage signals induced into the generator coils 702 and 704 by the x-magnetic field as generated by the sense coil 712 of a zero-oriented sensor 366 ($\varphi=0$) of the fictitious reverse transmitting system of FIG. 17. The vector plot 2100 may display 2D vectors 2132 and 2134 on grid points with 20 cm spacing over an area extending from 0 to 500 cm in x-axis direction and from −150 cm to 150 cm in y-axis direction. (Two small areas near the base 408 may bevoid due to no vector data being measured there.) The x- and y-axis, as illustrated in FIG. 21, may refer to the sensor's 366 coordinate frame. To ease visualization and comparison of the vector fields 2110 and 2120, all vectors 2134 and 2132 may be scaled in magnitude by a common factor so that the larger of the two has unity magnitude. Due to the $3^{rd}$ power law decay of magnetic near fields, the true vector magnitude may vary by several orders of magnitudes if the generator 368 is moved e.g. from a position x=0, y=0 to a position x=500 cm, y=150 cm.

Figure 22:
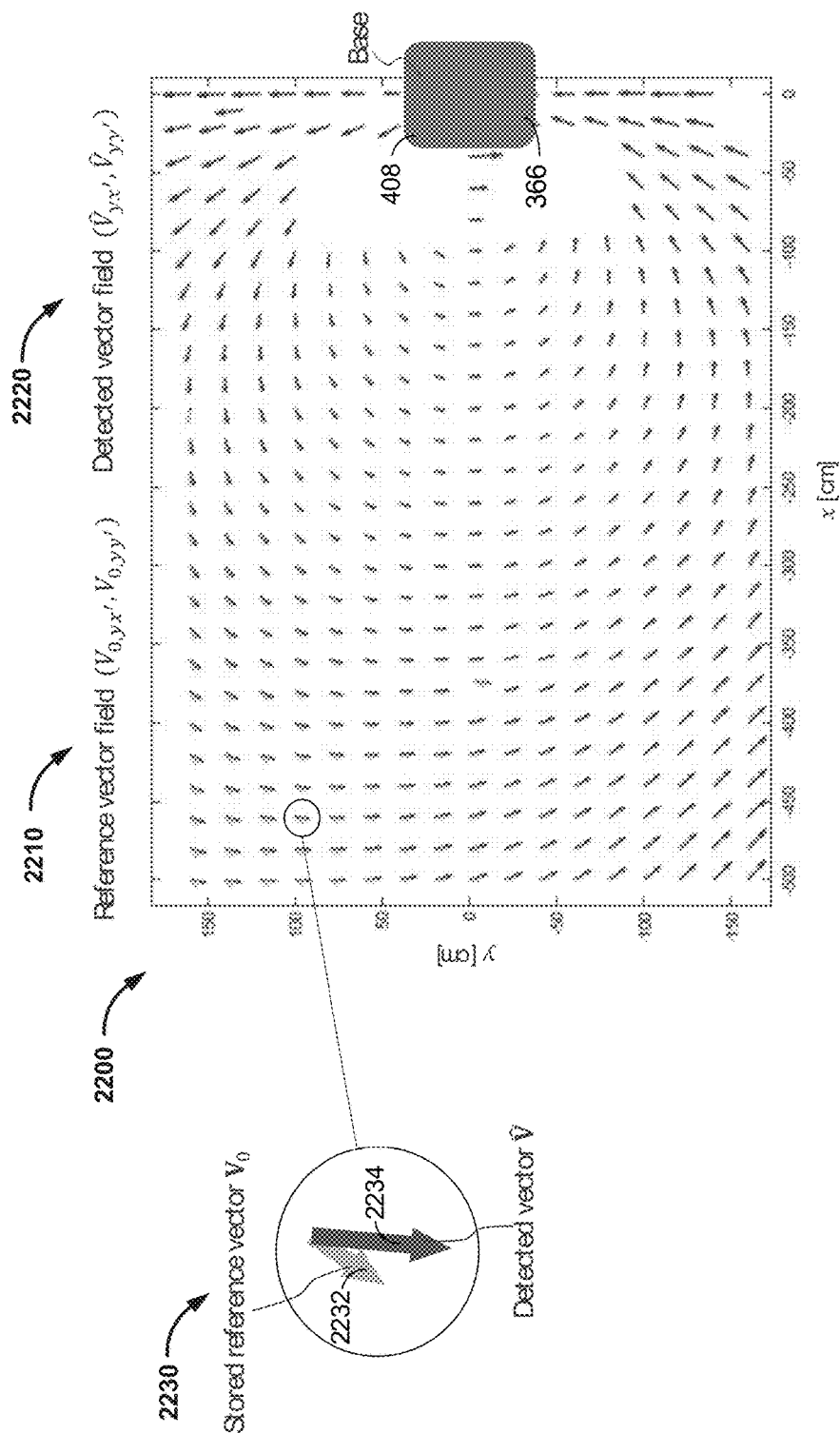
FIG. 22 is another diagram illustrating vector field distortion effects as they may be encountered in real environments of a parking space.

Likewise, FIG. 22 illustrates an exemplary vector plot 2200 displaying two vector fields 2210 and 2220 in comparison and a zoom-in view 2230 of two individual vectors 2232 and 2234 of the vector field 2232 and 2234, respectively. The 2D vector 2232 may be composed of the $V_{0,yx'}$- and $V_{0,yy'}$-component of a reference vector $V_0$ (e.g., a 9D reference vector) as obtained in a process of calibration for an ideal environment. The 2D vector 2234 is composed of the $\hat{V}_{yx'}$- and $\hat{V}_{yx'}$-components of the vector $\hat{V}$ as detected by the base positioning subsystem 362 in a real parking space. Components $\hat{V}_{yx'}$- and $\hat{V}_{yx'}$ are indicative for the voltage signals induced into the generator coils 702 and 704 by the y-magnetic field as generated by the sense coil 714 of a zero-oriented sensor 366 ($\varphi=0$) of the fictitious reverse transmitting system of FIG. 17. The vector plot 2200 displays 2D vectors 2232 and 2234 on the same grid points as in the vector plot 2100 of FIG. 21. The x- and y-axis refer to the sensor's 366 coordinate frame. (Two small areas near the base 408 may be void because no vector data being measured there.) Like in FIG. 21, vectors 2232 and 2234 may be scaled in magnitude by a common factor so that the larger of the two has unity magnitude.

Vector plots 2100 of FIGS. 21 and 2200 of FIG. 22 show that detected vectors 2134 and 2234 generally may somewhat deviate from the reference vectors 2132 and 2232, respectively. In some implementations, these deviations between vectors 2134 and 2132 and between 2234 and 2232 may become more significant as the distance from the base 408 increases. In some implementations, these deviations may be due to field distortion effects from metallic structures in the environment of the magnetic field based positioning system 600.

Figure 23:
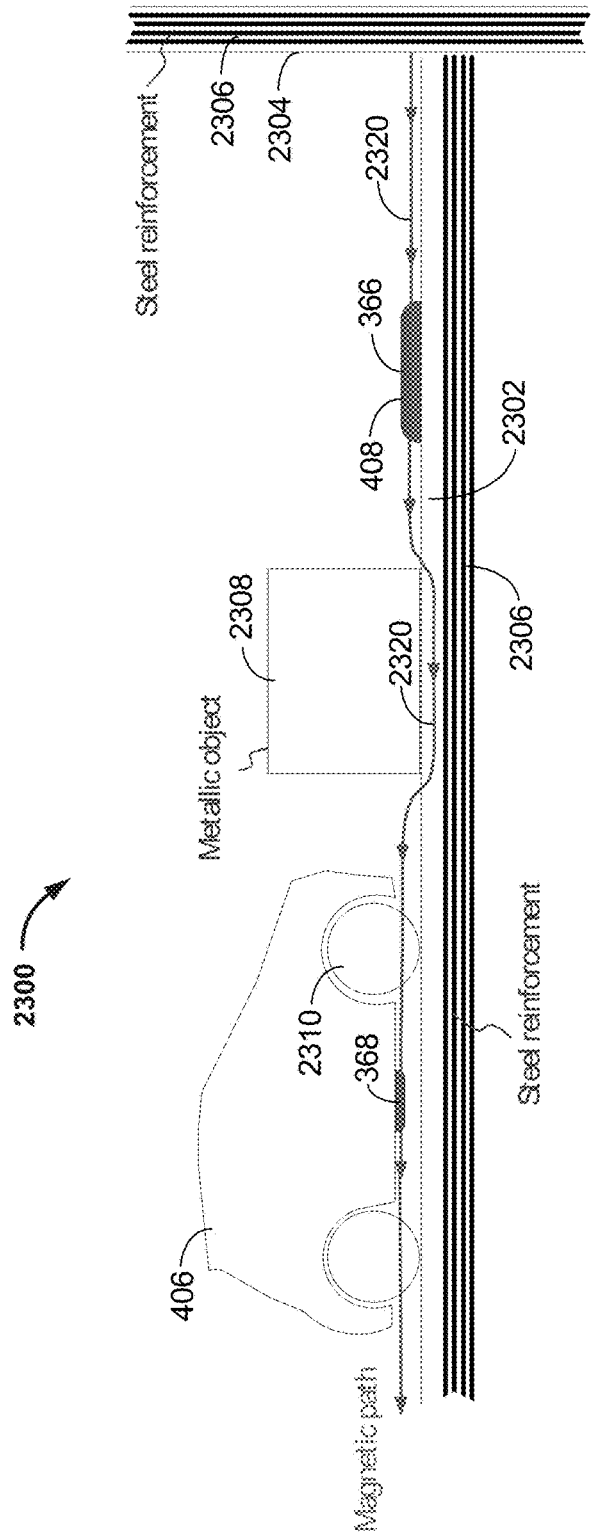
FIG. 23 is a diagram illustrating a parking scenario with a ferroconcrete wall and a ferroconcrete ground also indicating a magnetic field path, in accordance with some implementations.

FIG. 23 is a side view illustrating an exemplary parking scenario 2300 and potential sources of field distortion. FIG. 23 schematically shows a vehicle 406 equipped with a magnetic field generator 368, a base 408 integrating a magnetic field sensor 366, a concrete ground 2302 containing steel reinforcement 2306, and a concrete wall 2304 containing steel reinforcement 2306. As illustrated in FIG. 23, steel reinforcement 2306 in the ground 2302 may be located some depth below the surface of the ground 2302 (floor line), which is quite common for ferroconcrete parking grounds. Typically, steel reinforcement (rebar) 2306 can be found at a depth of 5-10 cm below the surface. FIG. 23 also shows an exemplary path of magnetic flux 2320 starting in the magnetic field sensor 366 that would generate a horizontally polarized magnetic moment, e.g., in x-axis direction, if the sense coil 712 of the sensor 366 was driven by a current $I_x$ as shown in the fictitious reverse transmitting system of FIG. 17. Furthermore, FIG. 23 shows a relatively large metallic object 2308 placed on the floor obstructing the direct magnetic flux path 2320 between the sensor 366 and the generator 368.

Against initial expectations, such metallic object 2308 may have a negligible impact on the position and orientation as determined by a magnetic field based positioning system 600 in accordance with some implementations described herein. A negligible impact may be also found for the wheels 2310 of the vehicle 406 and also for any other vehicle, e.g., parked on an adjacent parking space regardless of their position. This may be explained by the fact that magnetic fields may be able to easily get around a metallic object, e.g., metallic object 2308, if there exists a gap (duct) between obstructing metallic objects, such as between metallic object 2308 and the steel reinforcement 2306 as illustrated in FIG. 23.

While the portion of the magnetic flux path 2320 from the sensor 366 to the generator 368 may be virtually unimpeded, the portion of the magnetic flux path 2320 as indicated on the right hand side of the base 408 may be affected by the steel reinforcement 2306 of the concrete wall 2304. In some implementations, an electrically conductive structure (e.g. steel reinforcement 2306) may set a boundary for magnetic fields resulting in significant field distortion with respect to a free-space field. Since magnetic field lines are closed lines, a field distortion due to the ferroconcrete wall 2306 may be also experienced on the opposite side of the base 408 where the vehicle 406 is located, albeit to a much lesser extent.

Distortion of low frequency alternating magnetic fields may be also caused by eddy currents induced into the conductive structure of a wall or a ground. For example, in some implementations, the steel reinforcement 2306 may form an electrically conductive mesh structure. At frequencies at certain ranges (e.g., in the 100 kHz range), eddy currents induced into such conductive mesh structure of steel reinforcement 2306 with the ferroconcrete wall 2304 may generate a secondary magnetic field that may cancel out at least a portion of magnetic field components perpendicular to the plane of the mesh structure, causing shielding or field distortion effects.

In some implementations, field distortion effects such as those due to the presence of a ferroconcrete wall 2304 as illustrated in FIG. 23 may be roughly assessed by modelling the steel reinforcement 2306 as an infinite conductive plane and using image charge theory as known from electrostatics.

This theory can be analogously applied to alternating magnetic fields generating eddy currents in conductive planes.

Figure 24:
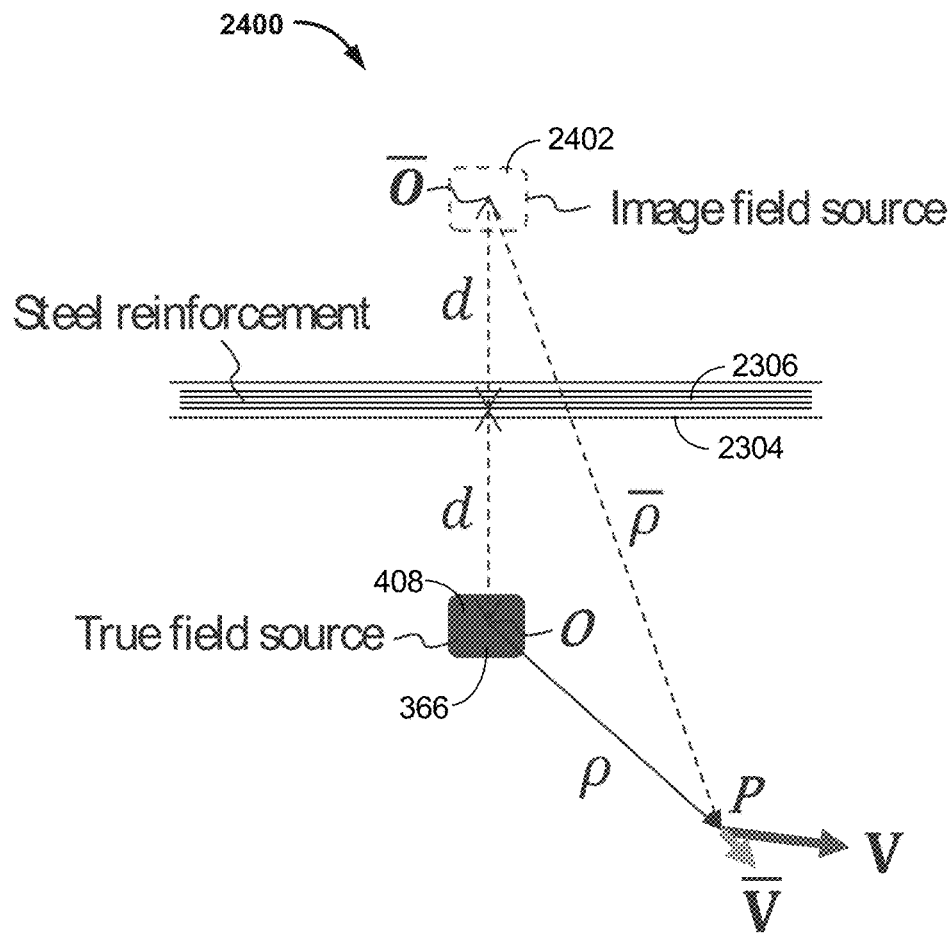
FIG. 24 is a diagram illustrating vector field distortion effects due to a ferroconcrete wall using the model of an image field source.

FIG. 24 is a top down view of a scenario 2400 illustrating an exemplary magnetic field distortion effect of a ferroconcrete wall 2304 using an image source model. As in FIG. 23, FIG. 24 assumes the magnetic field sensor 366 integrated in the base 408 and being used as the field generator of the fictitiousreverse transmitting system 1700. The magnetic center O of the magnetic field generated by the sensor 366 (considered the generator in the fictitious reverse transmitting system 1700) may be located at a distance d from the surface of the wall's steel reinforcement 2306. Point P represents the position (magnetic center) of the vehicle based generator 368 that is considered the sensor in the fictitious reverse transmitting system 1700. FIG. 24 also shows an image field source 2402 with center at symmetry point $\bar{O}$ of O at a distance d opposite of the true field source 366 modelling the distortion effect of the ferroconcrete wall 2304 that is assumed as an infinite conducting plane. Furthermore, voltage vectors V and $\bar{V}$ correspond to voltage vectors generated by the true field source 366 and by the image field source 2402, respectively, at the generator's 368 position P. Since the base positioning subsystem 362 may not be able to distinguish between signals received from a true and an image field source, the voltage vector at its output will be the sum (superposition) of the true vector V and an image vector $\bar{V}$, resulting in a field distortion effect.

In some implementations, the field distortion effect at point P may be quantified by the ratio between the magnitudes of the image vector $\bar{V}$ to the true vector V, also referred to as the field distortion factor. For distances between positions P and O much larger than the sizes of the sensor 366 and generator 368, the third power law may apply and the field distortion factor may be approximately given by $$\frac{|\bar{V}|}{|V|} \cong \frac{\rho^3}{\bar{\rho}^3} = \left(\frac{\rho}{\bar{\rho}}\right)^3, \quad (51)$$

where $\rho$ and $\bar{\rho}$ denote the distances between point P and O, and between point P and $\bar{O}$, respectively. For a distance ratio $\bar{\rho}/\rho=2$, the resulting field distortion factor is approximately ⅛ (12.5%). For a base 408 located 2.5 m from a ferroconcrete wall 2304 as illustrated in FIG. 24 and a vehicle 406 at a point P on the x-axis, Equation (51) predicts a minor field distortion factor of 2.3% for a vehicle-to-base distance $\rho=2$ m. However for distances $\rho=3$ m, predicted field distortion is 5.3%, which may be considered substantial vis-à-vis a positioning accuracy, e.g., as specified above in connection with FIG. 3. The general trend as predicted by this simple image source model can be found in areas such as parking garages.

Figure 25:
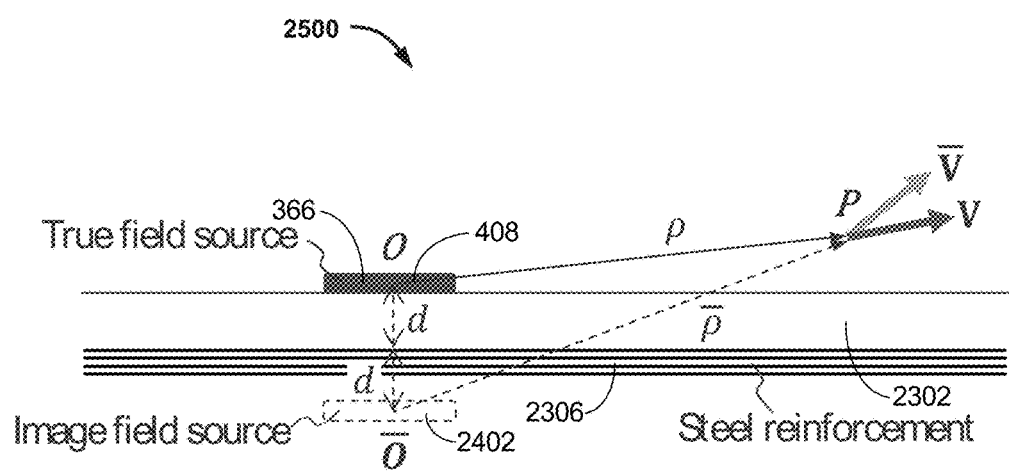
FIG. 25 is a diagram illustrating vector field distortion effects due to a ferroconcrete ground using the model of an image field source.

FIG. 25 is a side view of an exemplary scenario 2500 illustrating the magnetic field distortion effect of a ferroconcrete ground 2302 using the image source model. FIG. 25 shows the base 408 integrating the magnetic field sensor 366 placed on the ferroconcrete ground 2302 with a magnetic center at point O. The upper surface of the steel reinforcement 2306 is at a distance d below point O. As in the scenario 2400 of FIG. 24, the scenario 2500 considers the sensor 366 being the field source of the fictitious reverse transmitting system 1700 of FIG. 17. Point P represents the position (magnetic center) of the vehicle based generator 368 that is considered the sensor. Modelling the upper surface of the steel reinforcement 2306 as an infinite conducting plane, its effect on the voltage vector V as detected at point P can be assessed by an image field source 2402 with magnetic center located at a symmetry point $\bar{O}$ of O at the same distance d on the opposite side of the conductive plane defined by the steel reinforcement 2306 as shown in FIG. 25. At point P and at any other point within a limited area, the true voltage vector V and the image voltage vector $\bar{V}$ as produced by the true field source 366 in distance $\rho$ and by the image field source 2402 in distance $\bar{\rho}$, respectively, will superimpose, causing a field distortion effect. Since true field source 366 and image field source 2402 may have a magnetic moment in the same direction and since distances $\rho$ and $\bar{\rho}$ may be similar, voltage vectors V and $\bar{V}$ as detected at position P may also be similar with respect to both magnitude and direction. This may result in a sum vector V+$\bar{V}$ that is substantially larger in magnitude than the individual vectors V and $\bar{V}$. Moving the generator 368 (point P) further away from the field source but maintaining its height above the ground 2302, the field distortion factor converges towards 100%, indicating that the magnitude |V+$\bar{V}$| will reach a value that is almost a factor of two larger than |V|. This voltage doubling effect can be observed in many ferroconcrete parking grounds.

The image source model may also apply to scenarios with a ferroconcrete ceiling (not shown), if the ceiling can be modelled by an infinite conducting plane, wherein the image source would appear approximately at double ceiling height.

In some implementations, the image source model may also apply to a forward transmitting system generating magnetic fields on the vehicle 406 and sensing the fields in the base 408. Due to the law of reciprocity of magnetic field coupling, the resulting field distortion factor |$\bar{V}'$|/|V'| may be the same as that of the fictitious reverse transmitting system. In addition, contemplating a system generating magnetic fields on the vehicle 406 suggests that the vehicle 406 itself and in particular the vehicle's 406 chassis (if metallic) may also exert a field distortion effect with respect to a free space environment. For example, eddy currents may be induced into a vehicle's 406 metallic chassis (underbody) generating a secondary field that superimposes with the primary field as generated by the magnetic field generator 368.

In addition, a simple image source model based on an infinite conducting plane as described above may not apply in areas with substantial inhomogeneity, e.g., in parking grounds where there is substantial inhomogeneity in the steel reinforcement 2402 of the ground 2302, or where the steel reinforcement 2402 terminates in the vicinity of the magnetic field generator 368 or of the magnetic field sensor 366.

Figure 26:
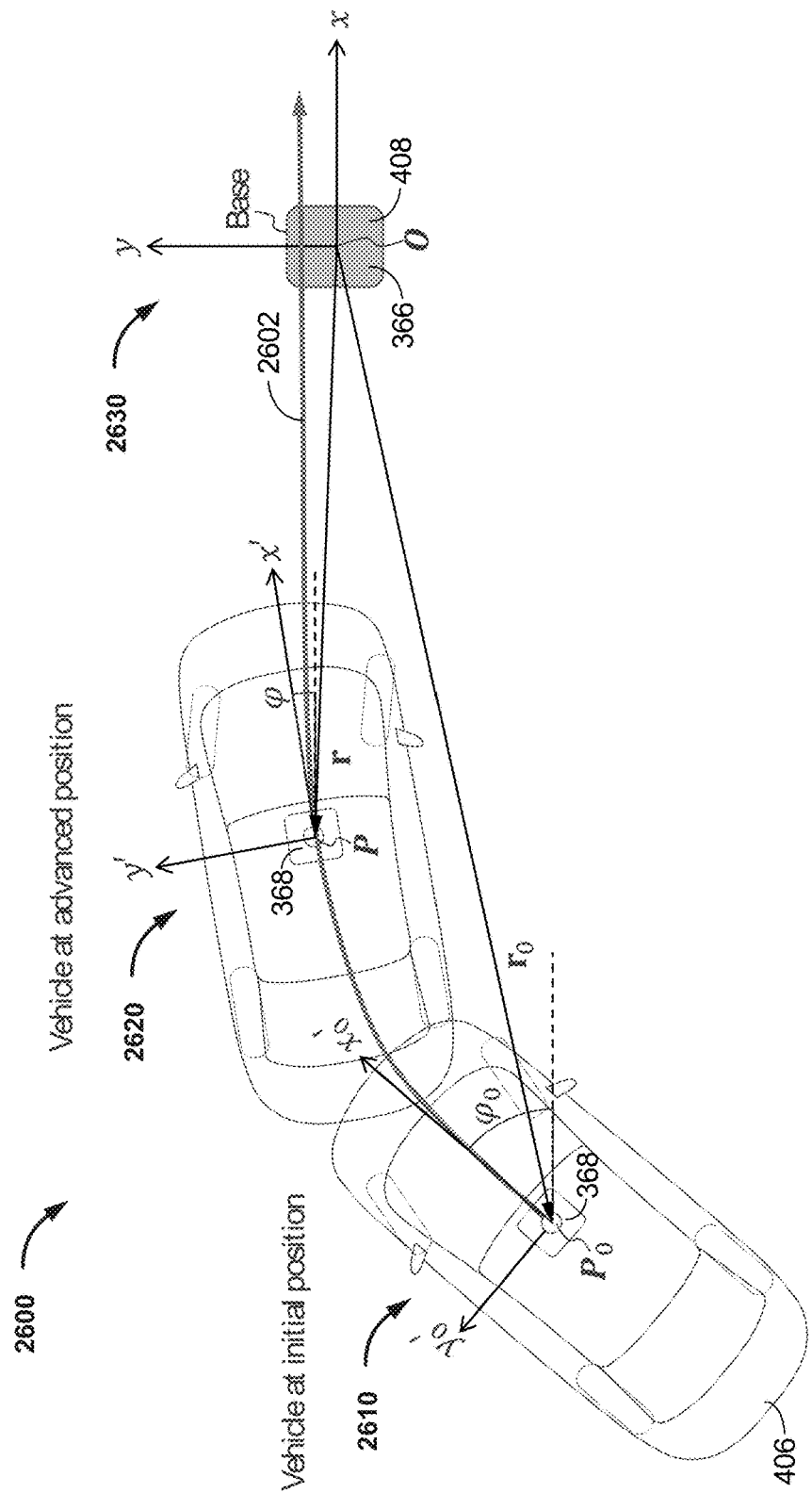
FIG. 26 is a diagram illustrating a vehicle on its approach towards a charging base along a driving trajectory and the different coordinate frames as they may be used to describe the system, in accordance with some implementations.

FIG. 26 illustrates an exemplary scenario 2600 with a vehicle 406 approaching a base 408 on a driving trajectory 2602. The vehicle 406 may be at a first position on the driving trajectory 2602 that may be considered an initial position $P_0$, and at a second position P further advanced towards the base 408 on the driving trajectory 2602. FIG. 26 also illustrates three coordinate frames, comprising a first vehicle coordinate frame 2610 having axes $x_0'$ and $y_0'$ and its origin at the initial vehicle position $P_0$, a second vehicle coordinate frame 2620 having axes x' and y' and its origin at the vehicle's advanced position P, and a base coordinate frame 2630 having axes x and y and origin O. The first vehicle coordinate frame 2610 is also referred to herein as the initial reference frame 2610. Though useful in some considerations, FIG. 26 does not show the corresponding (vertical) $z_0'$-, z- and z'-axis that would extend out the front of the page. Furthermore, FIG. 26 indicates position vectors $r_0$ and r with origins in O pointing to positions $P_0$ and P, respectively, as well as rotation angles $\varphi_0$ and $\varphi$ as needed to define a positional relationship between point O at the base 408 and the vehicle 406 at its initial position $P_0$ and at its advanced position P, respectively. As in FIGS. 4 and 5, FIG. 26 illustrates the origins of coordinate frames 2610, 2620, and 2630 as coincident with the respective magnetic centers of the vehicle 406 based magnetic field generator 368 and the base 408 integrated magnetic field sensor 366.

To streamline terminology, a position and orientation (rotation angle) of a body or a coordinate frame may be referred to as the "pose" of the body or the "pose" of the coordinate frame. Correspondingly, a sequence of consecutively determined poses of a moving vehicle 406, each comprised of a position vector r and rotation angle φ, may be called a "pose trajectory". In some implementations, where physical restriction as defined by Equation (2) applies, a pose may be expressed as a 4D vector, e.g.:

$$X = \begin{bmatrix} r_x \\ r_y \\ r_z \\ \varphi \end{bmatrix} \qquad (52)$$

Correspondingly, a pose trajectory may be expressed as a series (sequence) of pose vectors $X_i$, where index i refers to the i-th vector of the series of pose vectors.

In some implementations, assuming the base 408 is fixed on the ground, the pose of the base coordinate frame 2630 is normally also fixed and may be defined, e.g., in a world coordinate system (not shown in FIG. 26). Therefore, the base coordinate frame 2630 may be considered as an absolute coordinate frame. Correspondingly, the pose of the vehicle 406 in the base coordinate frame 2630 may be referred to as an absolute pose. In contrast, the pose of the vehicle coordinate frame 2620 is generally not fixed and undetermined with respect to the world coordinate frame and therefore may be referred to as a relative coordinate frame. This may be also true for the initial reference frame 2610. Correspondingly, the pose of the vehicle 406 at position P, e.g., with respect to the initial reference frame 2610 may be referred to as a relative pose of the vehicle 406. Correspondingly, a sequence of consecutively determined absolute poses of a moving vehicle 406 may be referred to as an absolute pose trajectory and a sequence of consecutively determined relative poses as a relative pose trajectory.

Figure 27:
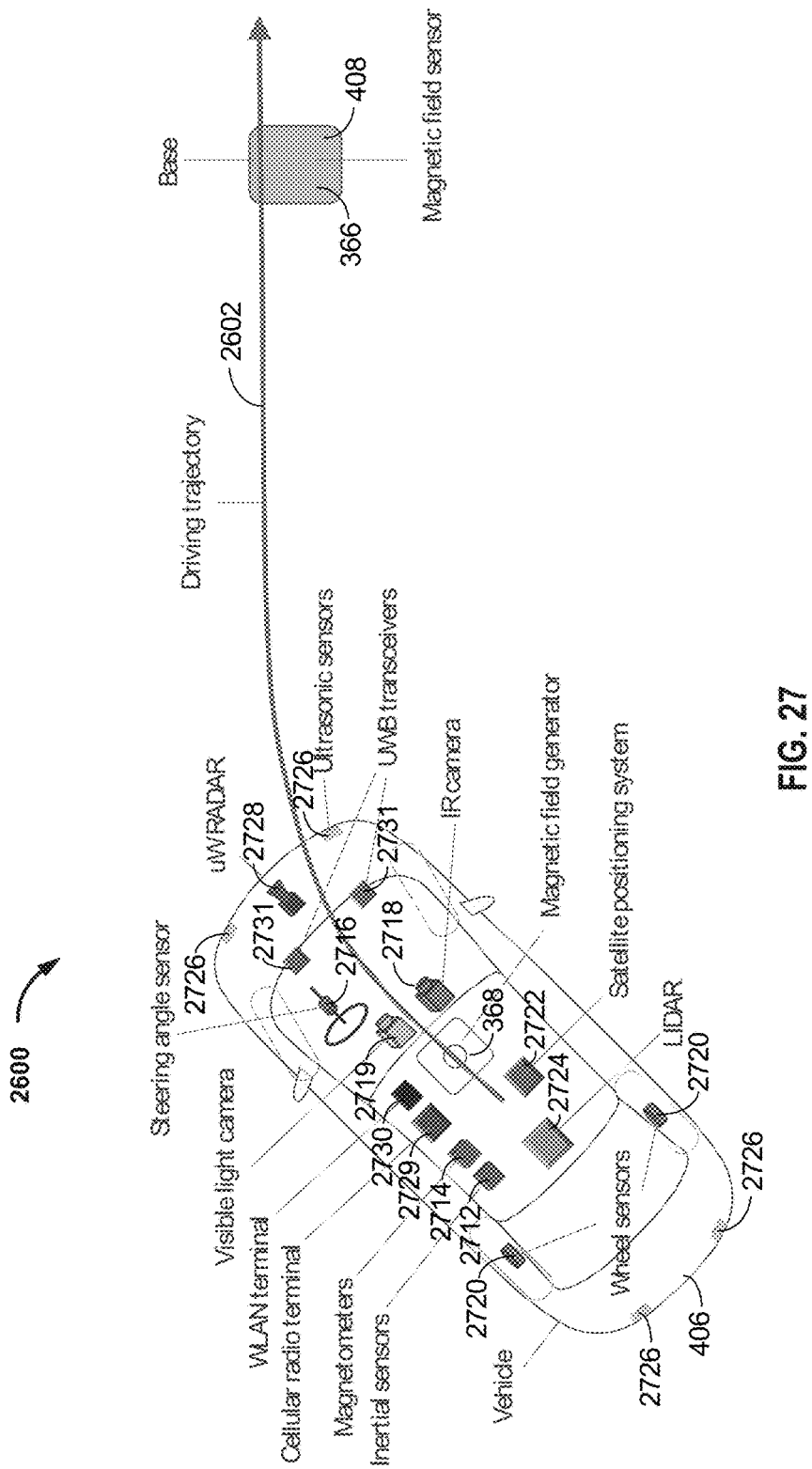
FIG. 27 is a diagram illustrating a vehicle on its approach towards a charging base, the vehicle equipped with a magnetic field generator and numerous auxiliary sensors and systems.

FIG. 27 illustrates an alternate view of the scenario 2600 as illustrated in FIG. 26. FIG. 27 illustrates the base 408 integrating the magnetic field sensor 366 and the vehicle 406 equipped with multiple systems and sensors including magnetic field generator 368. The systems and sensors may include wheel sensors 2720, steering angle sensor 2716, satellite navigation system 2722, ultrasonic sensors 2726, and/or other systems and sensors that may be used by the vehicle for safety and navigation purposes. The systems and sensors may further include inertial sensors 2712 (e.g., comprising accelerometers and gyroscopes), magnetometers 2714, visible light camera 2719, infrared (IR) camera 2718, light detection and ranging (LIDAR) system 2724, microwave RADAR system 2728, cellular radio terminal 2729, and/or other systems and sensors that may be used by the vehicle for other applications, such as autonomous driving and/or autonomous parking.

In some implementations, data from wheel sensors 2720 and steering angle sensor 2716 can be used to determine a relative pose or a relative pose trajectory of the vehicle 406 in a relative coordinate frame, e.g., in the initial reference frame 2610 using dead reckoning methods. However, in some implementations, data from sensors 2720 and 2716 may not allow determining an absolute pose or an absolute pose trajectory in an absolute coordinate frame, e.g., the base coordinate frame 2630. Similarly, data obtained from the inertial sensors 2712, which may measure linear acceleration and angular velocity with respect to an initial pose of the vehicle 406, may in some implementations be used to determine a relative pose or a relative pose trajectory instead of an absolute pose or absolute pose trajectory.

A relative pose or a relative pose trajectory, e.g., in an initial reference frame 2610, can be also determined upon data obtained from optical systems, e.g., visible light camera 2719, IR camera 2718 or LIDAR system 2724, using computer vision and dead reckoning methods (also referred to as visual odometry). Such methods may be based on feature extraction and feature tracking in sequential video data (camera images) for determining a relative pose or a relative pose trajectory, and may rely on a majority of features originating from objects (structures) being at least temporarily static with respect to the base 408 and that can be unambiguously tracked over consecutive images. Such objects may include natural objects such as walls, pillars, parking place (road) markings in the environment of a parking space, the base 408 itself, and one or more artificial objects (targets) disposed for the purposes of vehicle positioning. Artificial targets may include pictures, pictograms, marks, signs, tags, and/or other objects that are otherwise distinctive and suitable for determining a relative pose of the vehicle 406 using visual odometry methods. Furthermore, in some implementations, such targets may be highly reflective for visible light, infrared light, or for any other wavelength. In some embodiments, an artificial target may be actively radiating and signaling electromagnetically or acoustically at some wavelength. These one or more targets may be deployed on the ground, on walls, suspended from the ceiling of a park garage, or disposed on poles, pillars, etc. preferably at locations where they are well and consistently visible by the vehicle 406 onboard optical systems.

In some implementations, depending on the optical system configuration, visual odometry methods may require supplementary data from wheel sensors 2720 and/or inertial sensors 2712, e.g., for purposes of length scaling (e.g., in meter units) and/or for improved accuracy. A visual odometry method augmented with data from inertial sensors may be referred to as visual inertial odometry.

In some implementations, if the position and/or pose of some distinctive objects in the environment of a parking space is well determined, e.g., in the base coordinate frame 2630, data obtained from optical systems such as visible light camera 2719 can be principally used for determining an absolute pose or an absolute pose trajectory of the vehicle 406. For example, in some situations one or more distinctive artificial targets may be disposed at locations providing a sufficient basis for triangulation and non-obstructed line of sight. When the absolute position and/or pose of these one or more targets are precisely known, e.g., in the base coordinate frame 2630, the position and/or pose of the targets may be used by any vehicle 406 equipped with the appropriate optical sensors and systems for determining an absolute pose, e.g., in the base coordinate frame 2630. This may include vehicles parking for the first time with a positioning system not specifically trained for a particular parking space.

In some areas, such as open area parking lots where there are neither walls nor ceiling and where the ground may be snow clad, the deployment of artificial targets may be considered unpractical, impedimental or non-esthetical. In this case, in some implementations, data obtained from visible light camera 2719 and LIDAR system 2724 may be used for creating an electronic 3D map of the environment of a parking space. Such 3D map may include features originating from natural objects, landmarks and structures that are well visible, enough distinctive, and fixed with respect to the base 408. The 3D map may be produced in a manner and format so that it can be used for a majority of vehicles 406 equipped with the appropriate systems and sensors. This may include vehicles 406 parking for the first time with a positioning system not specifically trained, learned or conditioned for this particular parking space.

However, in some environments and circumstances, a 3D map based computer vision method may not perform reliably with adequate positioning accuracy, e.g., as specified above in connection with FIG. 3. Such environments and circumstances may include outdoor parking lots where there are a lack of distinctive features in a range as needed for accurate positioning, bad lighting and visibility conditions, and/or other vehicles parked adjacent hiding some major features.

In some implementations, data obtained from magnetometers 2714 measuring strength and direction of the earth's magnetic field may be principally used for determining an absolute orientation of the vehicle 406 in an absolute coordinate frame, e.g., the base coordinate frame 2630. However, large ferromagnetic objects such as the vehicle 406 itself, vehicles parked adjacent, and/or steel reinforcements in ferroconcrete building structures may distort (deflect) a static magnetic field resulting in orientation errors. In theory, data from the magnetometer 2714 may be corrected using location specific calibration data. In practice however, the earth magnetic field at the magnetometer's 2714 location may not be stable enough due to the dynamics of vehicles arriving or leaving. However, in some implementations, data from magnetometers 2714 may help to improve a relative pose estimate, e.g., as determined by means of inertial sensors 2712 in an inertial reference frame 2610.

In some implementations, a satellite positioning system 2722 may be used to determine an absolute position in a world coordinate system that may be in a fixed relationship to the base coordinate frame 2630 (e.g., using signals from a global navigation satellite system (e.g. GPS)). However, in some implementations, the use of satellite based positioning may be restricted to an open area space (OAS) environment.

Moreover, satellite based position often cannot determine an orientation of the vehicle 406, unless at least two well separated satellite positioning receivers are installed aboard the vehicle 406. However, even with two receivers, orientation accuracy may be too low, since receiver separation on a vehicle 406 may be limited. In addition, in some implementations, the positioning accuracy of a real time satellite positioning system 2722 on a moving vehicle may be insufficiently precise for determining a useful pose of the vehicle 406 relative to the base station 408 (e.g., positioning accuracy of 15 m, which is far from the positioning accuracy values specified by example in connection with FIG. 3). In some implementations, satellite based positioning may be significantly improved by using a local area augmentation system comprised of one or more fixed ground-based reference stations. This concept is also known as differential satellite positioning. In essence, a reference station may broadcast the offset (difference) between a position as determined by the reference station and its true position that is precisely known, e.g., in a world coordinate system. This offset information may be received and applied by a satellite positioning system 2722 in reach of a reference station. In some implementations, a positioning accuracy in the order of 10 cm may be achieved with differential satellite positioning in a pure OAS environment. However, in some environments and locations, e.g., such as locations close to buildings, satellite signals may become impaired by multipath propagation effects, which may result in positioning errors considerably higher than 10 cm.

In outdoor parking lots, data from a satellite positioning system 2722 augmented as described above may be fused with data from other vehicle onboard sensors and systems for determining an improved absolute or relative pose estimate. Data from the satellite positioning system 2722 may be also used for guiding a vehicle 406 to a parking space that is equipped with a base wireless charging system 102*a*.

In some implementations, vehicles 406 may be also equipped with other systems dedicated for local area (indoor) positioning. For example, some vehicles may be equipped with one or more ultra wide band (UWB) transceivers 2731 as indicated in FIG. 27. In some implementations, a UWB system operates in a microwave band, e.g., 3.1-10.6 GHz, around 24 GHz, or around 65 GHz, and comprises a plurality of vehicle-based UWB transceivers 2731 and a plurality of ground-based UWB transceivers, also referred to as anchor nodes. In some implementations, some of the plurality of UWB transceivers 2713 are configured as UWB signal transponders, and positioning is based on measuring roundtrip delay and multi-lateration. In other implementations, some of the plurality of UWB transceivers 2713 are configured as UWB transmitters and the others as UWB receivers and positioning may be based on differential time of arrival (DToA) and multi-lateration. In some implementations, if the position of the anchor nodes is known, e.g., in the base coordinate frame 2630, an absolute pose of the vehicle 408 may be determined. In some implementations, a UWB system may not perform with a positioning accuracy that is sufficient for determining a pose of the vehicle 408 relative to the base station 408, e.g., as specified above in connection with FIG. 3, since signals associated with UWB transmitters and receivers may be impaired by propagation effects such as obstruction and multi-path reception. However, data from ground- and/or vehicle-based UWB transceivers 2731 may be fused with data from other vehicle onboard sensors and systems for determining an improved absolute or relative pose estimate. For example, in parking lots equipped with a UWB-based local area positioning system, data from UWB transceivers 2731 may be also used for guiding a vehicle 406 to a parking space that is equipped with a base wireless charging system 102*a*.

In some implementations, broadband cellular radio networks (e.g., based on CDMA, LTE) may support positioning (localization) of user terminals, e.g., for the safety of subscribers, location based services, etc. Therefore, data from a vehicle based cellular radio terminal 2729 may also serve for determining an absolute position. However, the accuracy of cellular network based positioning, e.g., by measuring time of arrival (ToA) of radio signals and trilateration may be strongly impaired by signal propagation effects. This is mainly true indoors and outdoors if the direct signal path is obstructed, e.g., by buildings and terrain. In some implementations, achievable positioning accuracy may be typically in the order of 100 m, which may not be sufficient for determining a pose of the vehicle 406 relative to the base station 408. Future cellular radio networks providing higher cell density and significantly more bandwidth may potentially allow absolute positioning with higher accuracy also in parking garages if e.g. microcell base stations are installed.

In some implementations, wireless local area network (WLAN) access points may be installed in outdoor parking lots and parking garages, e.g., for communications related to electric vehicle charging. Therefore, data from a vehicle onboard WLAN terminal 2730, e.g., serving as part of the electric vehicle communication subsystem 374, may also be used for determining an absolute position. As with cellular network based positioning, WLAN based positioning, e.g., using ToA and trilateration, may suffer from signal propagation effects. However, similarly as with the satellite positioning system 2722, data from cellular network terminal 2729 and WLAN terminal 2730 may be fused with data from other vehicle onboard sensors and systems for determining an improved absolute or relative pose estimate and for guiding a vehicle 406 to a parking space that is equipped with a base wireless charging system 102a In some implementations, data obtained from microwave RADAR 2728 and ultrasonic sensors 2726 as used for the safety of parking may also serve to improve reliability, accuracy and the safety of vehicle positioning.

Figure 28:
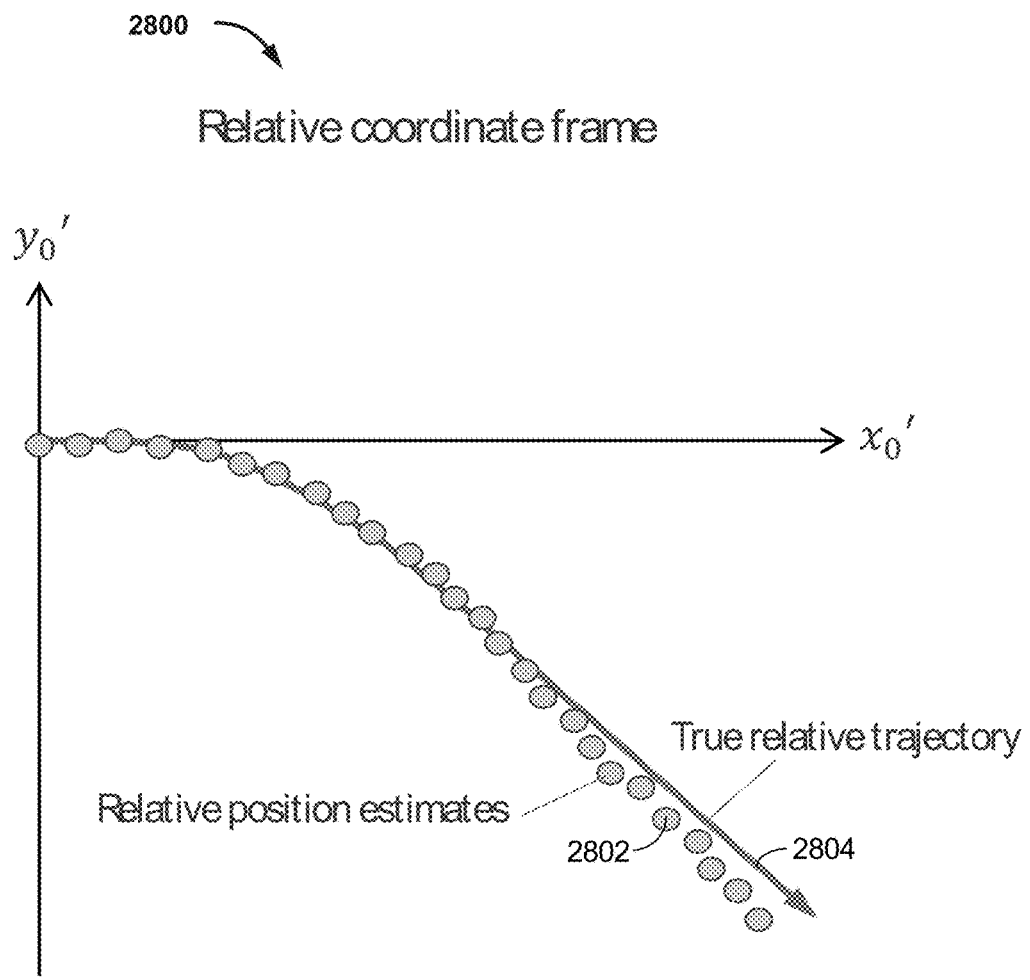
FIG. 28 is a diagram illustrating a sequence of relative position estimates as determined using auxiliary sensors and systems of FIG. 27 on a drive along a trajectory of FIG. 26 vs. the true relative trajectory in a relative coordinate frame, in accordance with some implementations.

FIG. 28 displays an exemplary sequence of relative position estimates 2802 as determined for a vehicle 406 moving towards the base 408 on a driving trajectory 2602 as illustrated in FIG. 26. FIG. 28 represents discrete relative position estimates 2802 together with the continuous true relative trajectory 2804 in a relative coordinate frame 2800, e.g., the initial reference frame 2610 of FIG. 26. The deviation of the relative position estimates 2802 from the true relative trajectory 2804 indicates the relative positioning error. Courses of the estimated and the true relative orientation of the vehicle 406 are not shown.

The sequence of relative position estimates 2802 may refer to consequent outputs of a relative positioning processor 3204 as described in connection with FIG. 32. In some implementations, the relative positioning processor 3204 determines relative poses of the vehicle 406 in the initial reference frame 2610 using data from systems and sensors as described in connection with FIG. 27.

FIG. 28 shows relative positioning errors slightly increasing with the travelled distance along the driving trajectory 2602. Such error trend may be characteristic for a relative positioning process relying on dead reckoning methods as previously described in connection with FIG. 27 by example. In some implementations, e.g., using visual inertial odometry as previously described in connection with FIG. 27, the standard deviation of the relative positioning error may be <2% of the travelled distance, e.g., <20 cm at 10 m.

Figure 29:
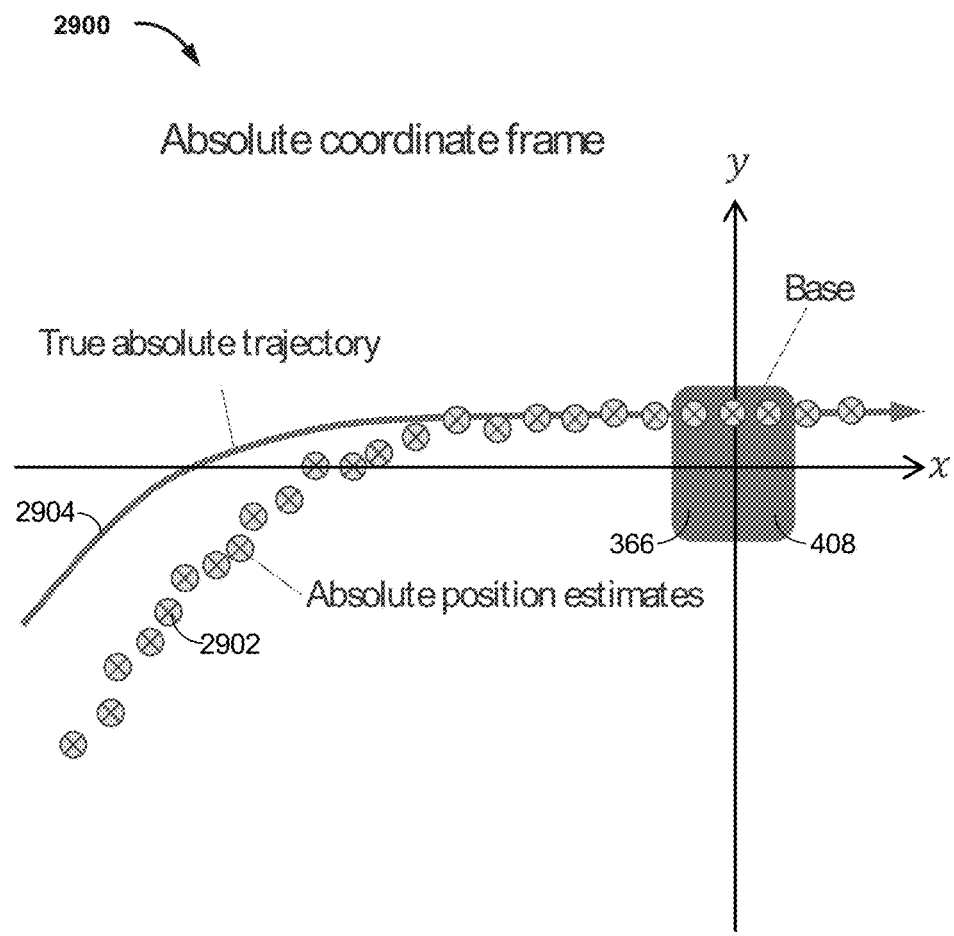
FIG. 29 is a diagram illustrating a sequence of absolute position estimates as determined using the magnetic field positioning system of FIG. 6 on a drive along a trajectory of FIG. 26 vs. the true absolute trajectory in an absolute coordinate frame, in accordance with some implementations.

FIG. 29 displays an exemplary sequence of absolute position estimates 2902 as determined for a vehicle 406 moving towards the base 408 on a driving trajectory 2602. FIG. 29 represents discrete absolute position estimates 2902 together with the continuous true absolute trajectory 2905 in an absolute coordinate frame 2900, e.g., the base coordinate frame 2630 of FIG. 26. The deviation of the absolute position estimates 2902 from the true absolute trajectory 2804 indicates the absolute positioning error. Courses of the estimated and the true absolute orientation of the vehicle 406 are not shown.

The sequence of absolute position estimates 2902 may refer to consequent outputs of an absolute positioning processor 2004 as described in connection with FIGS. 20 and 32. In some implementations, the absolute positioning processor 2004 determines an absolute pose of the vehicle 406 by means of the 9D detection vector V using one of a process as previously described in connection with FIGS. 6 to 20.

FIG. 29 shows absolute position estimates 2902 being relatively accurate up to some distance (radius) from the base 408. This distance range may be referred to as the central area. For vehicle 406 positions outside the central area, FIG. 29 shows the absolute positioning error considerably increasing with distance from the base 408. Such error trend may be considered characteristic for a magnetic field based positioning system 600 operating in presence of local field distortion effects as previously described in connection with FIGS. 21 to 24. Such field distortion effects may potentially impact positioning accuracy at distances, e.g., >2 m from the base 408. In some implementations, the standard deviation of the absolute positioning error may be <1 cm in a distance range 0-10 cm, <5% of distance in a distance range 10-200 cm, and <20% of distance in a distance range 200-500 cm, where distance may refer to the horizontal distance between the magnetic centers of the magnetic field generator 368 and the magnetic field sensor 366 as defined in connection with FIGS. 4 and 5.

In some implementations, to improve positioning accuracy in presence of field distortion effects, e.g., as previously described in connection with FIGS. 21 to 25, the magnetic field based positioning system 600 may use data from vehicle based auxiliary systems and sensors as described in connection with FIG. 27.

Figure 32:
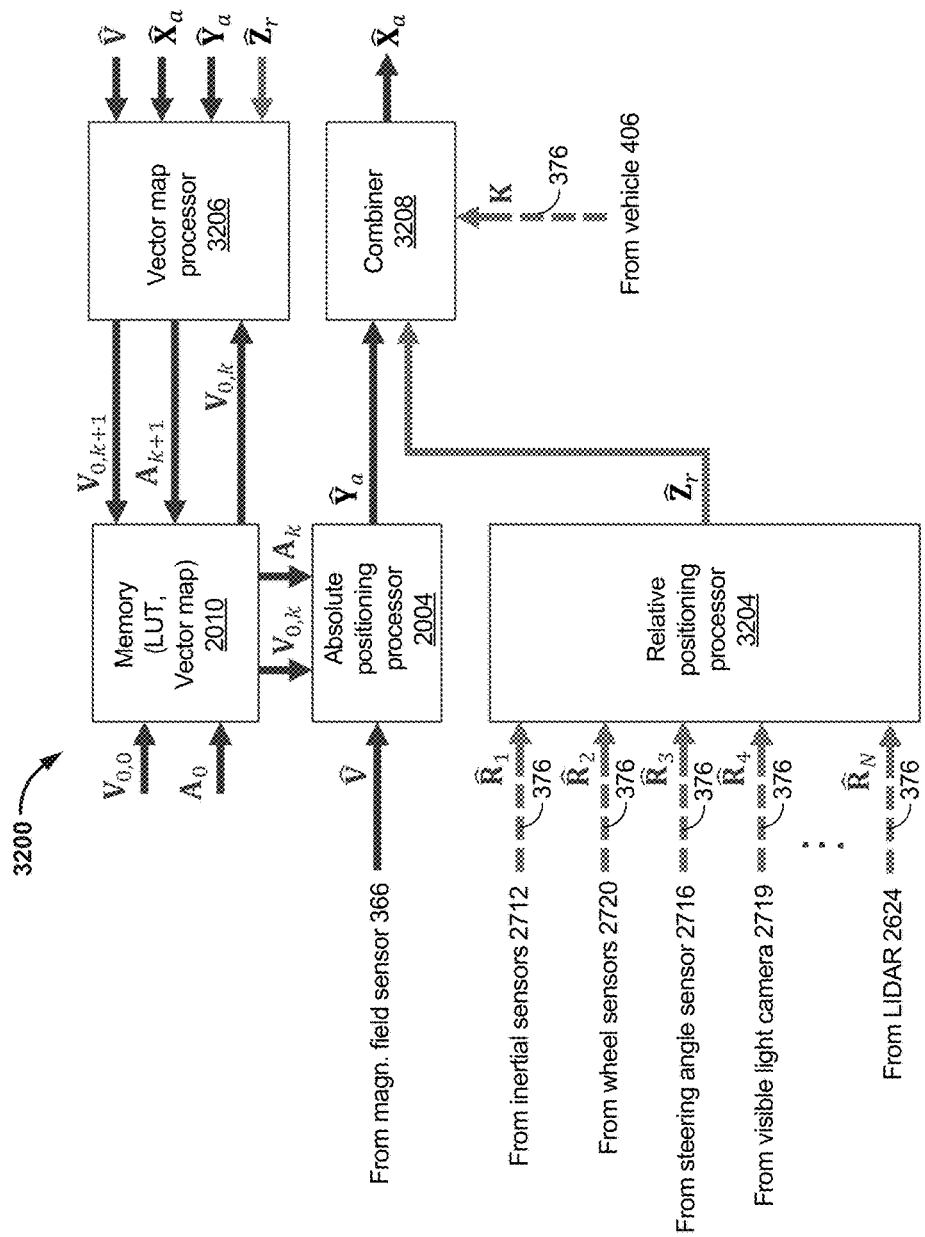
FIG. 32 is a block diagram illustrating parts of an enhanced base positioning system of FIG. 3, in accordance with some implementations.

FIG. 32 is a block diagram 3200 showing at least a portion of a base positioning subsystem 362 as part of an enhanced magnetic field based positioning system 600, in accordance with some implementations. This base positioning subsystem 362 may comprise an absolute positioning processor 2004, a relative positioning processor 3204, a combiner 3208, a vector map processor 3206, and a memory 2010. In some implementations, the base positioning subsystem 362 may also comprise a phase synchronization circuitry 2002 that is not shown in FIG. 32. In addition, although FIG. 32 illustrates the absolute positioning processor 2004, the relative positioning processor 3204, the combiner 3208, the vector map processor 3206, and the memory 2010 as being part of the base positioning subsystem 362 of the base wireless charging system 302, it is understood that in some other embodiments, these components may be implemented as part of the electric vehicle positioning subsystem 364 of the electric vehicle wireless charging system 314, or a combination thereof.

The absolute positioning processor 2004 may be configured to receive signals indicative for the voltage vector V, e.g., as detected by the phase synchronization circuitry 2002 operationally connected to the magnetic field sensor 366 as previously described in connection with FIG. 20. The phase synchronization circuitry 2002 may output a vector $\hat{V}$ every $T_p$ seconds (e.g., $T_p=200$ ms) or at rate depending on some other conditions as previously described in connection with FIG. 20. In some implementations, vector $\hat{V}$ may refer to the voltage vector as defined by Equation (40) for the fictitious reverse transmitting system 1700 as previously described in connection with FIG. 17. The components of vector V may be indicative for the nine voltage signals $v_{xx'}(t)$, $v_{xy'}(t)$, $v_{xz'}(t)$, $v_{yx'}(t)$, $v_{yy'}(t)$, $v_{yz'}(t)$, $v_{zx'}(t)$, $v_{zy'}(t)$, $v_{zz'}(t)$ as induced by each of the x-, y-, and z-magnetic fields into each of the generator coils 702, 704, 706 of the magnetic field generator 368 of the fictitious reverse transmitting system 1700. In some implementations, the absolute positioning processor 2004 is also configured to receive confidence information about the vector $\hat{V}$, e.g., a noise variance, SNR or similar quality information (not shown in FIG. 32). The absolute positioning processor 2004 may be further configured to determine an absolute pose estimate $\hat{Y}_a$ based at least upon inputs $\hat{V}$ and on a plurality of reference vectors $V_{0,k}$ as stored in memory 2010, and to output signals indicative for the absolute pose estimate $\hat{Y}_a$, e.g., every $T_p$ seconds. In some implementations, the absolute positioning processor 2004 determines an absolute pose estimate $\hat{Y}_a$ using a two-operation process as previously described in connection with FIGS. 18 and 19 upon detected vectors $\hat{V}$ and $\hat{A}$ and a plurality of reference vectors $A_k$ and $V_{0,k}$ as stored in the memory 2010 in the form of a LUT, e.g., in accordance with LUT 1600 of FIG. 16. The absolute pose estimate $\hat{Y}_a$ may be composed of position estimate $\hat{r}$ and orientation estimate $\hat{\varphi}$ as previously defined by Equation (50) and may refer to an absolute coordinate frame 2900, e.g., the sensor's 366 coordinate frame that is assumed to be the base coordinate frame 2630. In some implementations, the absolute positioning processor 2004 is configured to additionally output information about the confidence of the absolute pose estimates $\hat{Y}_a$, e.g., an error variance (not shown in FIG. 32).

The relative positioning processor 3204 is configured to receive a plurality of signals indicative for data from various vehicle based auxiliary systems and sensors as described in connection with FIG. 27. In some implementations, the relative positioning processor 3204 receives data from some combination of inertial sensors 2712, wheel sensor 2720, steering angle sensor 2716, visible light camera 2719, LIDAR 2724, and/or any of the other sensor systems described above. These auxiliary data inputs may be generally represented by vectors denoted by $\hat{R}_1, \hat{R}_2, \hat{R}_3, \ldots, \hat{R}_N$. The hut accent, e.g., on vector $\hat{R}_1$ indicates that this data may be perturbed if detected, e.g., in presence of noise and or/distortion. In some implementations, inputs $\hat{R}_1, \hat{R}_2, \hat{R}_3, \ldots, \hat{R}_N$ are received via communication link 376 of FIG. 3 as indicated by dashed arrows in FIG. 32. The relative positioning processor 3204 may be further configured to output a signal indicative of a relative pose estimate $\hat{Z}_r$ in a relative coordinate frame 2800, e.g., every $T_p$ seconds. In some implementations, the relative pose estimate $\hat{Z}_r$ is composed of a relative position estimate $\hat{r}_0$ and relative rotation angle estimate $\hat{\varphi}'_0$ and refers to the initial reference frame 2610 of FIG. 26. In some implementations, the relative positioning processor 3204 is configured to additionally output information about the confidence of the relative pose estimates $\hat{Z}_r$, e.g., an error variance (not shown in FIG. 32).

The combiner 3208 is configured to receive signals indicative for the absolute pose estimate $\hat{Y}_a$ and the corresponding relative pose estimate $\hat{Z}_r$, e.g., every $T_p$ seconds, to process these two inputs in a manner so to output signals indicative for a potentially improved absolute pose estimate $\hat{X}_a$, e.g., every $T_p$ seconds. For this purpose, the combiner 3208 may use a model of the vehicle 406. The model may include geometrical data of the vehicle such as position of the wheels, the position of the magnetic center of the magnetic field generator 368 and the positions of other auxiliary onboard sensors as used for determining relative pose estimates $\hat{Z}_r$. In some implementations, the combiner 3208 is also configured to receive signals indicative for vehicle model parameters K, e.g., via communication link 376 as indicated by the dashed arrow in FIG. 32. In some further implementations with positioning processors 2004 and 3204 providing confidence information, is the combiner 3208 may also be configured to receive the confidence information and to output other confidence information associated with the absolute pose estimate $\hat{X}_a$ (not shown in FIG. 32).

In some implementations, the vector map processor 3206 may be configured to receive signals indicative for the absolute pose estimate $\hat{Y}_a$, the corresponding relative pose estimate $\hat{Z}_r$, the corresponding absolute pose estimate $\hat{X}_a$, as well as the corresponding voltage vector $\hat{V}$. In some implementations, it is also configured to receive confidence information about pose estimates $\hat{X}_a, \hat{Y}_a, \hat{Z}_r$ and voltage vector $\hat{V}$ (not shown in FIG. 32). The vector map processor 3206 may be further configured to receive from the memory 2010 signals indicative for the plurality of current reference vectors $V_{0,k}$, also referred herein to as the current vector map. The vector map processor 3206 may be further configured to modify the current vector map $V_{0,k}$, e.g., based on sequences of corresponding inputs $\hat{X}_a, \hat{Y}_a, \hat{Z}_r, \hat{V}$ and to output signals indicative for a plurality of modified reference vectors $V_{0,k+1}$ and/or $A_{k+1}$ from time to time depending on an amount of data received from the positioning processors 2004 and 3204. The plurality of modified reference vectors $V_{0,k+1}, A_{k+1}$ may be also referred herein as the new vector map $V_{0,k+1}, A_{k+1}$. The index k denotes the vector map version counter that is incremented from k to k+1 every time a new version of a vector map is issued.

The memory 2010 is configured to store a current vector map. In some implementations, the memory 2010 is configured to store a current vector map comprised of a plurality of reference vectors $V_{0,k}$ and $A_k$ in the form of a LUT, e.g., in accordance with LUT 1600 of FIG. 16. The memory 2010 may further be configured to receive signals indicative for an initial vector map $V_{0,0}, A_0$ (k=0) from an external source (not shown in FIG. 32) and for a new vector map $V_{0,k+1}, A_{k+1}$, and to store the new vector map $V_{0,k+1}, A_{k+1}$ in place of the current vector map $V_{0,k}, A_k$. In some implementations, the new vector map $V_{0,k+1}, A_{k+1}$ becomes the current vector map $V_{0,k}, A_k$ and index k is incremented by 1. The memory 2010 may also be configured to send signals indicative for the current reference vectors $V_{0,k}$ and/or $A_k$ to the vector map processor 3206.

In some implementations, the process of modifying of a current vector map $V_{0,k}, A_k$ to a new vector map $V_{0,k+1}, A_{k+1}$ may be considered as improving, correcting, updating or adapting a vector map to better match with the vectors $\hat{V}$ and $\hat{A}$ as detected by the base positioning subsystem 362 on a particular parking space in a particular environment.

In some implementations, the process of modifying a current vector map $V_{0,k}, A_k$ to a new vector map $V_{0,k+1}, A_{k+1}$ may be considered as part of a training or learning process and may be referred to as a learning cycle.

In some implementations, a learning process may start with an initial (default) vector map $V_{0,0}, A_0$ that is loaded into the memory 2010 of the base positioning subsystem 362 e.g. by the installer of the base wireless charging system 102a of FIG. 1, e.g., upon system installation.

In some implementations, the learning process may require several learning cycles until the accuracy of the magnetic field based positioning system 600 meets the specifications at all locations of a particular parking space where a vehicle 406 can be found.

In some implementations, the vector map processor 3206 may be configured to produce a new vector map $V_{0,k+1}, A_{k+1}$ based upon sequences of absolute pose estimates $\hat{Y}_a$, corresponding relative pose estimates $\hat{Z}_r$, corresponding detected voltage vectors $\hat{V}$, and based upon the current vector map $V_{0,k}$ as stored in the memory 2010.

In some implementations, the sequences of $\hat{Y}_a, \hat{Z}_r$, and $\hat{V}$ may refer to recorded sequences of consecutive outputs of absolute positioning processor 2004, relative positioning processor 3204, and phase synchronization circuitry 2002 of FIG. 20, respectively, as obtained while the vehicle 406 was travelling from an initial reference position $P_0$ towards the base 408 on a driving trajectory 2602 as illustrated in FIG. 26. In some implementations, these recorded sequences may be temporarily stored in the vector map processor 3206.

Figure 35:
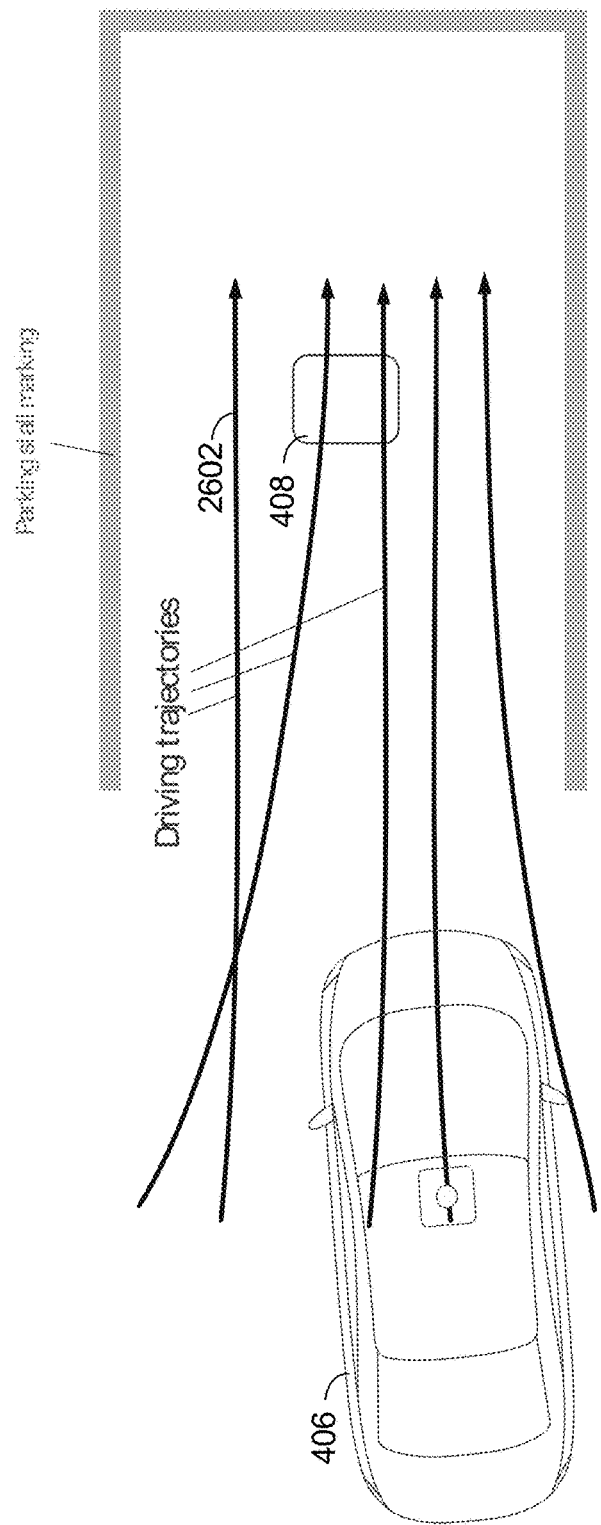
FIG. 35 is a diagram illustrating an ensemble of different driving trajectories as they may be driven by the vehicle to learn the system by modifying a vector map.

In some implementations, sequences $\hat{Y}_a$, $\hat{Z}_r$, and $\hat{V}$ may be obtained on special test (learning) drives, e.g., performed by the system installer using a vehicle 406 that is specially equipped with auxiliary systems and sensors as previously described in connection with FIG. 27. For example, FIG. 35 illustrates an exemplary ensemble of trajectories 2602 corresponding to a plurality of test drives by the vehicle 406 for a particular parking space containing the base 408.

In some other implementations, sequences $\hat{Y}_a$, $\hat{Z}_r$, and $\hat{V}$ may be obtained during ordinary parking maneuvers as performed by users, e.g., for the purpose of wireless charging using their own vehicle 406 equipped with systems and sensors as previously described in connection with FIG. 27.

In some implementations, modifying a vector map $V_{0,k}$, $A_k$ may be accomplished in a four-operation process. In a first operation, the vector map processor 3206 uses a sequence of absolute pose estimates $\hat{Y}_a$ as received from the absolute position processor 2004 and a corresponding sequence of relative pose estimates $\hat{Z}_r$ as received from relative positioning processor 3204 to produce a new sequence of absolute pose estimates $\hat{Z}_a$ (not shown) whose accuracy is potentially higher than the accuracy of corresponding absolute pose estimates $\hat{Y}_a$. In a second operation of modifying the vector map, the vector map processor 3206 compares a rotational transform of detected voltage vectors $\hat{V}$ corresponding to the sequence of absolute pose estimates $\hat{Z}_a$ with reference vectors $V_{0,k}$. The reference vectors $V_{0,k}$ may be selected from the stored vector map (e.g., stored as an LUT such as LUT 1600) at a coordinate point entry closest to the position given by corresponding absolute pose estimate $\hat{Z}_a$. The angle applied for rotationally transforming (de-rotating) a detected voltage vector $\hat{V}$ may be the negative value of the angle given by the corresponding absolute pose estimate $\hat{Z}_a$. This comparison may include determining a deviation of the rotationally transformed detection vector from a corresponding reference vector for each selected reference vector $V_{0,k}$. In a third operation, the vector map processor 3206 may use this deviation for determining a modification (correction) function and may apply this modification function to modify the current vector map $V_{0,k}$, $A_k$ and to create a new vector map $V_{0,k+1}$, $A_{k+1}$ in a fourth operation. Exemplary implementations of this four-operation process is described below in more detail.

In some implementations, the first operation of modifying a vector map capitalizes on the particular pose error statistics of the absolute pose estimates $\hat{Y}_a$ and of the relative pose estimates $\hat{Z}_r$. In some implementations and scenarios referring to FIGS. 28 and 29, the absolute pose estimates $\hat{Y}_a$ may be considered potentially accurate in the central area but potentially inaccurate outside the central area, while the relative pose estimates $\hat{Z}_r$ may be considered potentially accurate over the entire distance range but are only relative. Given such conditions, the vector map processor 3206 may accomplish the first operation by fitting the sequence of relative pose estimates $\hat{Z}_r$ to the sequence of absolute pose estimates $\hat{Y}_a$ in an area where both absolute and relative position estimates are expected to be potentially accurate, e.g., in the central area as described above in connection with FIG. 29. The fitting process may be considered as finding a coordinate transformation composed of a translation by a vector $\hat{r}_0$ and rotation by an angle $\hat{\varphi}_0$ that transforms the relative position sequence $\hat{Z}_r$ to an absolute position sequence $\hat{Z}_a$ (not shown in FIG. 32) that fits best to the absolute position sequence $\hat{Y}_a$, e.g., in the central area.

The translation vector $\hat{r}_0$ and rotation angle $\hat{\varphi}_0$ as determined in this first operation may be also considered as an estimate of the true absolute pose $r_0$, $\varphi_0$ of the relative coordinate frame 2800 (e.g., initial reference frame 2610) in the absolute coordinate frame 2900 (e.g., base coordinate frame 2630 as illustrated in FIG. 26).

In some implementations, the vector map processor 3206 applies a weighted least mean square (LMS) criterion to find the best fit. For a mathematical description of the weighted LMS fitting process, the following definitions (53) and (54) for the vectors $\hat{Y}_a$ and $\hat{Z}_r$ may be used. The i-th vector of a sequence of 3D absolute pose estimate vectors $\hat{Y}_a$ may be defined as $$\hat{Y}_{a,i} = \begin{bmatrix} \hat{Y}_{x_a,i} \\ \hat{Y}_{y_a,i} \\ \hat{Y}_{\varphi_a,i} \end{bmatrix}, \quad (55)$$

where indices $x_a$, $y_a$, $\varphi_a$ refer to the x-, y-dimension and to the rotation angle ($\varphi$-) dimension of the absolute coordinate frame 2900, respectively. Analogously to Equation (55), the i-th vector of a sequence of 3D relative pose estimate vectors $\hat{Z}_r$ may be defined as $$\hat{Z}_{r,i} = \begin{bmatrix} \hat{Z}_{x_r,i} \\ \hat{Z}_{y_r,i} \\ \hat{Z}_{\varphi_r,i} \end{bmatrix}, \quad (56)$$

where indices $x_r$, $y_r$, $\varphi_r$ refer to the x-, y-, and rotation angle ($\varphi$-) dimension of the relative coordinate frame 2800, respectively. The above definitions (57) and (58) ignore the z-components $\hat{Y}_{z_a,i}$ and $\hat{Z}_{z_r,i}$ to simplify descriptions in connection with FIGS. 32 and 33. However, this should not exclude implementations that also rely on the z-components $\hat{Y}_{z_a,i}$ and $\hat{Z}_{z_r,i}$.

Using standard coordinate transform, the i-th vector of a transformed sequence of 3D pose estimates $\hat{Z}_a$ as previously described may be expressed as a function of a translation vector r and a rotation angle $\varphi$ as follows:

$$\hat{Z}_{a,i}(r, \varphi) = \begin{bmatrix} \hat{Z}_{x_a,i}(r, \varphi) \\ \hat{Z}_{y_a,i}(r, \varphi) \\ \hat{Z}_{\varphi_a,i}(r, \varphi) \end{bmatrix} = \begin{bmatrix} \hat{Z}_{x_r,i}\cos\varphi - \hat{Z}_{y_r,i}\sin\varphi + r_x \\ \hat{Z}_{x_r,i}\sin\varphi - \hat{Z}_{y_r,i}\cos\varphi + r_y \\ \hat{Z}_{\varphi_r,i} - \varphi \end{bmatrix}, \quad (59)$$

where $r_x$ and $r_y$ refer to the x- and y-component of the translation vector r. Using above definitions (60), (61), and (59), the first operation of the weighted LMS based fitting of two pose sequences $\hat{Y}_a$ and $\hat{Z}_a(r, \varphi)$ may be expressed in some implementations as $$\min_{r,\varphi} \frac{1}{i_{max} - i_{min}} \sum_{i_{min}}^{i_{max}} \left\{ w_{x,i}\left(\hat{Y}_{x_a,i} - \hat{Z}_{x_a,i}(r, \varphi)\right)^2 \begin{array}{c} \to \hat{r}_0 \\ + \\ \to \hat{\varphi}_0 \end{array} \right. \quad (62)$$

$$\left. w_{y,i}\left(\hat{Y}_{y_a,i} - \hat{Z}_{y_a,i}(r, \varphi)\right)^2 + w_{\varphi,i}\left(\hat{Y}_{\varphi_a,i} - \hat{Z}_{\varphi_a,i}(r, \varphi)\right)^2 \right\},$$

where $w_{x,i}$, $w_{y,i}$, and $w_{\varphi,i}$ denote the weighting factors for the square of the x-, y-, and $\varphi$-component of the i-th vector difference $\hat{Y}_{a,i} - \hat{Z}_{a,i}(r, \varphi)$, respectively, and $i_{min}$ and $i_{max}$ a lower and an upper limit, respectively, for the index i. The term "min r, $\varphi$" means searching for the minimum over the parameter space r, $\varphi$ as specified for a particular implementation. The outcomes $\hat{r}_0$, $\hat{\varphi}_0$ of Equation (62) may be considered as the best estimate of the true absolute pose $r_0$, $\varphi_0$ of the relative coordinate frame 2800 in the absolute coordinate frame 2900 as previously described in connection with FIGS. 28 and 29.

In some implementations, the minimum search in Equation (62) is performed over a parameter search space r, $\varphi$ in which the true absolute pose of the relative coordinate frame 2800 is expected. Further, the minimum search may be performed only with a portion of the sequences $\hat{Y}_{a,i}$ and $\hat{Z}_{a,i}$, where the absolute pose estimates $\hat{Y}_a$ are expected to be potentially accurate. This portion is expressed in equation (62) by a lower limit $i_{min}$ and an upper limit $i_{max}$ for the index i.

In some implementations, the weighting factors $w_{x,i}$, $w_{y,i}$, and $w_{\varphi,i}$ may be determined based on the statistical variances $\sigma_{x_a,i}^2$, $\sigma_{y_a,i}^2$, $\sigma_{\varphi_a,i}^2$, $\sigma_{x_r,i}^2$, $\sigma_{y_r,i}^2$, $\sigma_{\varphi_r,i}^2$, in the x-, y-, and $\varphi$-dimension of the i-th vector $\hat{Y}_{a,i}$ and the i-th vector $\hat{Z}_{r,i}$, respectively.

In some implementations, an equal variance expressed as $$\sigma_{a,i}^2 = \sigma_{x_a,i}^2 = \sigma_{y_a,i}^2, \tag{63}$$

$$\sigma_{r,i}^2 = \sigma_{x_r,i}^2 = \sigma_{y_r,i}^2 \tag{64}$$

may be assumed for the x- and y-component of vector $\hat{Y}_{a,i}$ and vector $\hat{Z}_{r,i}$, respectively, and the weighting factors may be determined as follows:

$$w_{x,i} = w_{y,i} = \frac{1}{\sigma_{a,i}^2 + \sigma_{r,i}^2} = \frac{1}{\sigma_i^2}, \tag{65}$$

$$w_{\varphi,i} = \frac{1}{\sigma_{\varphi_a,i}^2 + \sigma_{\varphi_r,i}^2} = \frac{1}{\sigma_{\varphi,i}^2}, \tag{66}$$

where $\sigma_i^2$ and $\sigma_{\varphi,i}^2$ denote the sum variances $\sigma_{a,i}^2 + \sigma_{r,i}^2$ and $\sigma_{\varphi_a,i}^2 + \sigma_{\varphi_r,i}^2$, respectively.

In some implementations, estimates $\hat{\sigma}_i^2$ and $\hat{\sigma}_{\varphi,i}^2$ of the sum variances $\sigma_i^2$ and $\sigma_{\varphi,i}^2$, respectively, may be determined based upon the residual vector differences $\hat{Y}_{a,i} - \hat{Z}_{a,i}(\hat{r}_0, \hat{\varphi}_0)$ as obtained from a series of weighted LMS processes as described above and expressed by Equation (62).

In some implementations, the vector map processor 3206 may determine estimates for $r_0$, $\varphi_0$ using a sequential approach. In a first step, the vector map processor 3206 determines a provisional estimate $\varphi_0$ based only upon the $\varphi$-components of vectors $\hat{Y}_{a,i}$ and $\hat{Z}_{a,i}$ according to $$\min_{\varphi} \frac{1}{i_{max} - i_{min}} \sum_{i_{min}}^{i_{max}} \left( \hat{Y}_{\varphi_a,i} - \hat{Z}_{\varphi_a,i}(r = 0, \varphi) \right)^2 \rightarrow \hat{\varphi}_0. \tag{67}$$

In a second step, the vector map processor 3206 may determine a final estimate $\hat{r}_0$, $\hat{\varphi}_0$ jointly according to the process as described by Equation (62) by applying a reduced search range for the parameter $\varphi$ based upon the provisional estimate, e.g., $\hat{\varphi}_0 - \delta\varphi \leq \varphi \leq \hat{\varphi}_0 + \delta\varphi$, where the half width of the search interval $\delta\varphi$ is sufficiently large to find the best estimate $\hat{\varphi}_0$ with a high probability. In some implementations, the vector map processor 3206 may choose $\delta\varphi = 0$.

Figure 30:
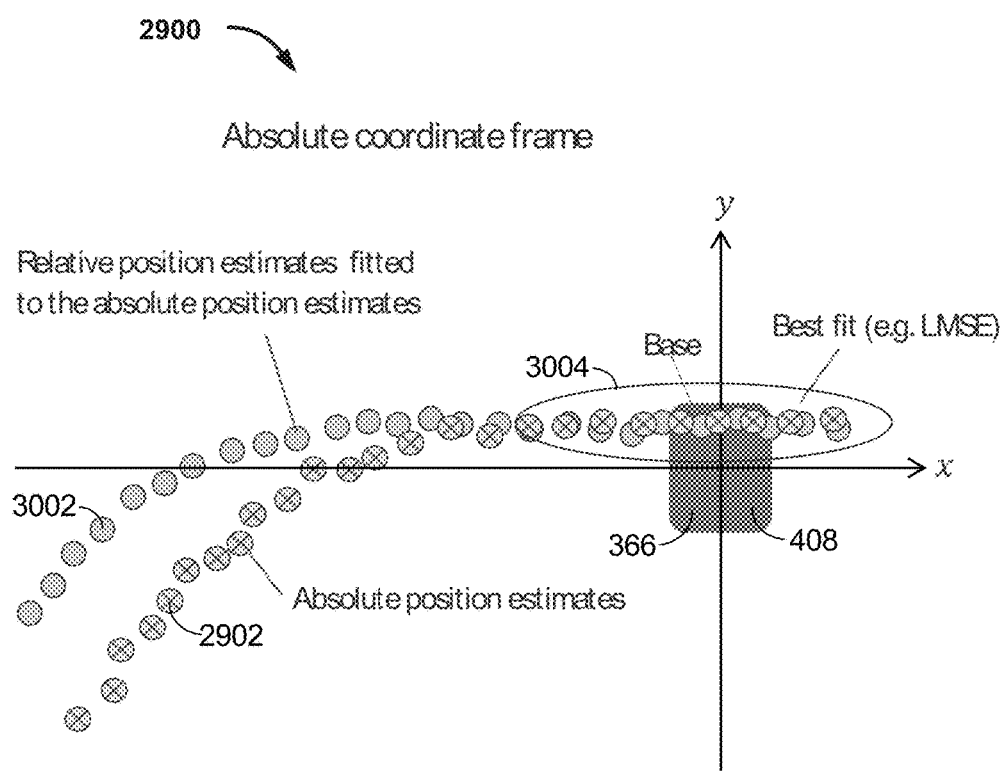
FIG. 30 is a diagram illustrating the fitting of a sequence of relative position estimates with a sequence of absolute position estimates in an absolute coordinate frame, in accordance with some implementations.

FIG. 30 illustrates the first operation of fitting a sequence of relative position estimates 2802 (as shown in FIG. 28) to a sequence of absolute position estimates 2902 in the absolute coordinate frame 2900, in accordance with some implementations. The ellipse 3004 indicates a region or portion of the two sequences where the fitting (e.g. LMS fitting) is performed (e.g., a central region). The fitted sequence of relative position estimates 3002 may be a translated and rotated version of the sequence of relative position estimates 2802 as displayed in FIG. 28 in the relative coordinate frame 2800.

In some implementations, to streamline equations of the second operation of modifying a vector map, the following simplified notation is introduced for the (improved) absolute pose estimates $\hat{Z}_{a,i}(\hat{r}_0, \hat{\varphi}_0)$ as given by Equation (62):

$$\hat{Z}_{a,i}(\hat{r}_0, \hat{\varphi}_0) = \begin{bmatrix} \hat{Z}_{x_a,i}(\hat{r}_0, \hat{\varphi}_0) \\ \hat{Z}_{y_a,i}(\hat{r}_0, \hat{\varphi}_0) \\ \hat{Z}_{\varphi_a,i}(\hat{r}_0, \hat{\varphi}_0) \end{bmatrix} = \begin{bmatrix} \hat{r}_{x,i} \\ \hat{r}_{y,i} \\ \hat{\varphi}_i \end{bmatrix}. \tag{68}$$

In some implementations, the vector map processor 3206 performs the second operation by comparing a rotational transform $\hat{V}_i(-\hat{\varphi}_i)$ of each vector $\hat{V}_i$ of a sequence of detected voltage vectors $\hat{V}$ corresponding to the sequence of absolute pose estimates $\hat{r}_{x,i}$, $\hat{r}_{y,i}$, $\hat{\varphi}_i$ with a reference vector $V_{0,k}$. For this comparison, the vector map processor 3206 selects from the vector map stored in memory 2010 (e.g., LUT 1600) the current reference vector $V_{0,k}$ at a coordinate entry closest to the position $\hat{r}_{x,i}$, $\hat{r}_{y,i}$. This reference vector may be simply denoted by $V_{0,k}(\hat{r}_{x,i}, \hat{r}_{y,i})$.

Figure 31:
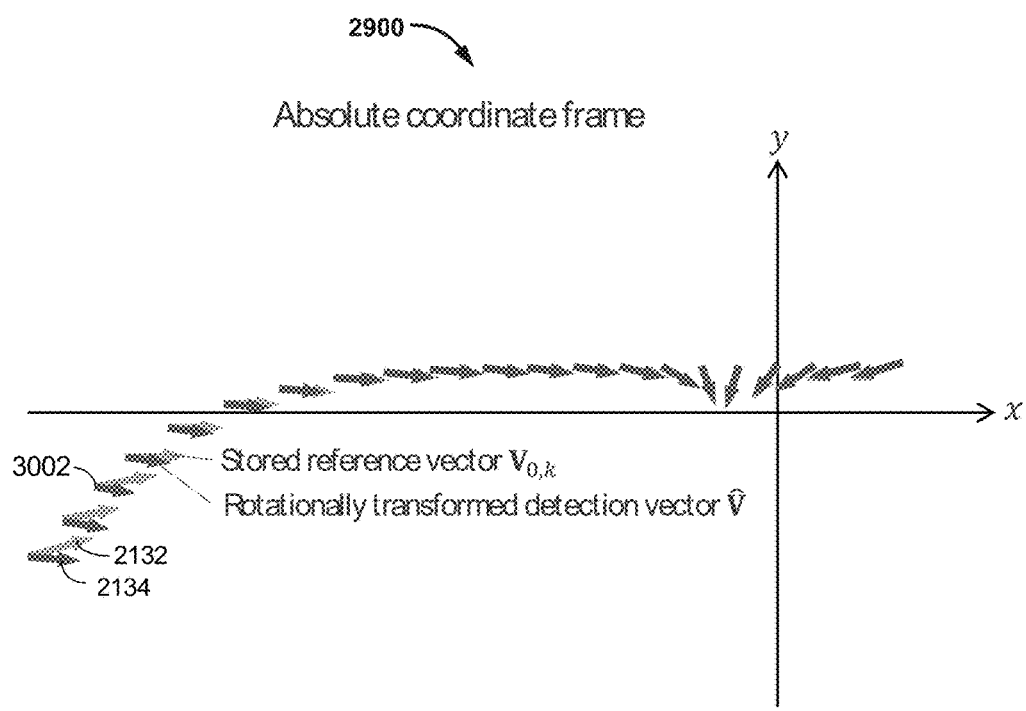
FIG. 31 is a diagram illustrating actual (measured) voltage vectors vs. stored reference vectors selected from the LUT of FIG. 16 at positions defined by the fitted sequence of relative position estimates of FIG. 30.

FIG. 31 illustrates the second operation of comparing rotational transforms $\hat{V}_i(-\hat{\varphi}_i)$ 2134 of detected voltage vectors $\hat{V}_i$ with reference vectors $V_{0,k}(\hat{r}_{x,i}, \hat{r}_{y,i})$ 2132 from the LUT. FIG. 31 illustrates vectors 2134 and 2132 with their origins at discrete positions $\hat{r}_{x,i}$, $\hat{r}_{y,i}$ in the absolute coordinate frame 2900. The positions $\hat{r}_{x,i}$, $\hat{r}_{y,i}$ may refer to the fitted sequence of relative position estimates 3002 as illustrated in FIG. 30.

In some implementations, the vector map processor 3206 compares the vectors 2132 and 2134 to determine a modification (correction) function that may be applied to a current vector map $V_{0,k}$ to better match with the actual voltage vectors $\hat{V}$ as detected in a particular parking space. In some implementations, the vector map processor 3206 determines, for each vector $\hat{V}_i$ of a sequence of detected voltage vectors $\hat{V}$, a difference vector between its rotational transform $\hat{V}_i(-\hat{\varphi}_i)$ and the corresponding reference vector $V_{0,k}(\hat{r}_{x,i}, \hat{r}_{y,i})$ selected from the LUT as follows:

$$\hat{d}_i(\hat{r}_{x,i}, \hat{r}_{y,i}) = \Delta \hat{V}_i = \hat{V}_i(-\hat{\varphi}_i) - V_{0,k}(\hat{r}_{x,i}, \hat{r}_{y,i}). \tag{69}$$

The difference vector $\Delta \hat{V}_i$ may be also referred to as the measured deviation vector denoted by $\hat{d}_i$. Again, the hut accent shall signify that this measured deviation vector $\hat{d}_i$ is generally a perturbed version of the true deviation vector $d_i$, since it is determined upon a generally perturbed detection vector $\hat{V}_i$, and furthermore upon a reference vector $V_{0,k}$ corresponding to a position estimate $\hat{r} = (\hat{r}_{x,i}, \hat{r}_{y,i})$ that is generally subjected to some error. The true deviation vector $d_i(\hat{r}_{x,i}, \hat{r}_{y,i})$ may be considered as the field distortion effect as caused by the environment at coordinate point $\hat{r}_{x,i}, \hat{r}_{y,i}$ and that needs to be determined (estimated) using measurement data that is subjected to errors. In some implementations, the error vector in the i-th measured deviation vector $\hat{d}_i$ may be expressed in mathematical terms as $$\epsilon_i = \hat{d}_i - d_i(\hat{r}_{x,i}, \hat{r}_{y,i}). \tag{70}$$

In some implementations, the vector map processor 3206 may determine an estimate of the deviation vector $d_i$ for each vector $\hat{V}_i$ of a sequence of detected voltage vectors $\hat{V}$ as follows:

$$\hat{d}_i(\hat{r}_{x,i}, \hat{r}_{y,i}) = \frac{\Delta \hat{V}_i}{|V_{0,k}(\hat{r}_{x,i}, \hat{r}_{y,i})|} = \frac{\hat{V}_i(-\hat{\varphi}_i) - V_{0,k}(\hat{r}_{x,i}, \hat{r}_{y,i})}{|V_{0,k}(\hat{r}_{x,i}, \hat{r}_{y,i})|}. \tag{71}$$

Above definition (71) may be referred to as the normalized difference vector.

In some implementations, the vector map processor 3206 may determine a deviation vector estimate $\hat{d}_i$ as the quotient of vector $\hat{V}_i(-\hat{\varphi}_i)$ and reference vector $V_{0,k}(\hat{r}_{x,i}, \hat{r}_{y,i})$ as follows:

$$\hat{d}_i(\hat{r}_{x,i}, \hat{r}_{y,i}) = \frac{\hat{V}_i(-\hat{\varphi}_i)}{V_{0,k}(\hat{r}_{x,i}, \hat{r}_{y,i})}. \tag{72}$$

The quotient vector q of two N-dimensional vectors a and b in the Euclidean space $\mathbb{R}^N$ may be defined in analogy to the quotient of two complex numbers in the complex number space $\mathbb{C}$, which may be also represented in spherical coordinates as the quotient of the radial coordinates (magnitudes) and the difference of the angle coordinates. This concept may be extended to the N-dimensional vector space by representing vectors a and b in hyperspherical coordinates $$a = (|a|, \alpha_1, \alpha_2, \ldots, \alpha_N)^T. \tag{73}$$

$$b = (|b|, \beta_1, \beta_2, \ldots, \beta_N)^T. \tag{74}$$

where $\alpha_1, \alpha_2, \ldots, \alpha_N$ and $\beta_1, \beta_2, \ldots, \beta_N$ refer to the angle coordinates. Using definitions (73) and (74), the quotient q of two N-dimensional vectors in $\mathbf{V'}_N^N$ may then be expressed as $$q = \left(\frac{|a|}{|b|}, \alpha_1 - \beta_1, \alpha_2 - \beta_2, \ldots, \alpha_N - \beta_N\right)^T. \tag{75}$$

For N=3 the quotient may be also represented as a quaternion in a 4D complex number space $\mathbb{C}^4$ having one real and three imaginary components (1, i, j, k) where i, j, k refer to different roots of −1. For N=7 the quotient may be also represented as an octonion in an 8D complex number space $\mathbb{C}^8$ having one real and seven imaginary components referring to different roots of −1. Complex number representation may circumvent issues with modulo $2\pi$ leaps in the angle coordinates of a hyperspherical vector representation, e.g., if deviation vector data is used for determining a modification function as described below in connection with FIG. 34.

In some implementations, the vector map processor 3206 may determine a deviation vector individually for each of the 3D voltage vectors $\hat{V}_{x,i}, \hat{V}_{y,i}, \hat{V}_{z,i}$ (see Equation (38)) as the vector quotient $$\hat{d}_{x,i}(\hat{r}_{x,i}, \hat{r}_{y,i}) = \frac{\hat{V}_{x,i}(-\hat{\varphi}_i)}{V_{0,x,k}(\hat{r}_{x,i}, \hat{r}_{y,i})}, \tag{76}$$

$$\hat{d}_{y,i}(\hat{r}_{x,i}, \hat{r}_{y,i}) = \frac{\hat{V}_{y,i}(-\hat{\varphi}_i)}{V_{0,y,k}(\hat{r}_{x,i}, \hat{r}_{y,i})},$$

$$\hat{d}_{x,i}(\hat{r}_{x,i}, \hat{r}_{y,i}) = \frac{\hat{V}_{z,i}(-\hat{\varphi}_i)}{V_{0,z,k}(\hat{r}_{x,i}, \hat{r}_{z,i})},$$

and by representing each vector quotient by a quaternion in $\mathbb{C}^4$ as described above.

Figure 34:
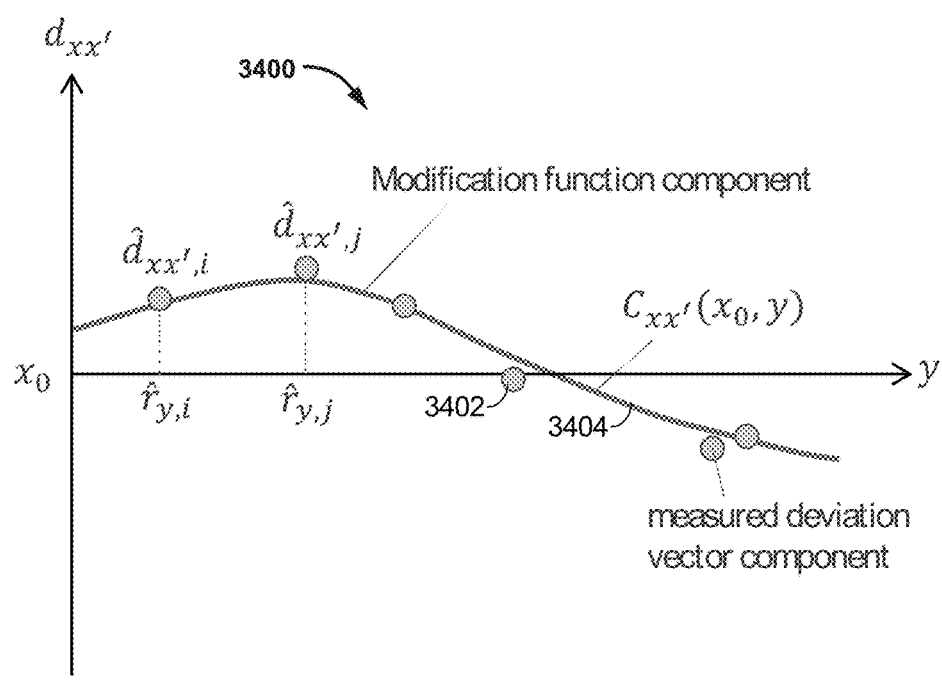
FIG. 34 is a diagram illustrating a component of the perturbed deviation vector (indicative for a field distortion effect as illustrated in FIG. 21 or 22) and of a vector map modification function as obtained from a regression method, in accordance with some implementations.

In the third operation, the vector map processor 3206 may use the deviation vectors $\hat{d}_i(\hat{r}_{x,i}, \hat{r}_{y,i})$ as determined in the second operation, e.g., in accordance with one of the Equations (69), (71), (72), and (76), to determine a multi-dimensional modification (correction) function C(r) for modifying the current vector map $V_{0,k}(r)$ to a new vector map $V_{0,k+i}$. FIG. 34 illustrates an exemplary diagram of performing the third operation, displaying the xx'-component of some measured deviation vectors $\hat{d}_i$ and a modification C as a function of the x- and y-coordinate in a 3D space 3400. To ease visualization, FIG. 34 only shows the xx'-component along an axis parallel to the y-axis at $x=x_0$ (e.g., $x_0 = -3$ m), and does not show the x-axis that would extend out the front of the page. Data points 3402 as plotted in the diagram of FIG. 34 may refer to different driving trajectories 2602, e.g., as illustrated in FIG. 35. In particular, FIG. 34 shows two data points of data points 3402 designated by $\hat{d}_{xx',i}$ and $\hat{d}_{xx',j}$ and corresponding to y-coordinates $\hat{r}_{y,i}$ and $\hat{r}_{y,j}$. These data points 3402 may refer to a first drive, e.g., with vehicle 406 along a first trajectory and a second drive along a second trajectory, respectively, whereas the second trajectory is slightly offset in y-axis direction with respect to the first trajectory. Curve 3404 designated by $C_{xx'}(x_0, y)$ refers to the xx'-component of the multi-dimensional (e.g. 9D) modification function C(x, y) along the $x=x_0$ axis. The curve 3404 may be considered as a cross-sectional view of a surface described by $C_{xx'}(x, y)$ in a 3D space 3400 with dimensions x, y, $d_{xx'}$. Each component of C(x, y) may be represented by a surface in a 3D space 3400.

In some implementations, the vector map processor 3206 determines the modification function C(x, y) based on at least one deviation vector $\hat{d}$. In some implementations, the vector map processor 3206 determines the modification function C(x, y) based on a plurality of deviation vectors $\hat{d}_i$. In some implementations, the plurality of deviation vectors $\hat{d}_i$ may refer to at least one sequence of deviation vectors $\hat{d}$ determined on a drive, e.g., with the vehicle 406 along a trajectory 2602.

In some implementations, the vector map processor 3206 determines the modification function C(x, y) using a functions fitting process. A functions fitting process may used for both smoothing (filtering) and prediction. Smoothing may be useful because the measured deviation vectors $\hat{d}_i$ may be subjected to errors $\epsilon_i$ as previously discussed. Prediction of the deviation vector d may be required at locations (areas) not covered by the one or more driving trajectories 2602 and where consequently no measured deviation vector data is available. Smoothing may be particularly useful if all components of the true deviation vector function d(x, y) vary slowly over x and y, meaning that the gradient $$\left(\frac{\partial}{\partial x}d(x, y), \frac{\partial}{\partial y}d(x, y)\right)$$

is small.

In some implementations, the vector map processor 3206 may employ a functions fitting process based on interpolation assuming that measured deviation vector data is error free. In some other implementations, the vector map processor 3206 may employ a functions fitting process based on regression, e.g., a linear regression, or non-linear regression, assuming that the measured deviation vector data is subjected to errors (noise) as previously described. In some implementations, the vector map processor 3206 may employ polynomial regression based on a polynomial of n-th order and ordinary least squares. In some implementations, the vector map processor 3206 employs a Gaussian process regression method modelling the components of the true deviation vector function d(x, y) as an outcome (realization) of a 2D Gaussian random process. This 2D Gaussian random process may be statistically defined by a mean function $\mu_d(x, y)$ and covariance function $\kappa_d(\Delta x, \Delta y)$, where $\Delta x$ and $\Delta y$ denote the difference of the x- and y-coordinates, respectively, of two arbitrary points in the x, y-plane. In some implementations, Gaussian process regression may also include a statistical model for measurement errors $\epsilon_1$ in deviation vector data $\hat{d}_i$, e.g., a Gaussian model defined by a mean function $\mu_\epsilon(x, y)$ and covariance function $\kappa_\epsilon(\Delta x, \Delta y)$.

In some implementations, the vector map processor 3206 may select a realization of the 2D Gaussian process, which may substantially correspond to a most likely realization given the set of measured deviation vectors $\hat{d}_1$, mean and covariance functions $\mu_d(x, y)$, $\mu_\epsilon(x, y)$ and $\kappa_d(\Delta x, \Delta y)$, $\kappa_\epsilon(\Delta x, \Delta y)$, respectively, and uses this realization as the modification function C(x, y).

In some implementations, the vector map processor 3206 may also estimate mean and covariance functions $\mu_d(x, y)$, $\mu_\epsilon(x, y)$ and $\kappa_d(\Delta x, \Delta y)$, $\kappa_\epsilon(\Delta x, \Delta y)$, respectively, based on a plurality of measured deviation vectors $\hat{d}_1$. In some implementations, each component of the multi-dimensional (e.g., 9D) covariance function can be modelled by a 2D Gaussian function (bell-shaped surface). The Gaussian correlation function of the deviation vector d(x, y) may be expressed e.g. for the xx'-component as $$\kappa_{d_{xx'}}(\Delta x, \Delta y) = \sigma_{xx'}^2 \exp\left(-\left(\frac{\Delta x^2}{2 l_{x,d_{xx'}}^2} + \frac{\Delta y^2}{2 l_{y,d_{xx'}}^2}\right)\right), \quad (77)$$

where $\sigma_{d_{xx'}}^2$ denotes the variance of the Gaussian process, and $l_{x,d_{xx'}}$ and $l_{y,d_{xx'}}$ its correlation length (length scale) in x- and y-direction. Equation (77) may analogously apply to the other components of the multi-dimensional correlation function, however with numerical parameter values that differ in general. The set of parameters $\lambda = (\sigma_{d_{xx'}}, l_{x,d_{xx'}}, l_{y,d_{xx'}}, \sigma_{d_{yx'}}, l_{x,d_{yx'}}, l_{y,d_{yx'}},$ etc.) defining the multi-dimensional Gaussian correlation function $\kappa_d(\Delta x, \Delta y)$ may be also referred to as the hyper parameters of a Gaussian process.

In some implementations, the vector map processor 3206 also estimates the set of hyper parameters $\lambda$, e.g., using a gradient search method maximizing the marginal likelihood as follows:

$$\frac{\partial}{\partial \lambda} \log p(\hat{d} \mid \hat{r}) = 0, \quad (78)$$

where $\hat{d}$ denotes the set of measured deviation vectors as available for this process of estimation and $\hat{r}$ the set of corresponding positions. The vector map processor 3206 may perform this process of hyper parameter estimation component-wise. In some other implementations, the vector map processor 3206 estimates the set of hyper parameters $\lambda$ using a grid search method.

In some parking spaces, the correlation lengths $l_{x,d_{xx'}}, l_{y,d_{xx'}}, l_{x,d_{yx'}}, l_{y,d_{yx'}},$ etc. may depend on the location (region) in the parking space. Therefore, in some implementations, the vector map processor 3206 may estimate a set of hyper parameters $\lambda$ specifically for a predetermined region in the x,y-plane. Such a predetermined region may be an annular area centered in the base 408 and defined by an inner radius and an outer radius. A region may be also defined by a lower and an upper limit for the x- and y-coordinate.

In the fourth operation, the vector map processor 3206 may apply the modification function C(x, y) as determined by the third operation to modify the current vector map $V_{0,k}(r)$ as read from memory 2010 and to produce a new vector map $V_{0,k+1}(r)$ and/or $A_{k+1}(r)$ that is written into memory 2010. Reference vectors $A_{k+1}(r)$ may be obtained from reference vectors $V_{0,k+1}(r)$ according to Equations (46) and (40).

In some implementations, if C(x, y) is based on the normalized deviation vectors $\hat{d}_i$ as defined by Equation (71), the vector map processor 3206 may de-normalize the modification function C(x, y) before applying it to the vector map $V_{0,k}(r)$. In some implementations, the fourth operation of vector map modification may be expressed by $$V_{0,k+1}(r) = V_{0,k}(r) + |V_{0,k}(r)| \cdot C(r). \quad (79)$$

where r refers to the position entries as defined by a LUT e.g. in analogy to LUT 1600 of FIG. 16.

If C(r) is based on a complex quotient $\hat{d}_i$ e.g. as defined by Equation (72), the operation of vector map modification may be expressed as $$V_{0,k+1}(r) = C(r) \otimes V_{0,k}(r). \quad (80)$$

where $\otimes$ signifies a multi-dimensional complex number multiplication.

In some implementations, while the vector map processor 3206 can potentially improve a vector map $V_{0,k}(r)$ "offline" using past voltage vector and pose data recorded, e.g., during one or more test (learning) drives as described above. In some implementations, the combiner 3208 as illustrated in FIG. 32 can potentially improve a pose estimate "online" (in real time) by combining absolute pose estimates $\hat{Y}_a$ as received from the absolute positioning processor 2004 with relative pose estimates $\hat{Z}_r$ as received from the relative positioning processor 3204.

In some implementations, the combiner 3208 determines a potentially improved pose estimate $\hat{X}_a$ based upon the absolute pose estimate $\hat{Y}_a$, relative pose estimate $\hat{Z}_r$, and the set of vehicle model parameters K by finding a pose $X_a$ that is substantially the most probable given pose estimates $\hat{Y}_a$, $\hat{Z}_r$, vehicle parameters K, and a statistical model, e.g., defined by a conditional probability function $p(X_a|\hat{Y}_a, \hat{Z}_r, K)$. The pose estimate $\hat{X}_a$ may be determined by maximizing the conditional probability function $p(X_a|\hat{Y}_a, \hat{Z}_r, K)$ over a range of $X_a$ where the true pose is expected. In mathematical terms, this may be expressed as $$\max_{\text{all } X_a} p(X_a \mid \hat{Y}_a, \hat{Z}_r; K) \to \hat{X}_a. \quad (81)$$

The pose $X_a$ that maximizes $p(X_a|\hat{Y}_a, \hat{Z}_r; K)$ may be considered a best estimate $\hat{X}_a$ of the generator's 368 pose in the sensor's 366 coordinate frame.

In other implementations, the combiner 3208 may determine a potentially improved pose estimate $\hat{X}_{a,i}$ upon the absolute and relative pose estimates $\hat{Y}_{a,i}$, $\hat{Z}_{r,i}$, the vehicle model parameters K, as well as upon at least one past absolute and relative pose estimate $\hat{Y}_{a,i-1}$, $\hat{Z}_{r,i-1}$, where the index i refers to the sequence counter. The combiner 3208 may determine a pose estimate $\hat{X}_{a,i}$ by finding a pose $X_a$ that is substantially the most probable given at least pose estimates $\hat{Y}_{a,i}$, $\hat{Y}_{a,i-1}$, $\hat{Z}_{r,i}$, $\hat{Z}_{r,i-1}$, vehicle parameters K, and a statistical model, e.g., defined by a conditional probability function $p(X_{a,i}|\hat{Y}_{a,i}, \hat{Y}_{a,i-1}, \hat{Z}_{r,i}, \hat{Z}_{r,i-1}; K)$. For example, finding the pose estimate $\hat{X}_{a,i}$ may be accomplished by maximizing the conditional probability function over a range of $X_a$ where the true pose is expected. In mathematical terms, this may be expressed as $$\max_{\text{all } X_a} p(X_a | \hat{Y}_{a,i}, \hat{Y}_{a,i-1}, \hat{Z}_{r,i}, \hat{Z}_{r,i-1}; K) \to \hat{X}_a. \quad (82)$$

The pose $X_a$ that maximizes $p(X_a|\hat{Y}_{a,i}, \hat{Y}_{a,i-1}, \hat{Z}_{r,i}, \hat{Z}_{r,i-1}; K)$ may be considered a best pose estimate $\hat{X}_a$ under the constraints of available absolute and relative pose data.

In some implementations, the combiner 3208 employs Bayesian filtering assuming a linear Gaussian state space model. More specifically, the combiner 3208 may use a Kalman filter or a similar filter suitable for fusing and filtering streams of input (pose) data.

In some other implementations, the combiner 3208 employs an extended Kalman filter or a particle filter assuming a non-linear and/or non-Gaussian state space model. Such assumption may be justified e.g. by outliers in streams of pose estimates $\hat{Y}_a$ due to pose ambiguity issues as previously described e.g. in connection with FIG. 11.

In some implementations, data fusion and filtering as performed by combiner 3208 relies on a spatial pose data history rather than on a temporal pose data history. This may be accomplished by fusing and filtering of pose data at a variable update rate, e.g., proportional to an estimated speed of the vehicle 406. For example, if the estimated speed of the vehicle 406 is high than the filter update rate will be also high. Conversely, if the estimated speed is low, the update rate will be also low. If the vehicle 406 stops, the filter state will be frozen.

In some implementations using a combiner 3208, the vector map processor 3206 may use, in addition to $\hat{Y}_a$, $\hat{Z}_r$, $\hat{V}$, the outputs $\hat{X}_a$ of the combiner 3208 for modifying the vector map $V_{0,k}$ (r) as shown in FIG. 32.

Figure 33:
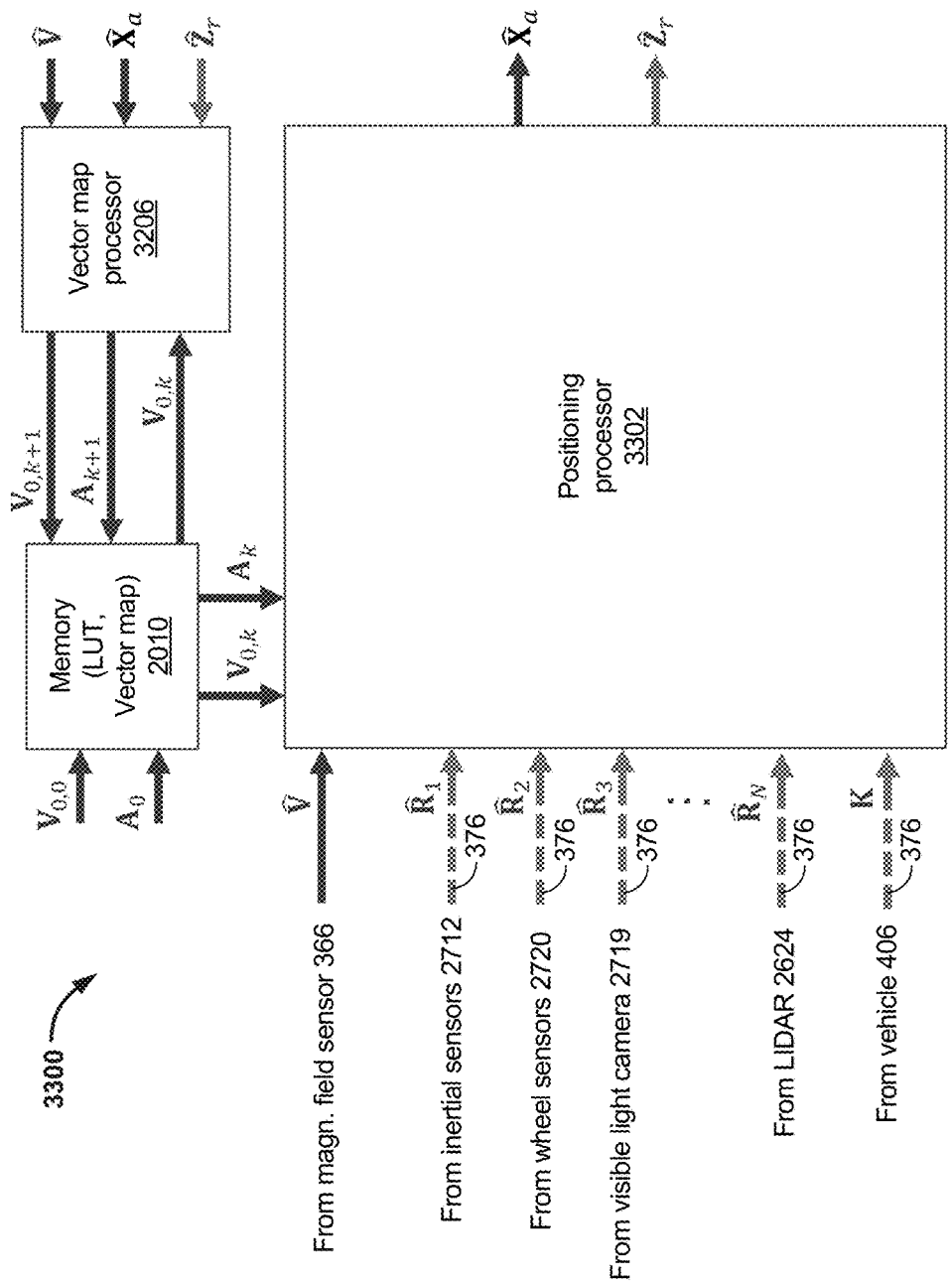
FIG. 33 is a block diagram illustrating parts of another enhanced base positioning system of FIG. 3, in accordance with some implementations.

FIG. 33 is a block diagram 3300 showing at least a portion of a base positioning subsystem 362 as part of an enhanced magnetic field based positioning system 600, in accordance with some other implementations. As opposed to the system illustrated in FIG. 32, this base positioning subsystem 362 comprises a single positioning processor 3304.

The positioning processor 3302 is configured to receive signals indicative for the voltage vector $\hat{V}$, e.g., as detected by the phase synchronization circuitry 2002 operationally connected to the magnetic field sensor 366. The phase synchronization circuitry 2002 may output a vector $\hat{V}$ every $T_p$ seconds (e.g. $T_p=200$ ms) or at rate depending on some other conditions as previously described in connection with FIG. 20. In some implementations, vector $\hat{V}$ may refer to the voltage vector as defined by Equation (40) for the fictitious reverse transmitting system 1700 as previously described in connection with FIG. 17. The positioning processor 3302 is further configured to receive signals indicative for data from various vehicle based auxiliary systems and sensors as described in connection with FIGS. 27 and 32. These auxiliary data inputs are represented by vectors $\hat{R}_1$, $\hat{R}_2$, $\hat{R}_3$, ..., $\hat{R}_N$. In some implementations, inputs, $\hat{R}_1$, $\hat{R}_2$, $\hat{R}_3$, ..., $\hat{R}_N$ may be received via communication link 376 of FIG. 3 as indicated by dashed arrows in FIG. 33. The positioning processor 3302 is also configured to receive signals indicative for vehicle model parameters K, e.g., via communication link 376 as indicated by the dashed arrow in FIG. 33. The positioning processor 3302 is further configured to output absolute and relative pose estimates $\hat{X}_a$ and $\hat{Z}_r$, respectively, e.g., every $T_p$ seconds. In some implementations, the positioning processor 3302 is configured to additionally output information about the confidence of the absolute and relative pose estimates $\hat{X}_a$ and $\hat{Z}_r$, respectively (not shown in FIG. 33).

The vector map processor 3206 is configured to receive signals indicative for the absolute pose estimate $\hat{X}_a$, the corresponding relative pose estimate $\hat{Z}_r$, as well as the corresponding voltage vector $\hat{V}$. In some implementations, it is also configured to receive confidence information about pose estimates $\hat{X}_a$, $\hat{Z}_r$ and voltage vector $\hat{V}$ (not shown in FIG. 32). The vector map processor 3206 is further configured to receive from the memory 2010 signals indicative for the plurality of current reference vectors $V_{0,k}$, also referred herein to as the current vector map. It is further configured to modify the current vector map $V_{0,k}$ e.g. based on sequences of corresponding inputs $\hat{X}_a$, $\hat{Z}_r$, $\hat{V}$ and to output signals indicative for a modified vector map $V_{0,k+1}$, $A_{k+1}$ from time to time depending on an amount of data received from the positioning processors 2004 and 3204.

In some implementations, modifying a vector map $V_{0,k}$, $A_k$ is accomplished in a four-operation process analogously to the process as described in connection with FIG. 32, except that the pose vector $\hat{Y}_a$ is not used. For example, while the system of FIG. 32 determines a pose estimate $\hat{X}_a$ essentially upon at least one absolute and relative pose estimate $\hat{Y}_a$ and $\hat{Z}_r$, the base positioning subsystem 362 of FIG. 33 may deduce a potentially improved pose estimate $\hat{X}_a$ directly from the "raw data" $\hat{V}$, $\hat{R}_1$, $\hat{R}_2$, $\hat{R}_3$, ..., $\hat{R}_N$.

In some implementation, the positioning processor 3302 determines a potentially improved pose estimate $\hat{X}_a$ by finding a pose $X_a$ that is substantially the most probable given $\hat{V}$, $\hat{R}_1$, $\hat{R}_2$, $\hat{R}_3$, ..., $\hat{R}_N$, vehicle parameters K (not shown in FIG. 33), and a statistical model. e.g.. defined by a conditional probability function $p(X_a|\hat{V}, \hat{R}_1, \hat{R}_2, \hat{R}_3, ..., \hat{R}_N; K)$. This may be accomplished by maximizing the conditional probability function $p(X_a|\hat{V}, \hat{R}_1, \hat{R}_2, \hat{R}_3, ..., \hat{R}_N)$ over a range of $X_a$ where the true pose is expected. In mathematical terms, maximizing the conditional probability function may be expressed as $$\max_{\text{all } X_a} p(X_a | \hat{V}, \hat{R}_1, \hat{R}_2, \hat{R}_3, ..., \hat{R}_N; K) \to \hat{X}_a. \quad (83)$$

In some other implementations, the positioning processor 3302 determines a pose estimate $\hat{X}_{a,i}$ upon the current "raw" data set $\hat{V}_i$, $\hat{R}_{1,i}$, $\hat{R}_{2,i}$, ..., $\hat{R}_{N,i}$, the set of vehicle model parameters K, as well as upon at least one past "raw" data set $\hat{V}_{i-1}$, $\hat{R}_{1,i-1}$, $\hat{R}_{2,i-1}$, $\hat{R}_{3,i-1}$, ..., $\hat{R}_{N,i-1}$, where the index i refers to the sequence counter. It determines a pose estimate $\hat{X}_{a,i}$ by finding a pose $X_a$ that is substantially the most probable given current vectors $\hat{V}_i$, $\hat{R}_{1,i}$, $\hat{R}_{2,i}$, ..., $\hat{R}_{N,i}$ and at least one past "raw" data set $\hat{V}_{i-1}$, $\hat{R}_{1,i-1}$, $\hat{R}_{2,i-1}$, ..., $\hat{R}_{N,i-1}$, vehicle parameters K, and a statistical model e.g. defined by a conditional probability function $p(X_{a,i}|\hat{V}_i, \hat{R}_{1,i}, \ldots, \hat{R}_{N,i}, \hat{V}_{i-1}, \hat{R}_{1,i-1}, \ldots, \hat{R}_{N,i-1}; K)$. This may be accomplished by maximizing the conditional probability function over a range of $X_a$ where the true pose is expected. In mathematical terms, this may be expressed as $$\max_{\text{all } X_a} p(X_a | \hat{V}_i, \hat{R}_{1,i}, \ldots, \hat{R}_{N,i}, \hat{V}_{i-1}, \hat{R}_{1,i-1}, \ldots, \hat{R}_{N,i-1}; K) \to X_a. \quad (84)$$

The pose $X_a$ that maximizes $p(X_a|\hat{V}_i, \hat{R}_{1,i}, \ldots, \hat{R}_{N,i}, \hat{V}_{i-1}, \hat{R}_{1,i-1}, \ldots, \hat{R}_{N,i-1}; K)$ may be considered a best estimate $\hat{X}_a$ under the constraints of available "raw" data.

In some implementations, the positioning processor 3302 employs an extended Kalman filter, a particle filter or another suitable data fusion and filtering method assuming a non-linear non-Gaussian state space model. Such assumption may be justified e.g. by the non-linear relationship between voltage vector and pose.

Figure 36:
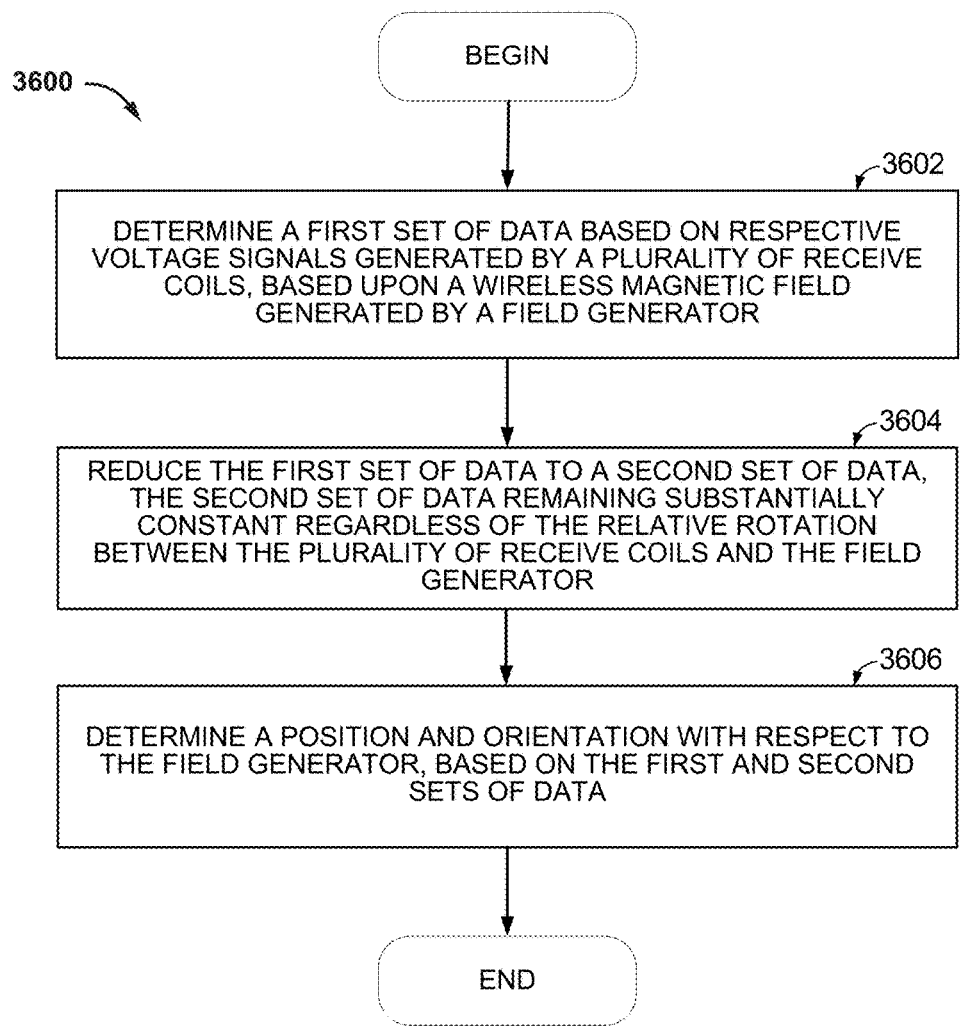
FIG. 36 is a flowchart depicting a method for determining a position and orientation of a vehicle, in accordance with some implementations.

FIG. 36 is a flowchart 3600 depicting a method for determining a position and orientation of a vehicle, in accordance with some implementations. Flowchart 3600 corresponds to previously described figures and may correspond to a magnetic field positioning system 600. Although the flowchart 3600 is described herein with reference to a particular order, in various implementations, blocks herein may be performed in a different order, or omitted, and additional blocks may be added.

At block 3602, a processor (e.g., processor 2004) determines a first set of (voltage) data based on respective voltage signals generated by field sensor comprising a plurality of receive coils, wherein each of the plurality of receive coils is configured to generate a respective voltage signal in response to a wireless magnetic field generated by a field generator. In some implementations, the first set of (voltage) data corresponds to a multi-dimensional vector (e.g., a 9-dimensional vector).

At block 3604, the first set of (voltage) data is reduced to a second set of data, wherein the second set of data remains substantially constant regardless of relative rotation between the plurality of receive coils and the field generator. In some implementations, the second set of data may correspond to a multi-dimensional vector, such as a 6-dimensional vector. In some implementations, reducing the first set of voltage data to the second set of data comprises performing a non-linear transformation on the first set of voltage data.

At block 3606, a position and an orientation of the field generator with respect to the field sensor is determined, based on the first and second sets of data. In some implementations, this may comprise comparing the second set of data to a plurality of a first set of stored data each corresponding to a position with respect to the field sensor to determine a subset of the plurality of the first set of stored data. The positions corresponding to the subset of the plurality of the first set of stored data may be used to determine a subset of a second set of stored (voltage) data, which may be compared to at least one rotational transforms of a first set of (voltage) data to determine the position and orientation.

Figure 37:
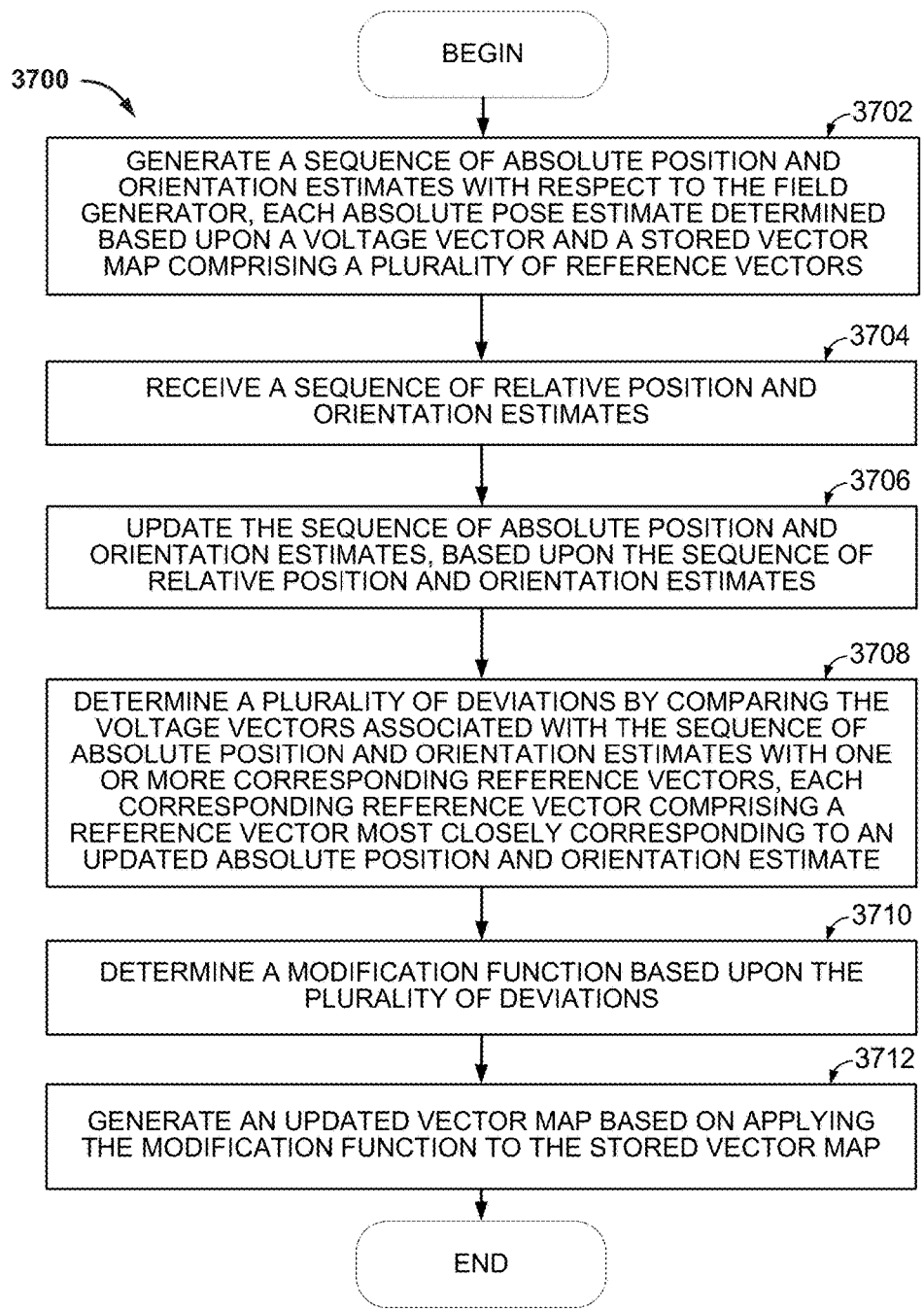
FIG. 37 is a flowchart depicting a method for modifying a vector map for determining a position and orientation of a vehicle, in accordance with some embodiments.

FIG. 37 is a flowchart 3700 depicting a method for modifying a vector map for determining a position and orientation of a vehicle, in accordance with some previously described embodiments. Flowchart 3700 corresponds to previously described figures and may correspond to a magnetic field positioning system 600. Although the flowchart 3700 is described herein with reference to a particular order, in various implementations, blocks herein may be performed in a different order, or omitted, and additional blocks may be added.

At block 3702, a sequence of absolute position and orientation estimates of a field generator with respect to a field sensor is generated, wherein each absolute position and orientation estimate is determined based upon a voltage vector derived from a set of voltage signals generated by the plurality of receive coils and a stored vector map comprising a plurality of reference vectors. In some embodiments, the voltage vector may comprise a multi-dimensional voltage vector, such as a 9D voltage vector.

At block 3704, a sequence of relative position and orientation estimates is received. In some embodiments, the relative position and orientation estimates are generated using a dead reckoning method, based upon at least one of a an inertial sensor, a wheel sensor, and a steering angle sensor. In some embodiments, the relative position and orientation estimates are generated using one or more optical systems associated with the vehicle. In some embodiments, the relative position and orientation estimates are generated using a satellite positioning system.

At block 3706, the sequence of absolute position and orientation estimates is updated, based upon the sequence of relative position and orientation estimates. In some embodiments, updating the sequence of absolute position and orientation estimates comprises determining a coordinate transformation for transforming the sequence of relative to a sequence of absolute pose estimates that most closely fits the sequence of absolute position and orientation estimates. In some embodiments, the closest fit may be determined using a LMS criterion.

At block 3708, a plurality of deviations by comparing the voltage vectors associated with the sequence of absolute position and orientation estimates with one or more corresponding reference vectors are determined, wherein each corresponding reference vector comprises a reference vector of the stored vector map most closely corresponding to an absolute position and orientation estimate of the updated sequence of absolute position and orientation estimates. In some embodiments, the voltage vectors are rotationally transformed prior to being compared with the corresponding reference vectors. In some embodiments, the corresponding reference vector is selected as a reference vector most closely corresponding to the absolute position and orientation estimate of the updated sequence of absolute position and orientation estimates, based upon a Euclidean distance between a position associated with the reference vector and the absolute position and orientation estimate.

At block 3710, modification function based upon the plurality of deviations is determined. The modification function may be determined using a function fitting process such as regression.

At block 3712, an updated vector map is generated, based on applying the modification function to the stored vector map. The updated map may be used to generate more accurate subsequent sequences of position and orientation estimates. For example, as discussed above, the updated vector map may be used to determine more accurate position and orientation estimates from voltage vectors derived from sets of voltage signals generated by a plurality of receive coils at a field sensor.

Figure 38:
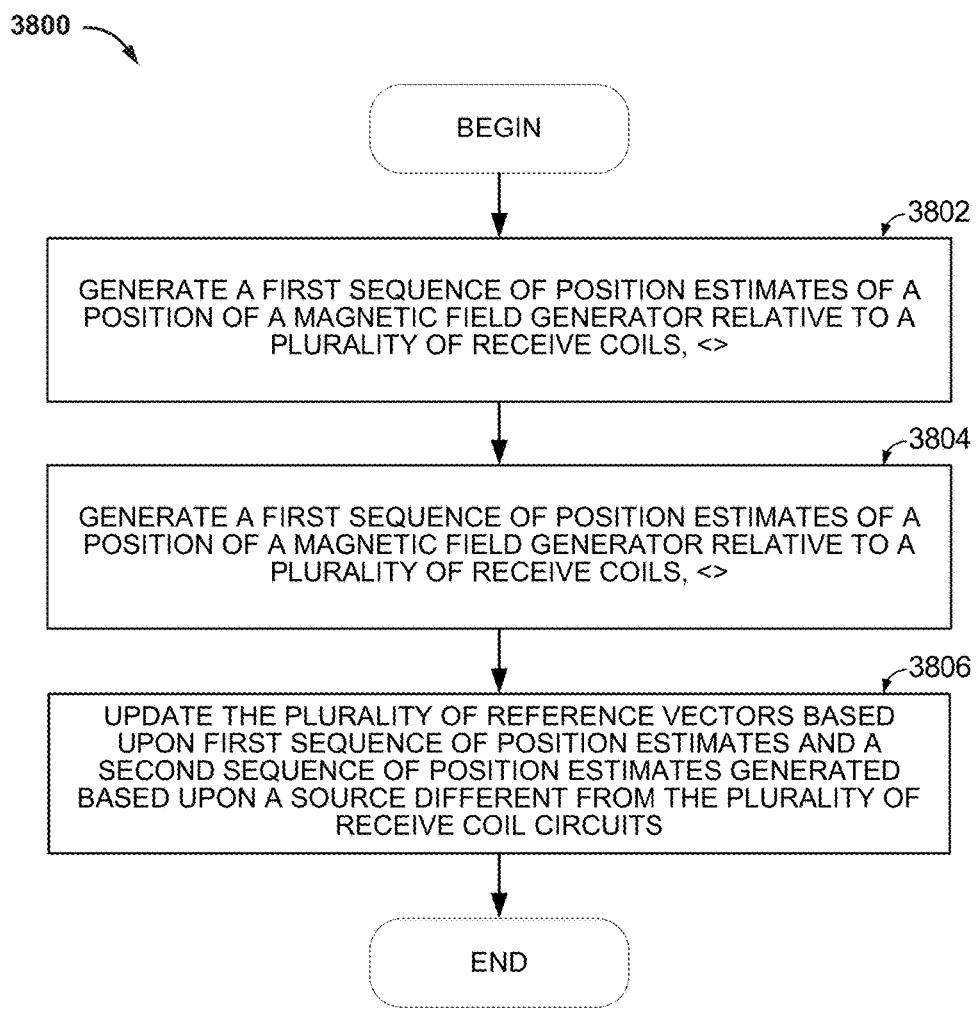
FIG. 38 is a flowchart depicting a method for determining positioning information for a vehicle, in accordance with some embodiments.

FIG. 38 is a flowchart 3800 of a method for determining positioning information for a vehicle, in accordance with some embodiments. Flowchart 3800 corresponds to previously described figures and may correspond to a magnetic field positioning system 600. Although the flowchart 3800 is described herein with reference to a particular order, in various implementations, blocks herein may be performed in a different order, or omitted, and additional blocks may be added.

At block 3802, a plurality of receive coils may generate a set of voltage signals in response to a magnetic field generated by a magnetic field generator.

At block 3804, a first sequence of position estimates may be generated. The first sequence of position estimates may correspond to a sequence of positions of a magnetic field generator with respect to a plurality of receive coils. In some embodiments, the first sequence of position estimates may be determined based upon a voltage vector derived from the set of voltage signals generated by the plurality of receive coils in response to the magnetic field generated by the magnetic field generator. In some embodiments, the first sequence of position estimates may be derived based upon corresponding voltage vectors derived from the set of voltage signals and a plurality of reference vectors.

At block 3806, the plurality of reference vectors are updated based upon the first sequence of position estimates and a second sequence of position estimates generated based upon a source different from the plurality of receive coil circuits. In some embodiments, the second sequence of position estimates may be generated based upon a plurality of other sensors. In some embodiments, the first sequence of position estimates may correspond to absolute position estimates while the second sequence of position estimates may correspond to relative position estimates.

The various operations of methods described above may be performed by any suitable means capable of performing the operations, such as various hardware and/or software component(s), circuits, and/or module(s). Generally, any operations illustrated in the figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted as one or more instructions or code on a tangible, non-transitory, computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features have been described herein. It is to be understood that not necessarily all such advantages may be achieved in accordance with any particular implementation. Thus, one or more implementations achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for determining positioning information for a vehicle, the apparatus comprising:
- a plurality of receive coil circuits configured to generate a set of voltage signals from a magnetic field generated by a magnetic field generator; and
- a hardware processor configured to:
  - generate a first sequence of position estimates of a position of the magnetic field generator with respect to a position of the plurality of receive coils, wherein each of the first sequence of position estimates is determined based upon a corresponding voltage vector derived from the set of voltage signals and at least one of a plurality of reference vectors; and
  - update the plurality of reference vectors based upon the first sequence of position estimates and a second sequence of position estimates generated based upon a source different from the plurality of receive coil circuits.

2. The apparatus of claim 1, wherein the hardware processor is further configured to determine positioning information of the vehicle based upon updating the first sequence of position estimates based upon the second sequence of position estimates.

3. The apparatus of claim 2, wherein the hardware processor is further configured to update the first sequence of position estimates by determining a coordinate transformation for transforming the second sequence of position estimates to a third sequence of position estimates that most closely fits the first sequence of position estimates.

4. The apparatus of claim 2, wherein the hardware processor is further configured to compare each of the voltage vectors corresponding to the first sequence of position estimates with one or more reference vectors of the plurality of reference vectors to produce a plurality of deviations between the first sequence of position estimates and the one or more reference vectors, wherein each of the one or more reference vectors comprises a reference vector of the plurality of reference vectors most closely corresponding to a position estimate of the updated first sequence of position estimates.

5. The apparatus of claim 4, wherein the hardware processor is further configured to determine the plurality of deviations by rotationally transforming the voltage vectors corresponding to the first sequence of position estimates, and comparing the rotationally transformed voltage vectors with the one or more reference vectors.

6. The apparatus of claim 4, wherein the hardware processor is configured to select the reference vector as most closely corresponding to the position estimate of the updated first sequence of position estimates based upon a Euclidean distance between a position associated with the reference vector and the position estimate.

7. The apparatus of claim 4, wherein the hardware processor is further configured to determine a modification function based upon the plurality of deviations and to generate an updated plurality of reference vectors based on applying the modification function to the plurality of reference vectors.

8. The apparatus of claim 1, wherein the plurality of receive coil circuits comprise coils are arranged in different geometric planes.

9. The apparatus of claim 8, wherein the coils of the plurality of receive coil circuits are arranged in mutually orthogonal planes.

10. The apparatus of claim 1, wherein the hardware processor is further configured to generate the second sequence of position estimates, based upon at least one of a wheel sensor and a steering angle sensor.

11. The apparatus of claim 1, wherein the hardware processor is further configured to generate the second sequence of position estimates, based upon one or more inertial sensors.

12. The apparatus of claim 1, wherein the hardware processor is further configured to generate the second sequence of position estimates using one or more optical systems associated with the vehicle.

13. The apparatus of claim 1, the hardware processor is further configured to generate the second sequence of position estimates using a satellite positioning system.

14. The apparatus of claim 1, wherein the position estimates of the first sequence of position estimates are absolute position estimates, and wherein the position estimates of the second sequence of position estimates are relative position estimates.

15. The apparatus of claim 1, wherein at least one of the first and the second sequences of position estimates further comprises orientation estimates.

16. A method for determining positioning information for a vehicle, comprising:
generating, at a plurality of receive coils, a set of voltage signals in response to a magnetic field generated by a magnetic field generator; and
generating a first sequence of position estimates of a position of the magnetic field generator with respect to a position of the plurality of receive coils, wherein each of the first sequence of position estimates is determined based upon a corresponding voltage vector derived from the set of voltage signals and at least one of a plurality of reference vectors;
updating the plurality of reference vectors based upon the first sequence of position estimates and a second sequence of position estimates generated based upon a source different from the plurality of receive coil circuits.

17. The method of claim 16, further comprising determining positioning information of the vehicle based upon updating the first sequence of position estimates based upon the second sequence of position estimates.

18. The method of claim 17, further comprising updating the first sequence of position estimates by determining a coordinate transformation for transforming the second sequence of position estimates to a third sequence of position estimates that most closely fits the first sequence of position estimates.

19. The method of claim 17, further comprising comparing each of the voltage vectors corresponding to the first sequence of position estimates with one or more reference vectors of the plurality of reference vectors to produce a plurality of deviations between the first sequence of position estimates and the one or more reference vectors, wherein each of the one or more reference vectors comprises a reference vector of the plurality of reference vectors most closely corresponding to a position estimate of the updated first sequence of position estimates.

20. The method of claim 19, further comprising determining the plurality of deviations by rotationally transforming the voltage vectors corresponding to the first sequence of position estimates, and comparing the rotationally transformed voltage vectors with the one or more reference vectors.

21. The method of claim 19, further comprising selecting the reference vector as most closely corresponding to the position estimate of the updated first sequence of position estimates based upon a Euclidean distance between a position associated with the reference vector and the position estimate.

22. The method of claim 16, wherein the second sequence of position estimates are generated based upon at least one of a wheel sensor and a steering angle sensor.

23. The method of claim 16, wherein the second sequence of position estimates are generated based upon one or more inertial sensors.

24. The method of claim 16, wherein the second sequence of position estimates are generated using one or more optical systems associated with the vehicle.

25. The method of claim 16, wherein the second sequence of position estimates are generated using a satellite positioning system.

26. An apparatus for determining positioning information for a vehicle, the apparatus comprising:
a plurality of means for generating a set of voltage signals from a magnetic field generated by a magnetic field generator;

means for generating a first sequence of position estimates of a position of the magnetic field generator with respect to a position of the plurality of means for generating a set of voltage signals, wherein each of the first sequence of position estimates is determined based upon a corresponding voltage vector derived from the set of voltage signals and at least one of a plurality of reference vectors;

means for updating the plurality of reference vectors based upon the first sequence of position estimates and a second sequence of position estimates generated based upon a source different from the plurality of receive coil circuits.

27. The apparatus of claim 26, wherein the plurality of means for generating comprises a plurality of receive coil circuits, wherein the means for generating a first sequence of position estimates comprises a hardware processor, and wherein the means for updating the plurality of reference vectors comprises the hardware processor.

28. The apparatus of claim 26, further comprising means for determining positioning information of the vehicle based upon updating the first sequence of position estimates based upon the second sequence of position estimates.

29. The apparatus of claim 28, further comprising means for updating the first sequence of position estimates by determining a coordinate transformation for transforming the second sequence of position estimates to a third sequence of position estimates that most closely fits the first sequence of position estimates.

30. The apparatus of claim 28, further comprising a hardware processor configured to compare each of the voltage vectors corresponding to the first sequence of position estimates with one or more reference vectors of the plurality of reference vectors to produce a plurality of deviations between the first sequence of position estimates and the one or more reference vectors, wherein each of the one or more reference vectors comprises a reference vector of the plurality of reference vectors most closely corresponding to a position estimate of the updated first sequence of position estimates.

* * * * *